(12) United States Patent
Babaei

(10) Patent No.: US 11,855,781 B2
(45) Date of Patent: *Dec. 26, 2023

(54) TRANSMISSION OR DROPPING OF A DEFERRED HARQ FEEDBACK

(71) Applicant: PanPsy Technologies, LLC, Fairfax, VA (US)

(72) Inventor: Alireza Babaei, Fairfax, VA (US)

(73) Assignee: PanPsy Technologies, LLC, Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/087,893

(22) Filed: Dec. 23, 2022

(65) Prior Publication Data

US 2023/0129141 A1 Apr. 27, 2023

Related U.S. Application Data

(63) Continuation of application No. 17/722,426, filed on Apr. 18, 2022, now Pat. No. 11,569,942.

(60) Provisional application No. 63/180,786, filed on Apr. 28, 2021.

(51) Int. Cl.
*H04L 5/00* (2006.01)
*H04L 1/1607* (2023.01)
*H04L 1/1812* (2023.01)

(52) U.S. Cl.
CPC .......... *H04L 1/1678* (2013.01); *H04L 1/1812* (2013.01); *H04L 5/0048* (2013.01)

(58) Field of Classification Search
CPC . H04W 72/0446; H04W 84/12; H04W 84/18; H04W 28/04; H04W 28/06; H04L 1/1678; H04L 1/1812; H04L 5/0048

USPC .......................................................... 370/336
See application file for complete search history.

(56) References Cited

U.S. PATENT DOCUMENTS

| | | | |
|---|---|---|---|
| 2010/0142494 A1* | 6/2010 | Hsu .......... | H04L 1/189 370/336 |
| 2016/0020873 A1* | 1/2016 | Park .......... | H04L 1/1854 370/336 |
| 2016/0100420 A1* | 4/2016 | Chen .......... | H04W 72/1268 370/329 |
| 2017/0373803 A1 | 12/2017 | Wu | |
| 2018/0014298 A1 | 1/2018 | Sun et al. | |

(Continued)

FOREIGN PATENT DOCUMENTS

WO WO 2020/167914 A1 * 8/2020 ............... H04L 1/18

OTHER PUBLICATIONS

3GPP TSG RAN WG1 Meeting # 104-e, e-Meeting, Jan. 25-Feb. 5, 2021, R1-2100101, Source: ZTE, Title: Discussion on HARQ-ACK enhancements for eURLLC. (Year: 2021).*

(Continued)

*Primary Examiner* — Peter G Solinsky
*Assistant Examiner* — Sanjay K Dewan
(74) *Attorney, Agent, or Firm* — Alireza Babaei

(57) ABSTRACT

A wireless device may receive a first TB associated with a first HARQ process number. The wireless device may determine to defer a first HARQ feedback, associated with the first TB, from a first timing to a second timing. The wireless device may receive, in a third timing, a second TB associated with the first HARQ process number. The wireless device may transmit the first HARQ feedback in the second timing or may drop the first HARQ feedback based on the second timing and the third timing.

20 Claims, 26 Drawing Sheets

(56) References Cited

U.S. PATENT DOCUMENTS

| | | | |
|---|---|---|---|
| 2018/0063883 | A1 | 3/2018 | Nagaraja et al. |
| 2019/0037637 | A1* | 1/2019 | Suzuki ................. H04W 72/23 |
| 2019/0053227 | A1 | 2/2019 | Huang et al. |
| 2019/0159140 | A1* | 5/2019 | Wang .................... H04L 5/0082 |
| 2020/0145144 | A1* | 5/2020 | Hosseini ........... H04W 72/0446 |
| 2020/0313745 | A1* | 10/2020 | Yang ...................... H04W 76/27 |
| 2021/0014791 | A1 | 1/2021 | Freda et al. |
| 2021/0022127 | A1 | 1/2021 | Xu et al. |
| 2021/0376960 | A1* | 12/2021 | Huang ................. H04W 72/23 |
| 2022/0030560 | A1* | 1/2022 | Hosseinian ........... H04L 1/1822 |
| 2022/0149996 | A1 | 5/2022 | Moon et al. |

OTHER PUBLICATIONS

3GPP TSG RAN WG1 # 104bis, e-Meeting, Apr. 12-20, 2021, R1-2103163, Agenda item: 8.3.1.1, Source: Qualcomm Incorporated, Title: HARQ-ACK enhancement for IoT and URLLC. (Year: 2021).*

3GPP TSG-RAN WG1 Meeting # 104-e, E-Meeting, Jan. 25-Feb. 5, 2021, R1-2100268, Agenda item: 8.3.1.1, Source: Ericsson, Title: HARQ-ACK Enhancements for IIoT/URLLC. (Year: 2021).*

3GPP TSG RAN WG1 #104-e, e-Meeting, Jan. 25-Feb. 5, 2020, R1-2100728, Agenda item: 8.3.1.1, Source: Nokia, Nokia Shanghai Bell, Title: HARQ-ACK Feedback Enhancements for URLLC/IIoT. (Year: 2020).*

3GPP TS 38.211 V16.5.0 (Mar. 2021); Technical Specification; 3rd Generation Partnership Project; Technical Specification Group Radio Access Network; NR; Physical channels and modulation; (Release 16).

3GPP TS 38.212 V16.5.0 (Mar. 2021); Technical Specification; 3rd Generation Partnership Project; Technical Specification Group Radio Access Network; NR; Multiplexing and channel coding; (Release 16).

3GPP TS 38.213 V16.5.0 (Mar. 2021); Technical Specification; 3rd Generation Partnership Project; Technical Specification Group Radio Access Network; NR; Physical layer procedures for control; (Release 16).

3GPP TS 38.214 V16.5.0 (Mar. 2021); Technical Specification; 3rd Generation Partnership Project; Technical Specification Group Radio Access Network; NR; Physical layer procedures for data; (Release 16).

3GPP TS 38.300 V16.5.0 (Mar. 2021); Technical Specification; 3rd Generation Partnership Project; Technical Specification Group Radio Access Network; NR; NR and NG-RAN Overall Description; Stage 2; (Release 16).

3GPP TS 38.321 V16.4.0 (Mar. 2021); Technical Specification; 3rd Generation Partnership Project; Technical Specification Group Radio Access Network; NR; Medium Access Control (MAC) protocol specification; (Release 16).

3GPP TS 38.331 V16.4.0 (Mar. 2021); Technical Specification; 3rd Generation Partnership Project; Technical Specification Group Radio Access Network; NR; Radio Resource Control (RRC); Protocol specification; (Release 16).

3GPP TSG RAN WG1 Meeting #104-e; R1-2100101; e-Meeting, Jan. 25-Feb. 5, 2021; Source: ZTE; Title: Discussion on HARQ-ACK enhancements for eURLLC; Agenda item: 8.3.1.1; Document for: Discussion and Decision.

3GPP TSG RAN WG1 #104-e; R1-2100181; e-Meeting, Jan. 25-Feb. 5, 2021; Source: OPPO; Title: HARQ-ACK enhancements for Rel-17 URLLC/IIoT; Agenda Item: 8.3.1.1; Document for: Discussion and Decision.

3GPP TSG RAN WG1 Meeting #104-e; R1-2100226; E-meeting, Jan. 25-Feb. 5, 2021; Agenda Item: 8.3.1.1; Source: Huawei, BUPT, China Southern Power Grid, HiSilicon; Title: UE feedback enhancements for HARQ-ACK; Document for: Discussion and Decision.

3GPP TSG-RAN WG1 Meeting #104-e; R1-2100268; E-meeting, Jan. 25-Feb. 5, 2021; Agenda Item: 8.3.1.1; Source: Ericsson; Title: HARQ-ACK Enhancements for IIoT/URLLC; Document for: Discussion, Decision.

3GPP TSG RAN WG1 Meeting #104-e; R1-2100302; e-Meeting, Jan. 25-Feb. 5, 2021; Source : CAICT; Title: UE feedback enhancements for HARQ-ACK; Agenda Item: 8.3.1.1; Document for: Discussion / Decision.

3GPP TSG RAN WG1 #104-e; R1-2100376; e-Meeting, Jan. 25-Feb. 5, 2021; Source: CATT; Title: UE feedback enhancements for HARQ-ACK; Agenda Item: 8.3.1.1; Document for: Discussion and Decision.

3GPP TSG RAN WG1#104-e; R1-2100436; e-Meeting, Jan. 25-Feb. 5, 2020; Source: vivo; Title: HARQ-ACK enhancements for Rel-17 URLLC; Agenda Item: 8.3.1.1; Document for: Discussion and Decision.

3GPP TSG RAN WG1 Meeting #104-e; R1-2100574; e-Meeting, Jan. 25-Feb. 5, 2021; Agenda Item: 8.3.1.1; Source: MediaTek Inc.; Title: On UE feedback enhancements for HARQ-ACK; Document for: Discussion and Decision.

3GPP TSG RAN WG1 #104-e; R1-2100649; e-Meeting, Jan. 25-Feb. 5, 2021; Source: Intel Corporation; Title: UE HARQ feedback enhancements for URLLC/IIoT; Agenda item: 8.3.1.1; Document for: Discussion and Decision.

3GPP TSG RAN WG1 #104-e; R1-2100728; e-Meeting, Jan. 25-Feb. 5, 2020; Agenda item: 8.3.1.1; Source: Nokia, Nokia Shanghai Bell; Title: HARQ-ACK Feedback Enhancements for URLLC/IIoT; Document for: Discussion and Decision.

3GPP TSG RAN WG1 #104-e; R1-2100803; e-Meeting, Jan. 25-Feb. 5, 2021; Agenda item: 8.3.1.1; Source: Spreadtrum Communications; Title: Discussion on physical Layer feedback enhancements; Document for: Discussion and decision.

3GPP TSG RAN WG1 #104-e; R1-2100855; e-Meeting, Jan. 25-Feb. 5, 2021; Agenda Item: 8.3.1.1; Source: Sony; Title: Considerations on HARQ-ACK enhancements for URLLC; Document for: Discussion / decision.

3GPP TSG RAN WG1 #104-e; R1-2100880; e-Meeting, Jan. 25-Feb. 5, 2021; Agenda Item: 8.3.1.1; Source: LG Electronics; Title: Discussion on UE feedback enhancement for HARQ-ACK; Document for: Discussion and decision.

3GPP TSG RAN WG1 #104; R1-2100911; e-Meeting, Jan. 25-Feb. 5, 2021; Agenda item: 8.3.1.1; Source: China Telecom; Title: Discussion on UE feedback enhancements for HARQ-ACK; Document for: Discussion.

3GPP TSG RAN WG1 #104-e; R1-2100948; e-Meeting, Jan. 25-Feb. 5, 2021; Source: NEC; Title: UE feedback enhancements for HARQ-ACK; Agenda Item: 8.3.1.1; Document for: Discussion and Decision.

3GPP TSG-RAN WG1 Meeting #104-e; R1-2100968; e-Meeting, Jan. 25-Feb. 5, 2021; Source: Asia Pacific Telecom, FGI; Title: Discussion on UE feedback enhancements for HARQ-ACK; Agenda item: 8.3.1.1; Document for: Discussion and Decision.

3GPP TSG RAN WG1 #104-e; R1-2100993; e-Meeting, Jan. 25-Feb. 5, 2021; Agenda item: 8.3.1.1; Source: Lenovo, Motorola Mobility; Title: HARQ-ACK feedback enhancement for IIoT/URLLC; Document for: Discussion and Decision.

3GPP TSG RAN WG1 #104-e; R1-2101013; e-Meeting, Jan. 25-Feb. 5, 2021; Source: Panasonic; Title: Discussion on UE feedback enhancements for HARQ-ACK; Agenda Item: 8.3.1.1; Document for: Discussion.

3GPP TSG RAN WG1 #104-e; R1-2101039; e-Meeting, Jan. 25-Feb. 5, 2021; Agenda item: 8.3.1.1; Title: Discussion on UE feedback enhancements for HARQ-ACK; Source: CMCC; Document for: Discussion and Decision.

3GPP TSG RAN WG1 #104-e; R1-2101075; e-Meeting, Jan. 25-Feb. 5, 2021; Source: ETRI; Title: UE feedback enhancements for HARQ-ACK; Agenda Item: 8.3.1.1 UE feedback enhancements for HARQ-ACK; Document for: Discussion.

3GPP TSG RAN WG1#104-e; R1-2101114; e-Meeting, Jan. 25-Feb. 5, 2021; Source: Xiaomi; Title: UE feedback enhancements for HARQ-ACK; Agenda Item: 8.3.1.1; Document for: Discussion and Decision.

3GPP TSG RAN WG1 #104-e; R1-2101201; e-Meeting, Jan. 25-Feb. 5, 2021; Agenda Item: 8.3.1.1; Source: Samsung; Title: On HARQ-ACK reporting enhancements; Document for: Discussion and decision.

(56) References Cited

OTHER PUBLICATIONS

3GPP TSG RAN WG1 #104-e; R1-2101290; e-Meeting, Jan. 25-Feb. 5, 2021; Agenda Item: 8.3.1.1; Source: InterDigital, Inc.; Title: HARQ-ACK enhancements for IIoT and URLLC; Document for: Discussion.
3GPP TSG- RAN WG1 Meeting #104-e; R1-2101378; e-Meeting, Jan. 25-Feb. 5, 2021; Agenda Item: 8.3.1.1; Source: Apple Inc.; Title: Discussion on UE feedback enhancements for HARQ-ACK; Document for: Discussion/Decision.
3GPP TSG RAN WG1 #104-e; R1-2101459; e-Meeting, Jan. 25-Feb. 5, 2021; Agenda item: 8.3.1.1; Source: Qualcomm Incorporated; Title: HARQ-ACK enhancement for IOT and URLLC; Document for: Discussion/Decision.
3GPP TSG RAN WG1#103-e; R1-2101539; e-Meeting, Jan. 25-Feb. 5, 2021; Source: Sharp; Title: UE feedback enhancements for HARQ-ACK; Agenda Item: 8.3.1.1; Document for: Discussion and Decision.
3GPP TSG RAN WG1 #104-e; R1-2101612; e-Meeting, Jan. 25-Feb. 5, 2021; Source: NTT DOCOMO, Inc.; Title: Discussion on HARQ-ACK feedback enhancements for Rel.17 URLLC; Agenda Item: 8.3.1.1; Document for: Discussion and Decision.
3GPP TSG RAN WG1 #104-e; R1-2101675; e-Meeting, Jan. 25-Feb. 5, 2021; Source: Wilus Inc.; Title: Discussion on HARQ-ACK enhancement for URLLC/IIoT; Agenda item: 8.3.1.1; Document for: Discussion/Decision.
3GPP TSG RAN WG1 Meeting #104bis-e; R1-2102351; E-meeting, Apr. 12-Apr. 20, 2021; Agenda Item: 8.3.1.1; Source: Huawei, China Southern Power Grid, BUPT, HiSilicon; Title: UE feedback enhancements for HARQ-ACK; Document for: Discussion and Decision.
E-Meeting, Apr. 12-20, 2021; Source: OPPO; Title: HARQ-ACK enhancements for Rel-17 URLLC/IIoT; Agenda Item: 8.3.1.1; Document for: Discussion and Decision.
3GPP TSG RAN WG1 #104b-e; R1-2102454; e-Meeting, Apr. 12-Apr. 20, 2021; Agenda item: 8.3.1.1; Source: Spreadtrum Communications; Title: Discussion on HARQ-ACK feedback enhancements; Document for: Discussion and decision.
3GPP TSG RAN WG1 Meeting #104b-e; R1-2102493; e-Meeting, Apr. 12-20, 2021; Source: ZTE; Title: Discussion on HARQ-ACK enhancements for eURLLC; Agenda item: 8.3.1.1; Document for: Discussion and Decision.
3GPP TSG RAN WG1#104b-e; R1-2102521; e-Meeting, Apr. 12-20, 2021; Source: vivo; Title: HARQ-ACK enhancements for Rel-17 URLLC; Agenda Item: 8.3.1.1; Document for: Discussion and Decision.
3GPP TSG RAN WG1 Meeting #104b-e; R1-2102571; e-Meeting, Apr. 12-Apr. 25, 2021; Source: CAICT; Title: UE feedback enhancements for HARQ-ACK; Agenda Item: 8.3.1.1; Document for: Discussion / Decision.
3GPP TSG RAN WG1 #104b-e; R1-2102628; e-Meeting, Apr. 12-20, 2021; Source: CATT; Title: UE feedback enhancements for HARQ-ACK; Agenda Item: 8.3.1.1; Document for: Discussion and Decision.
3GPP TSG RAN WG1 Meeting #104b-e; R1-2102694; e-Meeting, Apr. 12-20, 2021; Agenda Item: 8.3.1.1; Source: MediaTek Inc.; Title: On UE feedback enhancements for HARQ-ACK; Document for: Discussion and Decision.
3GPP TSG-RAN WG1 Meeting #104b-e; R1-2102729; e-Meeting, Apr. 12-20, 2021; Source: Asia Pacific Telecom, FGI; Title: Discussion on UE feedback enhancements for HARQ-ACK; Agenda item: 8.3.1.1; Document for: Discussion and Decision.
3GPP TSG-RAN WG1 Meeting #104-bis-e Tdoc; R1-2102744; e-Meeting, Apr. 12-20, 2021; Agenda Item: 8.3.1.1; Source: Ericsson; Title: HARQ-ACK Enhancements for IIoT/URLLC; Document for: Discussion, Decision.
3GPP TSG RAN WG1 #104-e-bis; R1-2102819; e-Meeting, Apr. 12-20, 2021; Agenda item: 8.3.1.1; Source: Nokia, Nokia Shanghai Bell; Title: HARQ-ACK Feedback Enhancements for URLLC/IIoT; Document for: Discussion and Decision.
3GPP TSG RAN WG1 #104b; R1-2102867; e-Meeting, Apr. 12-20, 2021; Agenda item: 8.3.1.1; Source: China Telecom; Title: Discussion on UE feedback enhancements for HARQ-ACK; Document for: Discussion.
3GPP TSG RAN WG1 #104b-e; R1-2102910; e-Meeting, Apr. 12-20, 2021; Agenda item: 8.3.1.1; Title: Discussion on UE feedback enhancements for HARQ-ACK; Source: CMCC; Document for: Discussion and Decision.
3GPP TSG RAN WG1 Meeting #104bis-e; R1-2102922; e-Meeting, Apr. 12-20, 2021; Agenda Item: 8.3.1.1; Source: TCL Communication; Title: UE feedback enhancements for HARQ-ACK; Document for: Discussion and decision.
3GPP TSG RAN WG1#104b-e; R1-2102982; e-Meeting, Apr. 12-20, 2021; Source: Xiaomi; Title: UE feedback enhancements for HARQ-ACK; Agenda Item: 8.3.1.1; Document for: Discussion and Decision.
3GPP TSG RAN WG1 #104-bis-e; R1-2103027; e-Meeting, Apr. 12-20, 2021; Source: Intel Corporation; Title: Further details on UE HARQ feedback enhancements; Agenda item: 8.3.1.1; Document for: Discussion and Decision.
3GPP TSG- RAN WG1 Meeting #104b-e; R1-2103103; e-Meeting, Apr. 12-20, 2021; Agenda Item: 8.3.1.1; Source: Apple Inc.; Title: Views on URLLC HARQ feedback enhancements; Document for: Discussion/Decision.
3GPP TSG RAN WG1 #104bis; R1-2103163; e-Meeting, Apr. 12-20, 2021; Agenda item: 8.3.1.1; Source: Qualcomm Incorporated; Title: HARQ-ACK enhancement for IOT and URLLC; Document for: Discussion/Decision.
3GPP TSG RAN WG1 #104b-e; R1-2103200; e-Meeting, Apr. 12-20, 2021; Agenda Item: 8.3.1.1; Source: InterDigital, Inc.; Title: HARQ-ACK enhancements for IIoT and URLLC; Document for: Discussion.
3GPP TSG RAN WG1 #104bis-e; R1-2103205; e-Meeting, Apr. 12-20, 2021; Source: Panasonic; Title: Discussion on UE feedback enhancements for HARQ-ACK; Agenda Item: 8.3.1.1; Document for: Discussion.
3GPP TSG RAN WG1 #104b-e; R1-2103236; e-Meeting, Apr. 12-Apr. 20, 2021; Agenda Item: 8.3.1.1; Source: Samsung; Title: On HARQ-ACK reporting enhancements; Document for: Discussion and decision.
3GPP TSG RAN WG1 #104bis-e; R1-2103300; e-Meeting, Apr. 12-Apr. 20, 2021; Agenda Item: 8.3.1.1; Source: Sony; Title: Considerations on HARQ-ACK enhancements for URLLC; Document for: Discussion / decision.
3GPP TSG RAN WG1 #104b-e; R1-2103325; e-Meeting, Apr. 12-20, 2021; Source: ETRI; Title: UE feedback enhancements for HARQ-ACK; Agenda Item: 8.3.1.1 UE feedback enhancements for HARQ-ACK; Document for: Discussion.
3GPP TSG RAN WG1 #104b-e; R1-2103347; e-Meeting, Apr. 12-20, 2021; Agenda Item: 8.3.1.1; Source: LG Electronics; Title: Discussion on UE feedback enhancement for HARQ-ACK; Document for: Discussion and decision.
3GPP TSG RAN WG1#104-bis-e; R1-2103473; e-Meeting, Apr. 12-Apr. 20, 2021; Source: Sharp; Title: UE feedback enhancements for HARQ-ACK; Agenda Item: 8.3.1.1; Document for: Discussion and Decision.
3GPP TSG RAN WG1 #104b-e; R1-2103527; e-Meeting, Apr. 12-20, 2021; Source: NEC; Title: UE feedback enhancements for HARQ-ACK; Agenda Item: 8.3.1.1; Document for: Discussion and Decision.
3GPP TSG RAN WG1 #104b-e; R1-2103574; e-Meeting, Apr. 12-20, 2021; Source: NTT DOCOMO, Inc.; Title: Discussion on HARQ-ACK feedback enhancements for Rel.17 URLLC; Agenda Item: 8.3.1.1; Document for: Discussion and Decision.
3GPP TSG RAN WG1 #104bis-e; R1-2103610; e-Meeting, Apr. 12-Apr. 20, 2021; Agenda item: 8.3.1.1; Source: Lenovo, Motorola Mobility; Title: HARQ-ACK feedback enhancement for IIoT/URLLC; Document for: Discussion and Decision.
3GPP TSG RAN WG1 #104b-e; R1-2103695; e-Meeting, Apr. 12-20, 2021; Source: Wilus Inc.; Title: Discussion on HARQ-ACK

(56) References Cited

OTHER PUBLICATIONS enhancement for URLLC/IIoT; Agenda item: 8.3.1.1; Document for: Discussion/Decision.

* cited by examiner

TRANSMISSION OR DROPPING OF A DEFERRED HARQ FEEDBACK

CROSS-REFERENCE TO RELATED APPLICATIONS

This application is a continuation of U.S. application Ser. No. 17/722,426, filed Apr. 18, 2022, which claims the benefit of U.S. Provisional Application No. 63/180,786, filed Apr. 28, 2021, which is hereby incorporated by reference in its entirety.

DETAILED DESCRIPTION

The exemplary embodiments of the disclosed technology enable processes for a wireless device and/or one or more base stations for HARQ feedback. The exemplary disclosed embodiments may be implemented in the technical field of wireless communication systems. More particularly, the embodiments of the disclosed technology may enhance processes associated with HARQ feedback when HARQ feedback is deferred.

The devices and/or nodes of the mobile communications system disclosed herein may be implemented based on various technologies and/or various releases/versions/amendments of a technology. The various technologies include various releases of long-term evolution (LTE) technologies, various releases of 5G new radio (NR) technologies, various wireless local area networks technologies and/or a combination thereof and/or alike. For example, a base station may support a given technology and may communicate with wireless devices with different characteristics. The wireless devices may have different categories that define their capabilities in terms of supporting various features. The wireless device with the same category may have different capabilities. The wireless devices may support various technologies such as various releases of LTE technologies, various releases of 5G NR technologies and/or a combination thereof and/or alike. At least some of the wireless devices in the mobile communications system of the present disclosure may be stationary or almost stationary.

In this disclosure, the terms "mobile communications system" and "wireless communications system" may be used interchangeably.

Figure 1A:
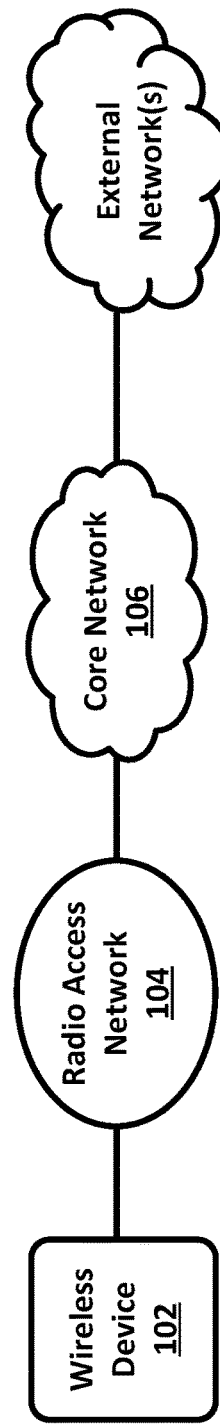
FIG. 1A and FIG. 1B show examples of mobile communications systems in accordance with several of various embodiments of the present disclosure.

FIG. 1A shows an example of a mobile communications system 100 in accordance with several of various embodiments of the present disclosure. The mobile communications system 100 may be, for example, run by a mobile network operator (MNO) or a mobile virtual network operator (MVNO). The mobile communications system 100 may be a public land mobile network (PLMN) run by a network operator providing a variety of service including voice, data, short messaging service (SMS), multimedia messaging service (MMS), emergency calls, etc. The mobile communications system 100 includes a core network (CN) 106, a radio access network (RAN) 104 and at least one wireless device 102.

The CN 106 connects the RAN 104 to one or more external networks (e.g., one or more data networks such as the Internet) and is responsible for functions such as authentication, charging and end-to-end connection establishment. Several radio access technologies (RATs) may be served by the same CN 106.

The RAN 104 may implement a RAT and may operate between the at least one wireless device 102 and the CN 106. The RAN 104 may handle radio related functionalities such as scheduling, radio resource control, modulation and coding, multi-antenna transmissions and retransmission protocols. The wireless device and the RAN may share a portion of the radio spectrum by separating transmissions from the wireless device to the RAN and the transmissions from the RAN to the wireless device. The direction of the transmissions from the wireless device to the RAN is known as the uplink and the direction of the transmissions from the RAN to the wireless device is known as the downlink. The separation of uplink and downlink transmissions may be achieved by employing a duplexing technique. Example duplexing techniques include frequency division duplexing (FDD), time division duplexing (TDD) or a combination of FDD and TDD.

In this disclosure, the term wireless device may refer to a device that communicates with a network entity or another device using wireless communication techniques. The wireless device may be a mobile device or a non-mobile (e.g., fixed) device. Examples of the wireless device include cellular phone, smart phone, tablet, laptop computer, wearable device (e.g., smart watch, smart shoe, fitness trackers, smart clothing, etc.), wireless sensor, wireless meter, extended reality (XR) devices including augmented reality (AR) and virtual reality (VR) devices, Internet of Things (IoT) device, vehicle to vehicle communications device, road-side units (RSU), automobile, relay node or any combination thereof. In some examples, the wireless device (e.g., a smart phone, tablet, etc.) may have an interface (e.g., a graphical user interface (GUI)) for configuration by an end user. In some examples, the wireless device (e.g., a wireless sensor device, etc.) may not have an interface for configuration by an end user. The wireless device may be referred to as a user equipment (UE), a mobile station (MS), a subscriber unit, a handset, an access terminal, a user terminal, a wireless transmit and receive unit (WTRU) and/or other terminology.

The at least one wireless device may communicate with at least one base station in the RAN 104. In this disclosure, the term base station may encompass terminologies associated with various RATs. For example, a base station may be referred to as a Node B in a 3G cellular system such as Universal Mobile Telecommunication Systems (UMTS), an evolved Node B (eNB) in a 4G cellular system such as evolved universal terrestrial radio access (E-UTRA), a next generation eNB (ng-eNB), a Next Generation Node B (gNB) in NR and/or a 5G system, an access point (AP) in Wi-Fi and/or other wireless local area networks. A base station may be referred to as a remote radio head (RRH), a baseband unit (BBU) in connection with one or more RRHs, a repeater or relay for coverage extension and/or any combination thereof. In some examples, all protocol layers of a base station may be implemented in one unit. In some examples, some of the protocol layers (e.g., upper layers) of the base station may be implemented in a first unit (e.g., a central unit (CU)) and some other protocol layer (e.g., lower layers) may be implemented in one or more second units (e.g., distributed units (DUs)).

A base station in the RAN 104 includes one or more antennas to communicate with the at least one wireless device. The base station may communicate with the at least one wireless device using radio frequency (RF) transmissions and receptions via RF transceivers. The base station antennas may control one or more cells (or sectors). The size and/or radio coverage area of a cell may depend on the range that transmissions by a wireless device can be successfully received by the base station when the wireless device transmits using the RF frequency of the cell. The base station may be associated with cells of various sizes. At a given location, the wireless device may be in coverage area of a first cell of the base station and may not be in coverage area of a second cell of the base station depending on the sizes of the first cell and the second cell.

A base station in the RAN 104 may have various implementations. For example, a base station may be implemented by connecting a BBU (or a BBU pool) coupled to one or more RRHs and/or one or more relay nodes to extend the cell coverage. The BBU pool may be located at a centralized site like a cloud or data center. The BBU pool may be connected to a plurality of RRHs that control a plurality of cells. The combination of BBU with the one or more RRHs may be referred to as a centralized or cloud RAN (C-RAN) architecture. In some implementations, the BBU functions may be implemented on virtual machines (VMs) on servers at a centralized location. This architecture may be referred to as virtual RAN (vRAN). All, most or a portion of the protocol layer functions (e.g., all or portions of physical layer, medium access control (MAC) layer and/or higher layers) may be implemented at the BBU pool and the processed data may be transmitted to the RRHs for further processing and/or RF transmission. The links between the BBU pool and the RRHs may be referred to as fronthaul.

In some deployment scenarios, the RAN 104 may include macrocell base stations with high transmission power levels and large coverage areas. In other deployment scenarios, the RAN 104 may include base stations that employ different transmission power levels and/or have cells with different coverage areas. For example, some base station may be macrocell base stations with high transmission powers and/or large coverage areas and other base station may be small cell base stations with comparatively smaller transmission powers and/or coverage areas. In some deployment scenarios, a small cell base station may have coverage that is within or has overlap with coverage area of a macrocell base station. A wireless device may communicate with the macrocell base station while within the coverage area of the macrocell base station. For additional capacity, the wireless device may communicate with both the macrocell base station and the small cell base station while in the overlapped coverage area of the macrocell base station and the small cell base station. Depending on their coverage areas, a small cell base station may be referred to as a microcell base station, a picocell base station, a femtocell base station or a home base station.

Different standard development organizations (SDOs) have specified, or may specify in future, mobile communications systems that have similar characteristics as the mobile communications system 100 of FIG. 1A. For example, the Third-Generation Partnership Project (3GPP) is a group of SDOs that provides specifications that define 3GPP technologies for mobile communications systems that are akin to the mobile communications system 100. The 3GPP has developed specifications for third generation (3G) mobile networks, fourth generation (4G) mobile networks and fifth generation (5G) mobile networks. The 3G, 4G and 5G networks are also known as Universal Mobile Telecommunications System (UMTS), Long Term Evolution (LTE) and 5G system (5GS), respectively. In this disclosure, embodiments are described with respect to the RAN implemented in a 3GPP 5G mobile network that is also referred to as next generation RAN (NG-RAN). The embodiments may also be implemented in other mobile communications systems such as 3G or 4G mobile networks or mobile networks that may be standardized in future such as sixth generation (6G) mobile networks or mobile networks that are implemented by standards bodies other than 3GPP. The NG-RAN may be based on a new RAT known as new radio (NR) and/or other radio access technologies such as LTE and/or non-3GPP RATs.

Figure 1B:
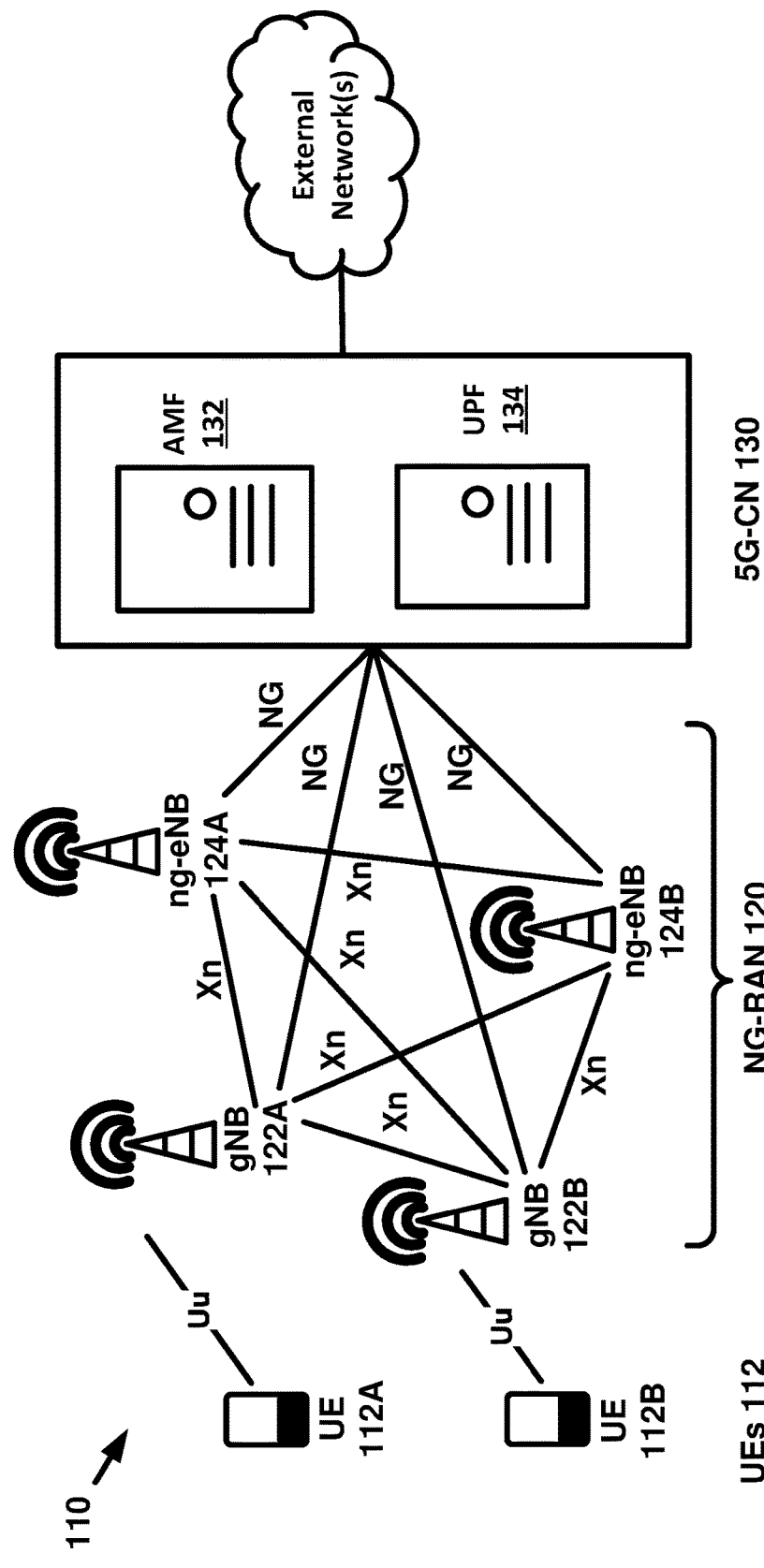

FIG. 1B shows an example of a mobile communications system 110 in accordance with several of various embodiments of the present disclosure. The mobile communications system 110 of FIG. 1B is an example of a 5G mobile network and includes a 5G CN (5G-CN) 130, an NG-RAN 120 and UEs (collectively 112 and individually UE 112A and UE 112B). The 5G-CN 130, the NG-RAN 120 and the UEs 112 of FIG. 1B operate substantially alike the CN 106, the RAN 104 and the at least one wireless device 102, respectively, as described for FIG. 1A.

The 5G-CN 130 of FIG. 1B connects the NG-RAN 120 to one or more external networks (e.g., one or more data networks such as the Internet) and is responsible for functions such as authentication, charging and end-to-end connection establishment. The 5G-CN has new enhancements compared to previous generations of CNs (e.g., evolved packet core (EPC) in the 4G networks) including service-based architecture, support for network slicing and control plane/user plane split. The service-based architecture of the 5G-CN provides a modular framework based on service and functionalities provided by the core network wherein a set of network functions are connected via service-based interfaces. The network slicing enables multiplexing of independent logical networks (e.g., network slices) on the same physical network infrastructure. For example, a network slice may be for mobile broadband applications with full mobility support and a different network slice may be for non-mobile latency-critical applications such as industry automation. The control plane/user plane split enables independent scaling of the control plane and the user plane. For example, the control plane capacity may be increased without affecting the user plane of the network.

The 5G-CN 130 of FIG. 1B includes an access and mobility management function (AMF) 132 and a user plane function (UPF) 134. The AMF 132 may support termination of non-access stratum (NAS) signaling, NAS signaling security such as ciphering and integrity protection, inter-3GPP access network mobility, registration management, connection management, mobility management, access authentication and authorization and security context management. The NAS is a functional layer between a UE and the CN and the access stratum (AS) is a functional layer between the UE and the RAN. The UPF 134 may serve as an interconnect point between the NG-RAN and an external data network. The UPF may support packet routing and forwarding, packet inspection and Quality of Service (QoS) handling and packet filtering. The UPF may further act as a Protocol Data Unit (PDU) session anchor point for mobility within and between RATs.

The 5G-CN 130 may include additional network functions (not shown in FIG. 1B) such as one or more Session Management Functions (SMFs), a Policy Control Function (PCF), a Network Exposure Function (NEF), a Unified Data Management (UDM), an Application Function (AF), and/or an Authentication Server Function (AUSF). These network functions along with the AMF 132 and UPF 134 enable a service-based architecture for the 5G-CN.

The NG-RAN 120 may operate between the UEs 112 and the 5G-CN 130 and may implement one or more RATs. The NG-RAN 120 may include one or more gNBs (e.g., gNB 122A or gNB 122B or collectively gNBs 122) and/or one or more ng-eNBs (e.g., ng-eNB 124A or ng-eNB 124B or collectively ng-eNB s 124). The general terminology for gNB s 122 and/or an ng-eNBs 124 is a base station and may be used interchangeably in this disclosure. The gNBs 122 and the ng-eNBs 124 may include one or more antennas to communicate with the UEs 112. The one or more antennas of the gNB s 122 or ng-eNBs 124 may control one or more cells (or sectors) that provide radio coverage for the UEs 112.

A gNB and/or an ng-eNB of FIG. 1B may be connected to the 5G-CN 130 using an NG interface. A gNB and/or an ng-eNB may be connected with other gNBs and/or ng-eNBs using an Xn interface. The NG or the Xn interfaces are logical connections that may be established using an underlying transport network. The interface between a UE and a gNB or between a UE and an ng-eNBs may be referred to as the Uu interface. An interface (e.g., Uu, NG or Xn) may be established by using a protocol stack that enables data and control signaling exchange between entities in the mobile communications system of FIG. 1B. When a protocol stack is used for transmission of user data, the protocol stack may be referred to as user plane protocol stack. When a protocol stack is used for transmission of control signaling, the protocol stack may be referred to as control plane protocol stack. Some protocol layer may be used in both of the user plane protocol stack and the control plane protocol stack while other protocol layers may be specific to the user plane or control plane.

The NG interface of FIG. 1B may include an NG-User plane (NG-U) interface between a gNB and the UPF 134 (or an ng-eNB and the UPF 134) and an NG-Control plane (NG-C) interface between a gNB and the AMF 132 (or an ng-eNB and the AMF 132). The NG-U interface may provide non-guaranteed delivery of user plane PDUs between a gNB and the UPF or an ng-eNB and the UPF. The NG-C interface may provide services such as NG interface management, UE context management, UE mobility management, transport of NAS messages, paging, PDU session management, configuration transfer and/or warning message transmission.

The UEs 112 and a gNB may be connected using the Uu interface and using the NR user plane and control plane protocol stack. The UEs 112 and an ng-eNB may be connected using the Uu interface using the LTE user plane and control plane protocol stack.

In the example mobile communications system of FIG. 1B, a 5G-CN is connected to a RAN comprised of 4G LTE and/or 5G NR RATs. In other example mobile communications systems, a RAN based on the 5G NR RAT may be connected to a 4G CN (e.g., EPC). For example, earlier releases of 5G standards may support a non-standalone mode of operation where a NR based RAN is connected to the 4G EPC. In an example non-standalone mode, a UE may be connected to both a 5G NR gNB and a 4G LTE eNB (e.g., a ng-eNB) and the control plane functionalities (such as initial access, paging and mobility) may be provided through the 4G LTE eNB. In a standalone of operation, the 5G NR gNB is connected to a 5G-CN and the user plane and the control plane functionalities are provided by the 5G NR gNB.

Figure 2A:
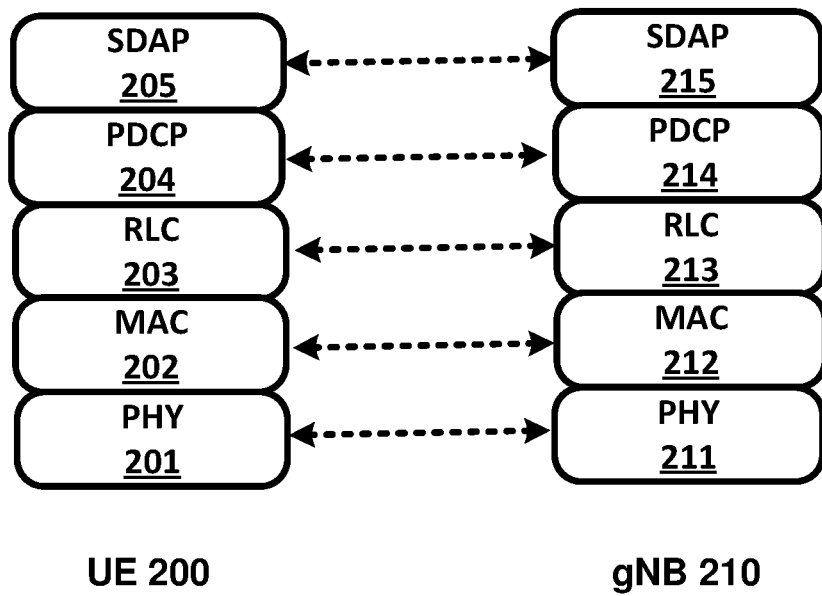
FIG. 2A and FIG. 2B show examples of user plane and control plane protocol layers in accordance with several of various embodiments of the present disclosure.

FIG. 2A shows an example of the protocol stack for the user plan of an NR Uu interface in accordance with several of various embodiments of the present disclosure. The user plane protocol stack comprises five protocol layers that terminate at the UE 200 and the gNB 210. The five protocol layers, as shown in FIG. 2A, include physical (PHY) layer referred to as PHY 201 at the UE 200 and PHY 211 at the gNB 210, medium access control (MAC) layer referred to as MAC 202 at the UE 200 and MAC 212 at the gNB 210, radio link control (RLC) layer referred to as RLC 203 at the UE 200 and RLC 213 at the gNB 210, packet data convergence protocol (PDCP) layer referred to as PDCP 204 at the UE 200 and PDCP 214 at the gNB 210, and service data application protocol (SDAP) layer referred to as SDAP 205 at the UE 200 and SDAP 215 at the gNB 210. The PHY layer, also known as layer 1 (L1), offers transport services to higher layers. The other four layers of the protocol stack (MAC, RLC, PDCP and SDAP) are collectively known as layer 2 (L2).

Figure 2B:
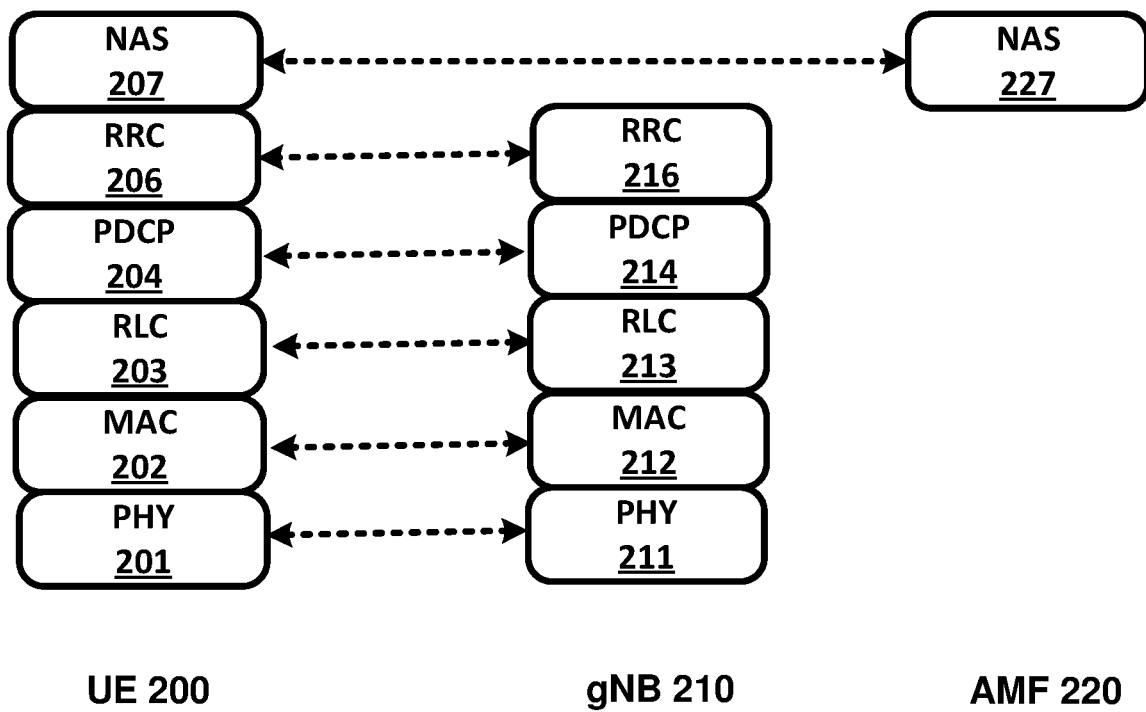

FIG. 2B shows an example of the protocol stack for the control plan of an NR Uu interface in accordance with several of various embodiments of the present disclosure. Some of the protocol layers (PHY, MAC, RLC and PDCP) are common between the user plane protocol stack shown in FIG. 2A and the control plan protocol stack. The control plane protocol stack also includes the RRC layer, referred to as RRC 206 at the UE 200 and RRC 216 at the gNB 210, that also terminates at the UE 200 and the gNB 210. In addition, the control plane protocol stack includes the NAS layer that terminates at the UE 200 and the AMF 220. In FIG. 2B, the NAS layer is referred to as NAS 207 at the UE 200 and NAS 227 at the AMF 220.

Figure 3:
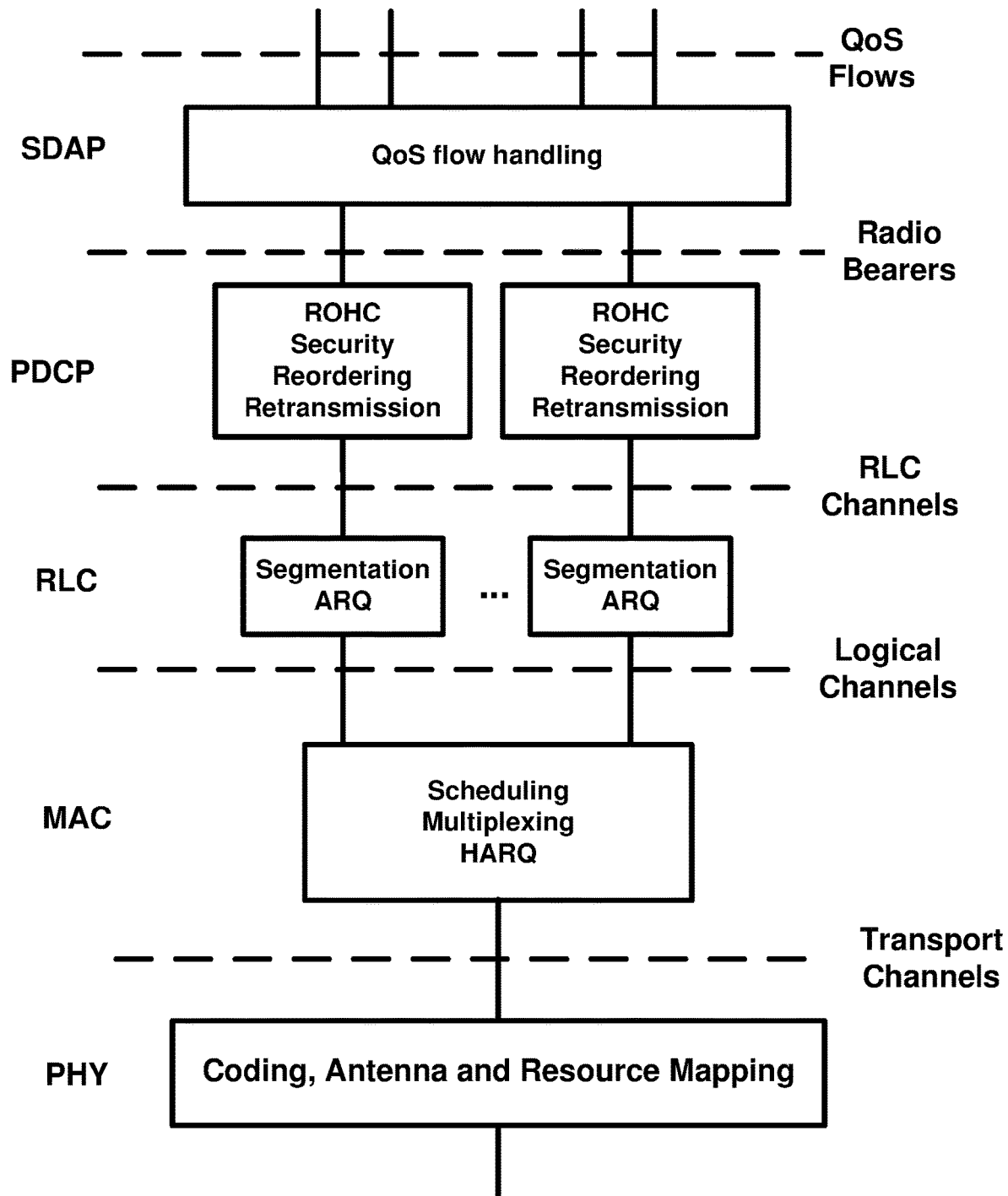
FIG. 3 shows example functions and services offered by protocol layers in a user plane protocol stack in accordance with several of various embodiments of the present disclosure.

FIG. 3 shows example functions and services offered to other layers by a layer in the NR user plane protocol stack of FIG. 2A in accordance with several of various embodiments of the present disclosure. For example, the SDAP layer of FIG. 3 (shown in FIG. 2A as SDAP 205 at the UE side and SDAP 215 at the gNB side) may perform mapping and de-mapping of QoS flows to data radio bearers. The mapping and de-mapping may be based on QoS (e.g., delay, throughput, jitter, error rate, etc.) associated with a QoS flow. A QoS flow may be a QoS differentiation granularity for a PDU session which is a logical connection between a UE 200 and a data network. A PDU session may contain one or more QoS flows. The functions and services of the SDAP layer include mapping and de-mapping between one or more QoS flows and one or more data radio bearers. The SDAP layer may also mark the uplink and/or downlink packets with a QoS flow ID (QFI).

The PDCP layer of FIG. 3 (shown in FIG. 2A as PDCP 204 at the UE side and PDCP 214 at the gNB side) may perform header compression and decompression (e.g., using Robust Header Compression (ROHC) protocol) to reduce the protocol header overhead, ciphering and deciphering and integrity protection and verification to enhance the security over the air interface, reordering and in-order delivery of packets and discarding of duplicate packets. A UE may be configured with one PDCP entity per bearer.

In an example scenario not shown in FIG. 3, a UE may be configured with dual connectivity and may connect to two different cell groups provided by two different base stations. For example, a base station of the two base stations may be referred to as a master base station and a cell group provided by the master base station may be referred to as a master cell group (MCG). The other base station of the two base stations may be referred to as a secondary base station and the cell group provided by the secondary base station may be referred to as a secondary cell group (SCG). A bearer may be configured for the UE as a split bearer that may be handled by the two different cell groups. The PDCP layer may perform routing of packets corresponding to a split bearer to and/or from RLC channels associated with the cell groups.

In an example scenario not shown in FIG. 3, a bearer of the UE may be configured (e.g., with control signaling) with PDCP packet duplication. A bearer configured with PDCP duplication may be mapped to a plurality of RLC channels each corresponding to different one or more cells. The PDCP layer may duplicate packets of the bearer configured with PDCP duplication and the duplicated packets may be mapped to the different RLC channels. With PDCP packet duplication, the likelihood of correct reception of packets increases thereby enabling higher reliability.

The RLC layer of FIG. 3 (shown in FIG. 2A as RLC 203 at the UE side and RLC 213 at the gNB side) provides service to upper layers in the form of RLC channels. The RLC layer may include three transmission modes: transparent mode (TM), Unacknowledged mode (UM) and Acknowledged mode (AM). The RLC layer may perform error correction through automatic repeat request (ARQ) for the AM transmission mode, segmentation of RLC service data units (SDUs) for the AM and UM transmission modes and re-segmentation of RLC SDUs for AM transmission mode, duplicate detection for the AM transmission mode, RLC SDU discard for the AM and UM transmission modes, etc. The UE may be configured with one RLC entity per RLC channel.

The MAC layer of FIG. 3 (shown in FIG. 2A as MAC 202 at the UE side and MAC 212 at the gNB side) provides services to the RLC layer in form of logical channels. The MAC layer may perform mapping between logical channels and transport channels, multiplexing/demultiplexing of MAC SDUs belonging to one or more logical channels into/from transport blocks (TBs) delivered to/from the physical layer on transport channels, reporting of scheduling information, error correction through hybrid automatic repeat request (HARQ), priority handling between UEs by means of dynamic scheduling, priority handling between logical channels of one UE by means of logical channel prioritization and/or padding. In case of carrier aggregation, a MAC entity may comprise one HARQ entity per cell. A MAC entity may support multiple numerologies, transmission timings and cells. The control signaling may configure logical channels with mapping restrictions. The mapping restrictions in logical channel prioritization may control the numerology(ies), cell(s), and/or transmission timing(s)/duration(s) that a logical channel may use.

The PHY layer of FIG. 3 (shown in FIG. 2A as PHY 201 at the UE side and PHY 211 at the gNB side) provides transport services to the MAC layer in form of transport channels. The physical layer may handle coding/decoding, HARQ soft combining, rate matching of a coded transport channel to physical channels, mapping of coded transport channels to physical channels, modulation and demodulation of physical channels, frequency and time synchronization, radio characteristics measurements and indication to higher layers, RF processing, and mapping to antennas and radio resources.

Figure 4:
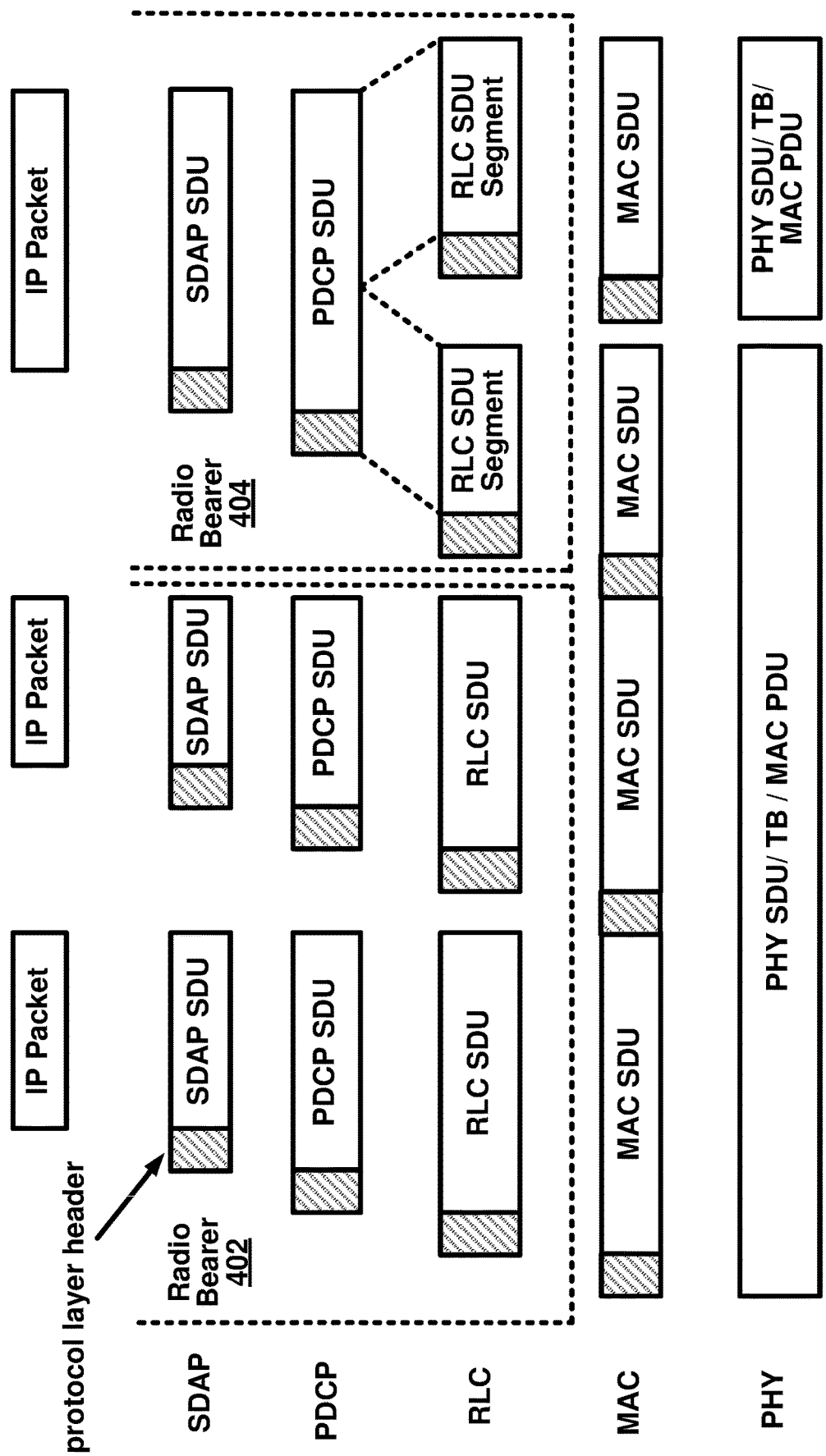
FIG. 4 shows example flow of packets through the protocol layers in accordance with several of various embodiments of the present disclosure.

FIG. 4 shows example processing of packets at different protocol layers in accordance with several of various embodiments of the present disclosure. In this example, three Internet Protocol (IP) packets that are processed by the different layers of the NR protocol stack. The term SDU shown in FIG. 4 is the data unit that is entered from/to a higher layer. In contrast, a protocol data unit (PDU) is the data unit that is entered to/from a lower layer. The flow of packets in FIG. 4 is for downlink. An uplink data flow through layers of the NR protocol stack is similar to FIG. 4. In this example, the two leftmost IP packets are mapped by the SDAP layer (shown as SDAP 205 and SDAP 215 in FIG. 2A) to radio bearer 402 and the rightmost packet is mapped by the SDAP layer to the radio bearer 404. The SDAP layer adds SDAP headers to the IP packets which are entered into the PDCP layer as PDCP SDUs. The PDCP layer is shown as PDCP 204 and PDCP 214 in FIG. 2A. The PDCP layer adds the PDCP headers to the PDCP SDUs which are entered into the RLC layer as RLC SDUs. The RLC layer is shown as RLC 203 and RLC 213 in FIG. 2A. An RLC SDU may be segmented at the RLC layer. The RLC layer adds RLC headers to the RLC SDUs after segmentation (if segmented) which are entered into the MAC layer as MAC SDUs. The MAC layer adds the MAC headers to the MAC SDUs and multiplexes one or more MAC SDUs to form a PHY SDU (also referred to as a transport block (TB) or a MAC PDU).

In FIG. 4, the MAC SDUs are multiplexed to form a transport block. The MAC layer may multiplex one or more MAC control elements (MAC CEs) with zero or more MAC SDUs to form a transport block. The MAC CEs may also be referred to as MAC commands or MAC layer control signaling and may be used for in-band control signaling. The MAC CEs may be transmitted by a base station to a UE (e.g., downlink MAC CEs) or by a UE to a base station (e.g., uplink MAC CEs). The MAC CEs may be used for transmission of information useful by a gNB for scheduling (e.g., buffer status report (BSR) or power headroom report (PHR)), activation/deactivation of one or more cells, activation/deactivation of configured radio resources for or one or more processes, activation/deactivation of one or more processes, indication of parameters used in one or more processes, etc.

Figure 5A:
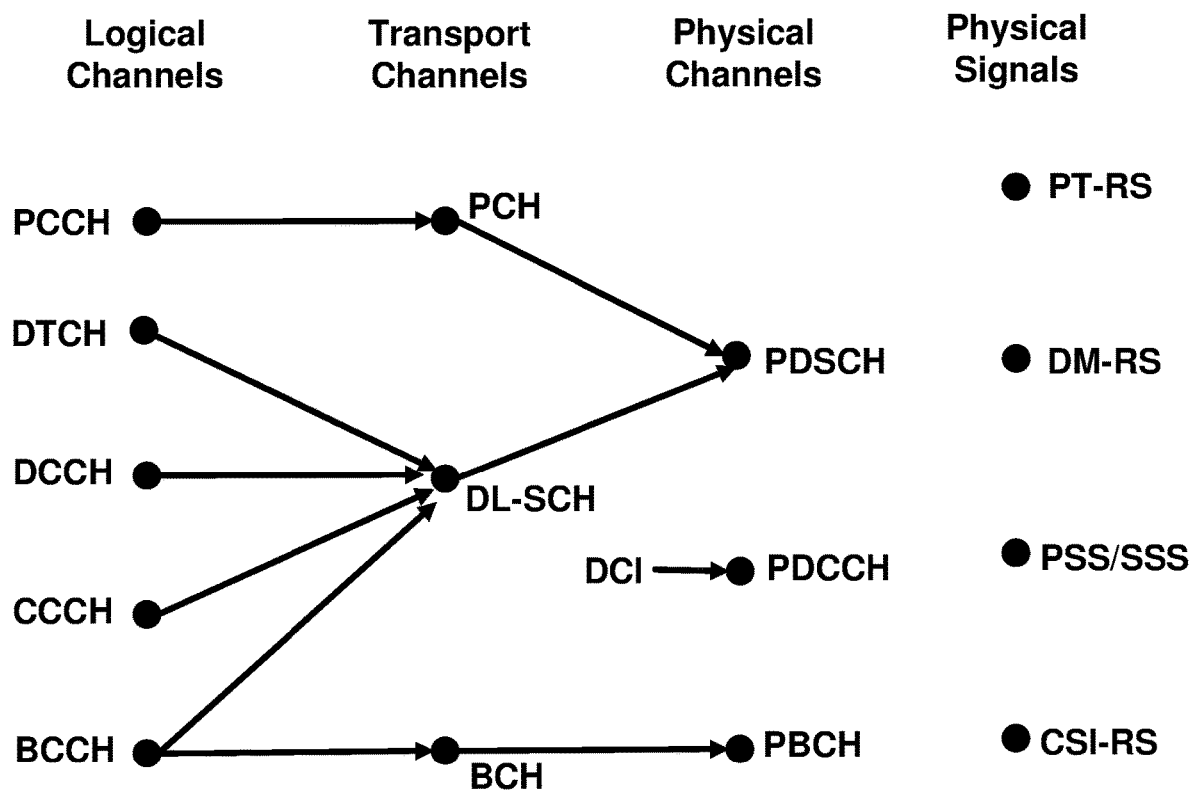
FIG. 5A shows example mapping of channels between layers of the protocol stack and different physical signals in downlink in accordance with several of various embodiments of the present disclosure.
Figure 5B:
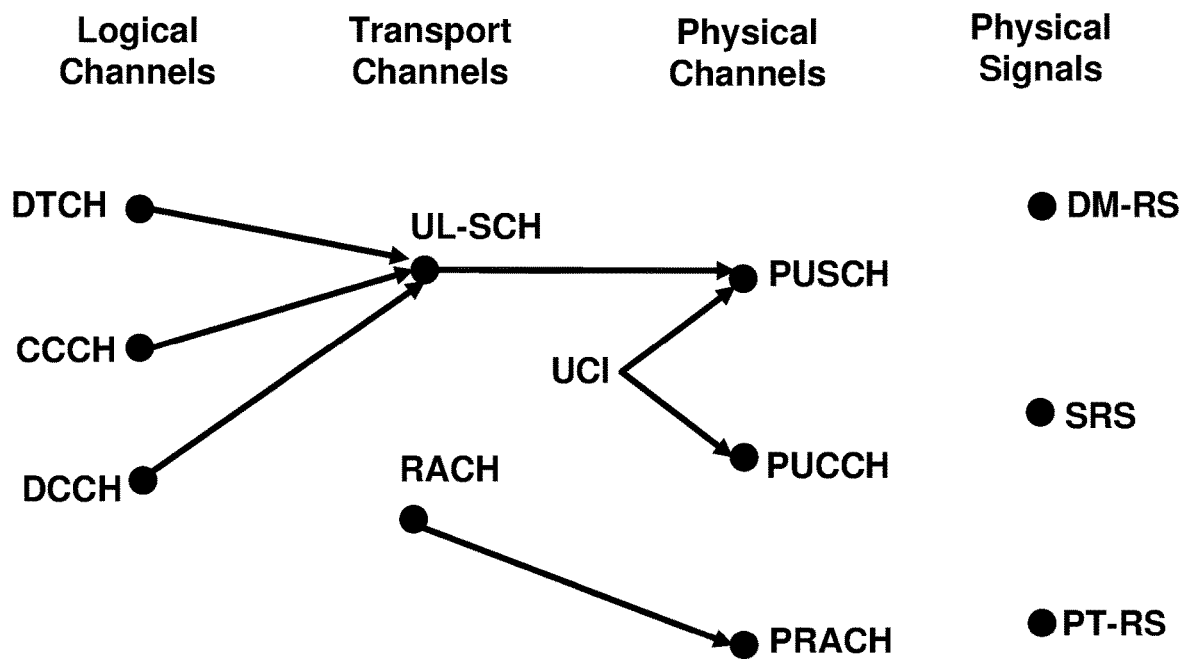
FIG. 5B shows example mapping of channels between layers of the protocol stack and different physical signals in uplink in accordance with several of various embodiments of the present disclosure.

FIG. 5A and FIG. 5B show example mapping between logical channels, transport channels and physical channels for downlink and uplink, respectively in accordance with several of various embodiments of the present disclosure. As discussed before, the MAC layer provides services to higher layer in the form of logical channels. A logical channel may be classified as a control channel, if used for transmission of control and/or configuration information, or a traffic channel if used for transmission of user data. Example logical channels in NR include Broadcast Control Channel (BCCH) used for transmission of broadcast system control information, Paging Control Channel (PCCH) used for carrying paging messages for wireless devices with unknown locations, Common Control Channel (CCCH) used for transmission of control information between UEs and network and for UEs that have no RRC connection with the network, Dedicated Control Channel (DCCH) which is a point-to-point bi-directional channel for transmission of dedicated control information between a UE that has an RRC connection and the network and Dedicated Traffic Channel (DTCH) which is point-to-point channel, dedicated to one UE, for the transfer of user information and may exist in both uplink and downlink.

As discussed before, the PHY layer provides services to the MAC layer and higher layers in the form of transport channels. Example transport channels in NR include Broadcast Channel (BCH) used for transmission of part of the BCCH referred to as master information block (MIB), Downlink Shared Channel (DL-SCH) used for transmission of data (e.g., from DTCH in downlink) and various control information (e.g., from DCCH and CCCH in downlink and part of the BCCH that is not mapped to the BCH), Uplink Shared Channel (UL-SCH) used for transmission of uplink data (e.g., from DTCH in uplink) and control information (e.g., from CCCH and DCCH in uplink) and Paging Channel (PCH) used for transmission of paging information from the PCCH. In addition, Random Access Channel (RACH) is a transport channel used for transmission of random access preambles. The RACH does not carry a transport block. Data on a transport channel (except RACH) may be organized in transport blocks, wherein One or more transport blocks may be transmitted in a transmission time interval (TTI).

The PHY layer may map the transport channels to physical channels. A physical channel may correspond to time-frequency resources that are used for transmission of information from one or more transport channels. In addition to mapping transport channels to physical channels, the physical layer may generate control information (e.g., downlink control information (DCI) or uplink control information (UCI)) that may be carried by the physical channels. Example DCI include scheduling information (e.g., downlink assignments and uplink grants), request for channel state information report, power control command, etc. Example UCI include HARQ feedback indicating correct or incorrect reception of downlink transport blocks, channel state information report, scheduling request, etc. Example physical channels in NR include a Physical Broadcast Channel (PBCH) for carrying information from the BCH, a Physical Downlink Shared Channel (PDSCH) for carrying information form the PCH and the DL-SCH, a Physical Downlink Control Channel (PDCCH) for carrying DCI, a Physical Uplink Shared Channel (PUSCH) for carrying information from the UL-SCH and/or UCI, a Physical Uplink Control Channel (PUCCH) for carrying UCI and Physical Random Access Channel (PRACH) for transmission of RACH (e.g., random access preamble).

The PHY layer may also generate physical signals that are not originated from higher layers. As shown in FIG. 5A, example downlink physical signals include Demodulation Reference Signal (DM-RS), Phase Tracking Reference Signal (PT-RS), Channel State Information Reference Signal (CSI-RS), Primary Synchronization Signal (PSS) and Secondary Synchronization Signal (SSS). As shown in FIG. 5B, example uplink physical signals include DM-RS, PT-RS and sounding reference signal (SRS).

As indicated earlier, some of the protocol layers (PHY, MAC, RLC and PDCP) of the control plane of an NR Uu interface, are common between the user plane protocol stack (as shown in FIG. 2A) and the control plane protocol stack (as shown in FIG. 2B). In addition to PHY, MAC, RLC and PDCP, the control plane protocol stack includes the RRC protocol layer and the NAS protocol layer.

The NAS layer, as shown in FIG. 2B, terminates at the UE 200 and the AMF 220 entity of the 5G-C 130. The NAS layer is used for core network related functions and signaling including registration, authentication, location update and session management. The NAS layer uses services from the AS of the Uu interface to transmit the NAS messages.

The RRC layer, as shown in FIG. 2B, operates between the UE 200 and the gNB 210 (more generally NG-RAN 120) and may provide services and functions such as broadcast of system information (SI) related to AS and NAS as well as paging initiated by the 5G-C 130 or NG-RAN 120. In addition, the RRC layer is responsible for establishment, maintenance and release of an RRC connection between the UE 200 and the NG-RAN 120, carrier aggregation configuration (e.g., addition, modification and release), dual connectivity configuration (e.g., addition, modification and release), security related functions, radio bearer configuration/maintenance and release, mobility management (e.g., maintenance and context transfer), UE cell selection and reselection, inter-RAT mobility, QoS management functions, UE measurement reporting and control, radio link failure (RLF) detection and NAS message transfer. The RRC layer uses services from PHY, MAC, RLC and PDCP layers to transmit RRC messages using signaling radio bearers (SRBs). The SRBs are mapped to CCCH logical channel during connection establishment and to DCCH logical channel after connection establishment.

Figure 6:
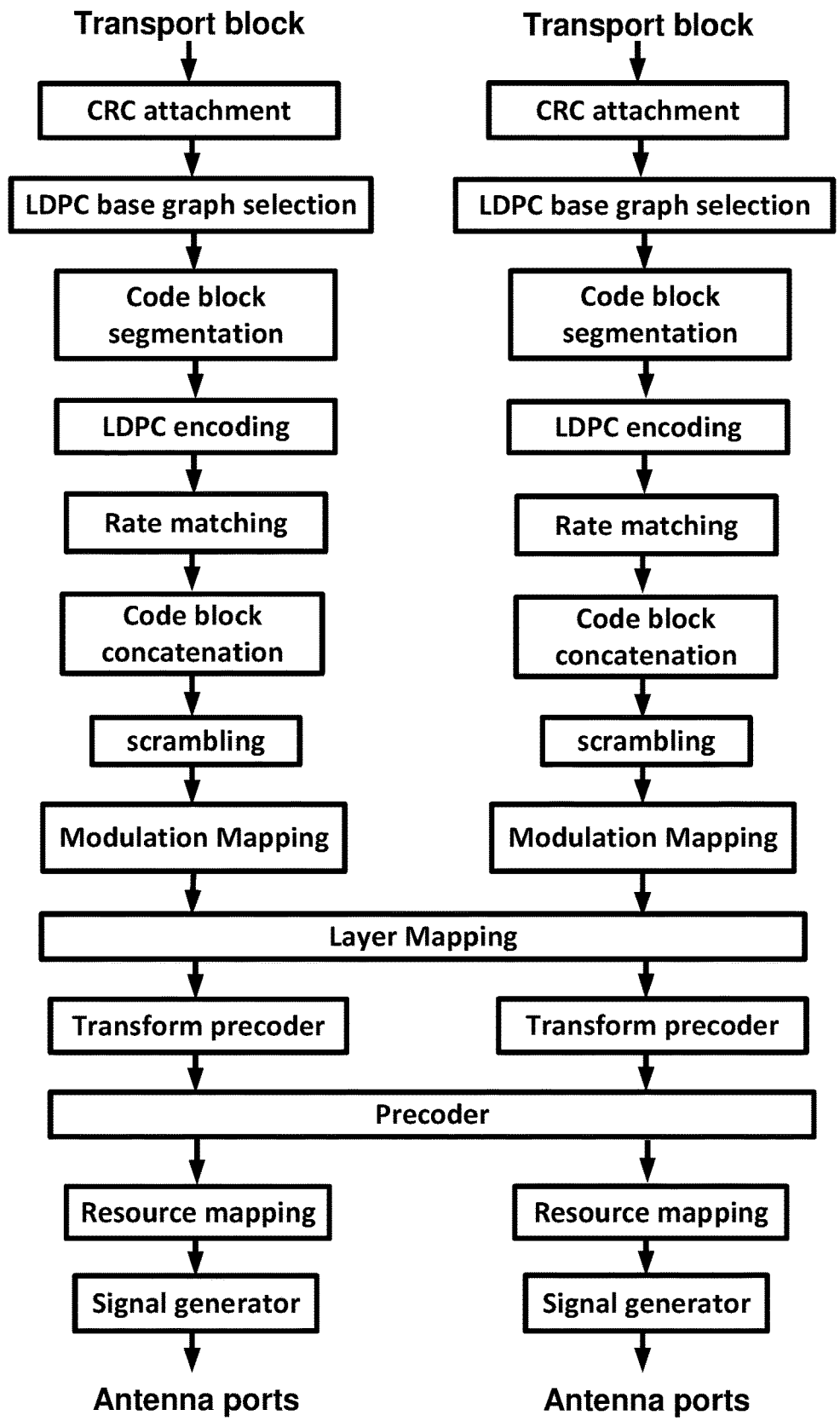
FIG. 6 shows example physical layer processes for signal transmission in accordance with several of various embodiments of the present disclosure.

FIG. 6 shows example physical layer processes for signal transmission in accordance with several of various embodiments of the present disclosure. Data and/or control streams from MAC layer may be encoded/decoded to offer transport and control services over the radio transmission link. For example, one or more (e.g., two as shown in FIG. 6) transport blocks may be received from the MAC layer for transmission via a physical channel (e.g., a physical downlink shared channel or a physical uplink shared channel). A cyclic redundancy check (CRC) may be calculated and attached to a transport block in the physical layer. The CRC calculation may be based on one or more cyclic generator polynomials. The CRC may be used by the receiver for error detection. Following the transport block CRC attachment, a low-density parity check (LDPC) base graph selection may be performed. In example embodiments, two LDPC base graphs may be used wherein a first LDPC base graph may be optimized for small transport blocks and a second LDPC base graph may be optimized for comparatively larger transport blocks.

The transport block may be segmented into code blocks and code block CRC may be calculated and attached to a code block. A code block may be LDPC coded and the LDPC coded blocks may be individually rate matched. The code blocks may be concatenated to create one or more codewords. The contents of a codeword may be scrambled and modulated to generate a block of complex-valued modulation symbols. The modulation symbols may be mapped to a plurality of transmission layers (e.g., multiple-input multiple-output (MIMO) layers) and the transmission layers may be subject to transform precoding and/or precoding. The precoded complex-valued symbols may be mapped to radio resources (e.g., resource elements). The signal generator block may create a baseband signal and up-convert the baseband signal to a carrier frequency for transmission via antenna ports. The signal generator block may employ mixers, filters and/or other radio frequency (RF) components prior to transmission via the antennas. The functions and blocks in FIG. 6 are illustrated as examples and other mechanisms may be implemented in various embodiments.

Figure 7:
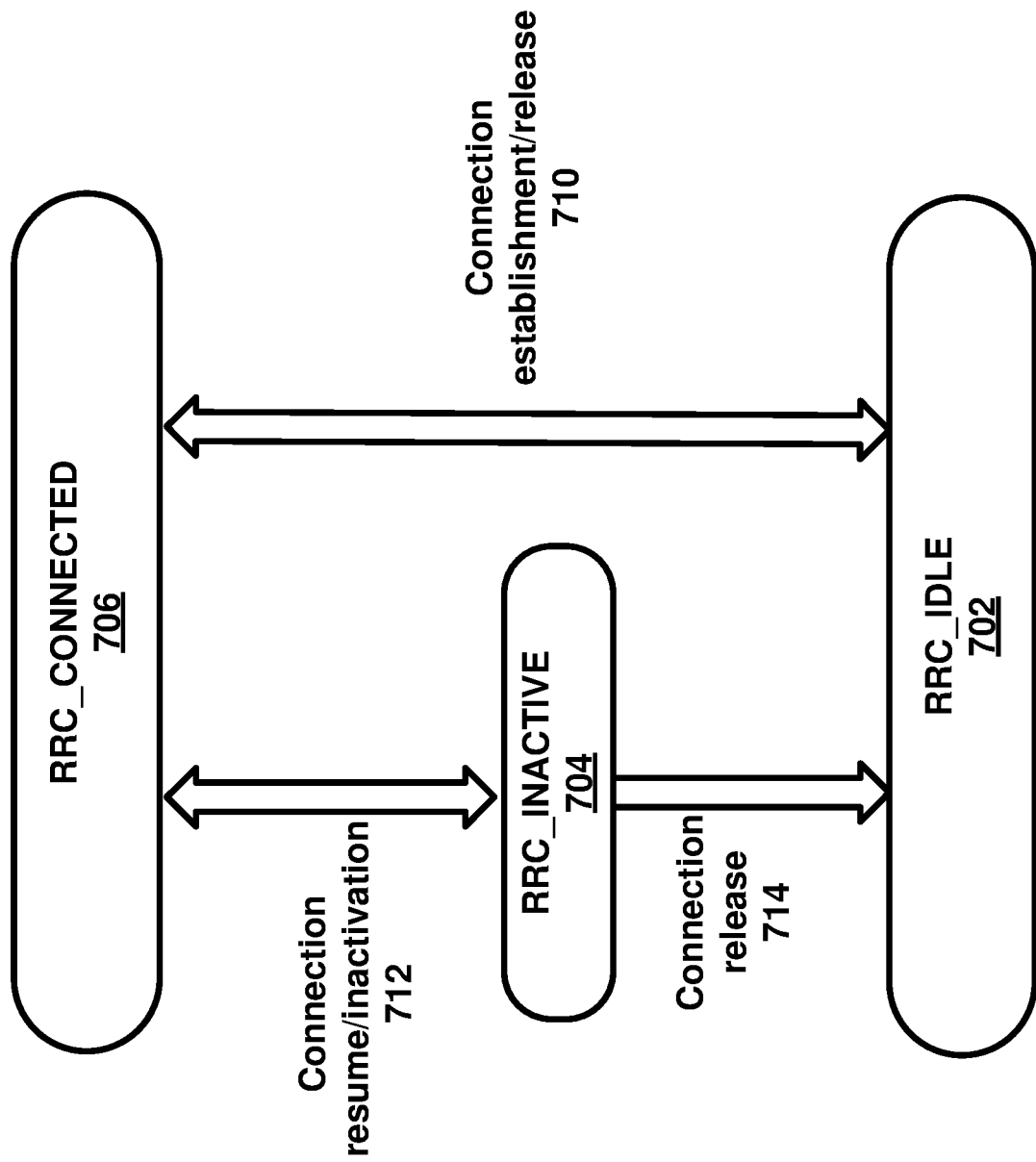
FIG. 7 shows examples of RRC states and RRC state transitions in accordance with several of various embodiments of the present disclosure.

FIG. 7 shows examples of RRC states and RRC state transitions at a UE in accordance with several of various embodiments of the present disclosure. A UE may be in one of three RRC states: RRC_IDLE 702, RRC INACTIVE 704 and RRC_CONNECTED 706. In RRC_IDLE 702 state, no RRC context (e.g., parameters needed for communications between the UE and the network) may be established for the UE in the RAN. In RRC_IDLE 702 state, no data transfer between the UE and the network may take place and uplink synchronization is not maintained. The wireless device may sleep most of the time and may wake up periodically to receive paging messages. The uplink transmission of the UE may be based on a random access process and to enable transition to the RRC_CONNECTED 706 state. The mobility in RRC_IDLE 702 state is through a cell reselection procedure where the UE camps on a cell based on one or more criteria including signal strength that is determined based on the UE measurements.

In RRC_CONNECTED 706 state, the RRC context is established and both the UE and the RAN have necessary parameters to enable communications between the UE and the network. In the RRC_CONNECTED 706 state, the UE is configured with an identity known as a Cell Radio Network Temporary Identifier (C-RNTI) that is used for signaling purposes (e.g., uplink and downlink scheduling, etc.) between the UE and the RAN. The wireless device mobility in the RRC_CONNECTED 706 state is managed by the RAN. The wireless device provides neighboring cells and/or current serving cell measurements to the network and the network may make hand over decisions. Based on the wireless device measurements, the current serving base station may send a handover request message to a neighboring base station and may send a handover command to the wireless device to handover to a cell of the neighboring base station. The transition of the wireless device from the RRC_IDLE 702 state to the RRC_CONNECTED 706 state or from the RRC_CONNECTED 706 state to the RRC_IDLE 702 state may be based on connection establishment and connection release procedures (shown collectively as connection establishment/release 710 in FIG. 7).

To enable a faster transition to the RRC_CONNECTED 706 state (e.g., compared to transition from RRC_IDLE 702 state to RRC_CONNECTED 706 state), an RRC_INACTIVE 704 state is used for an NR UE wherein, the RRC context is kept at the UE and the RAN. The transition from the RRC_INACTIVE 704 state to the RRC_CONNECTED 706 state is handled by RAN without CN signaling. Similar to the RRC_IDLE 702 state, the mobility in RRC_INACTIVE 704 state is based on a cell reselection procedure without involvement from the network. The transition of the wireless device from the RRC_INACTIVE 704 state to the RRC_CONNECTED 706 state or from the RRC_CONNECTED 706 state to the RRC_INACTIVE 704 state may be based on connection resume and connection inactivation procedures (shown collectively as connection resume/inactivation 712 in FIG. 7). The transition of the wireless device from the RRC_INACTIVE 704 state to the RRC_IDLE 702 state may be based on a connection release 714 procedure as shown in FIG. 7.

In NR, Orthogonal Frequency Division Multiplexing (OFDM), also called cyclic prefix OFDM (CP-OFDM), is the baseline transmission scheme in both downlink and uplink of NR and the Discrete Fourier Transform (DFT)

spread OFDM (DFT-s-OFDM) is a complementary uplink transmission in addition to the baseline OFDM scheme. OFDM is multi-carrier transmission scheme wherein the transmission bandwidth may be composed of several narrowband sub-carriers. The subcarriers are modulated by the complex valued OFDM modulation symbols resulting in an OFDM signal. The complex valued OFDM modulation symbols are obtained by mapping, by a modulation mapper, the input data (e.g., binary digits) to different points of a modulation constellation diagram. The modulation constellation diagram depends on the modulation scheme. NR may use different types of modulation schemes including Binary Phase Shift Keying (BPSK), $\pi/2$-BPSK, Quadrature Phase Shift Keying (QPSK), 16 Quadrature Amplitude Modulation (16QAM), 64QAM and 256QAM. Different and/or higher order modulation schemes (e.g., M-QAM in general) may be used. An OFDM signal with N subcarriers may be generated by processing N subcarriers in parallel for example by using Inverse Fast Fourier Transform (IFFT) processing. The OFDM receiver may use FFT processing to recover the transmitted OFDM modulation symbols. The subcarrier spacing of subcarriers in an OFDM signal is inversely proportional to an OFDM modulation symbol duration. For example, for a 15 KHz subcarrier spacing, duration of an OFDM signal is nearly 66.7 µs. To enhance the robustness of OFDM transmission in time dispersive channels, a cyclic prefix (CP) may be inserted at the beginning of an OFDM symbol. For example, the last part of an OFDM symbol may be copied and inserted at the beginning of an OFDM symbol. The CP insertion enhanced the OFDM transmission scheme by preserving subcarrier orthogonality in time dispersive channels.

In NR, different numerologies may be used for OFDM transmission. A numerology of OFDM transmission may indicate a subcarrier spacing and a CP duration for the OFDM transmission. For example, a subcarrier spacing in NR may generally be a multiple of 15 KHz and expressed as $\Delta f = 2^\mu \cdot 15$ KHz ($\mu=0, 1, 2, \ldots$). Example subcarrier spacings used in NR include 15 KHz ($\mu=0$), 30 KHz ($\mu=1$), 60 KHz ($\mu=2$), 120 KHz ($\mu=3$) and 240 KHz ($\mu=4$). As discussed before, a duration of OFDM symbol is inversely proportional to the subcarrier spacing and therefor OFDM symbol duration may depend on the numerology (e.g., the µ value).

Figure 8:
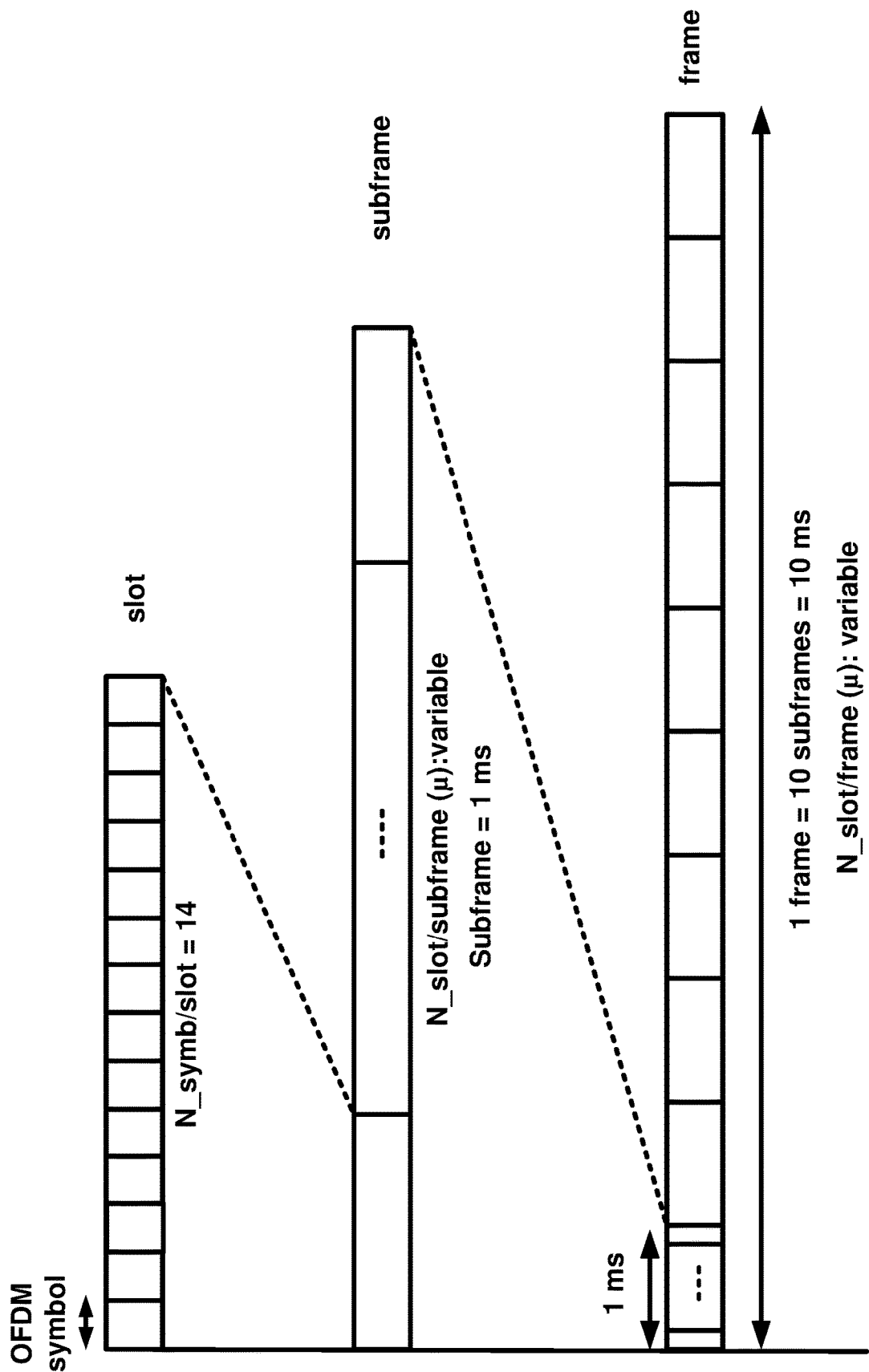
FIG. 8 shows an example time domain transmission structure in NR by grouping OFDM symbols into slots, subframes and frames in accordance with several of various embodiments of the present disclosure.

FIG. 8 shows an example time domain transmission structure in NR wherein OFDM symbols are grouped into slots, subframes and frames in accordance with several of various embodiments of the present disclosure. A slot is a group of $N_{symb}^{slot}$ OFDM symbols, wherein the $N_{symb}^{slot}$ may have a constant value (e.g., 14). Since different numerologies results in different OFDM symbol durations, duration of a slot may also depend on the numerology and may be variable. A subframe may have a duration of 1 ms and may be composed of one or more slots, the number of which may depend on the slot duration. The number of slots per subframe is therefore a function of µ and may generally expressed as $N_{slot}^{subframe,\mu}$ and the number of symbols per subframe may be expressed as $N_{symb}^{subframe,\mu} = N_{symb}^{slot} N_{slot}^{subframe,\mu}$. A frame may have a duration of 10 ms and may consist of 10 subframes. The number of slots per frame may depend on the numerology and therefore may be variable. The number of slots per frame may generally be expressed as $N_{slot}^{frame,\mu}$.

An antenna port may be defined as a logical entity such that channel characteristics over which a symbol on the antenna port is conveyed may be inferred from the channel characteristics over which another symbol on the same antenna port is conveyed. For example, for DM-RS associated with a PDSCH, the channel over which a PDSCH symbol on an antenna port is conveyed may be inferred from the channel over which a DM-RS symbol on the same antenna port is conveyed, for example, if the two symbols are within the same resource as the scheduled PDSCH and/or in the same slot and/or in the same precoding resource block group (PRG). For example, for DM-RS associated with a PDCCH, the channel over which a PDCCH symbol on an antenna port is conveyed may be inferred from the channel over which a DM-RS symbol on the same antenna port is conveyed if, for example, the two symbols are within resources for which the UE may assume the same precoding being used. For example, for DM-RS associated with a PBCH, the channel over which a PBCH symbol on one antenna port is conveyed may be inferred from the channel over which a DM-RS symbol on the same antenna port is conveyed if, for example, the two symbols are within a SS/PBCH block transmitted within the same slot, and with the same block index. The antenna port may be different from a physical antenna. An antenna port may be associated with an antenna port number and different physical channels may correspond to different ranges of antenna port numbers.

Figure 9:
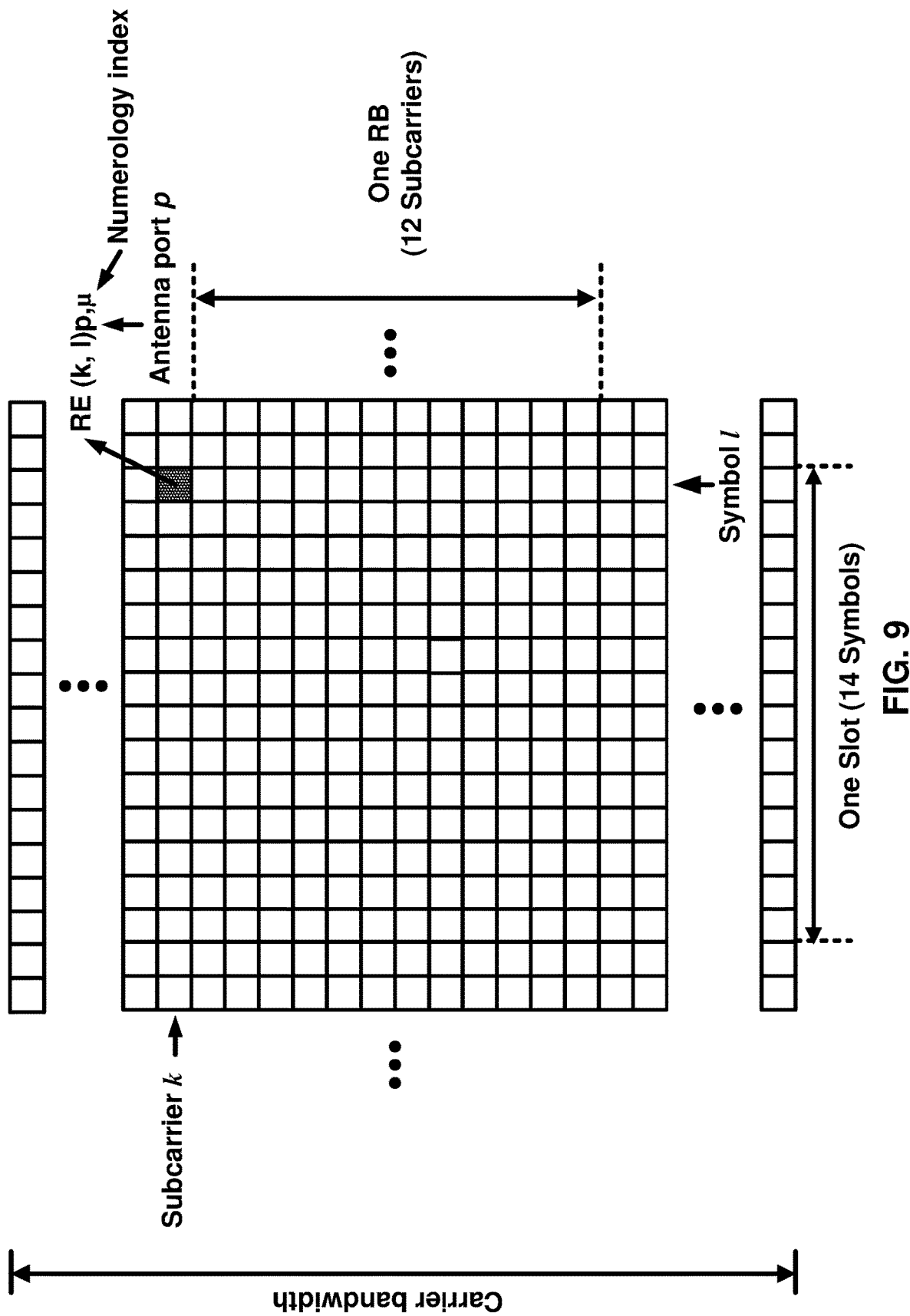
FIG. 9 shows an example of time-frequency resource grid in accordance with several of various embodiments of the present disclosure.

FIG. 9 shows an example of time-frequency resource grid in accordance with several of various embodiments of the present disclosure. The number of subcarriers in a carrier bandwidth may be based on the numerology of OFDM transmissions in the carrier. A resource element, corresponding to one symbol duration and one subcarrier, may be the smallest physical resource in the time-frequency grid. A resource element (RE) for antenna port p and subcarrier spacing configuration µ may be uniquely identified by $(k,l)_{p,\mu}$ where k is the index of a subcarrier in the frequency domain and l may refer to the symbol position in the time domain relative to some reference point. A resource block may be defined as $N_{SC}^{RB}=12$ subcarriers. Since subcarrier spacing depends on the numerology of OFDM transmission, the frequency domain span of a resource block may be variable and may depend on the numerology. For example, for a subcarrier spacing of 15 KHz (e.g., µ=0), a resource block may be 180 KHz and for a subcarrier spacing of 30 KHz (e.g., µ=1), a resource block may be 360 KHz.

With large carrier bandwidths defined in NR and due to limited capabilities for some UEs (e.g., due to hardware limitations), a UE may not support an entire carrier bandwidth. Receiving on the full carrier bandwidth may imply high energy consumption. For example, transmitting downlink control channels on the full downlink carrier bandwidth may result in high power consumption for wide carrier bandwidths. NR may use a bandwidth adaptation procedure to dynamically adapt the transmit and receive bandwidths. The transmit and receive bandwidth of a UE on a cell may be smaller than the bandwidth of the cell and may be adjusted. For example, the width of the transmit and/or receive bandwidth may change (e.g., shrink during period of low activity to save power); the location of the transmit and/or receive bandwidth may move in the frequency domain (e.g., to increase scheduling flexibility); and the subcarrier spacing of the transmit or receive bandwidth may change (e.g., to allow different services). A subset of the cell bandwidth may be referred to as a Bandwidth Part (BWP) and bandwidth adaptation may be achieved by configuring the UE with one or more BWPs. The base station may configure a UE with a set of downlink BWPs and a set of uplink BWPs. A BWP may be characterized by a numerology (e.g., subcarrier spacing and cyclic prefix) and a set of consecutive resource blocks in the numerology of the BWP.

One or more first BWPs of the one or more BWPs of the cell may be active at a time. An active BWP may be an active downlink BWP or an active uplink BWP.

Figure 10:
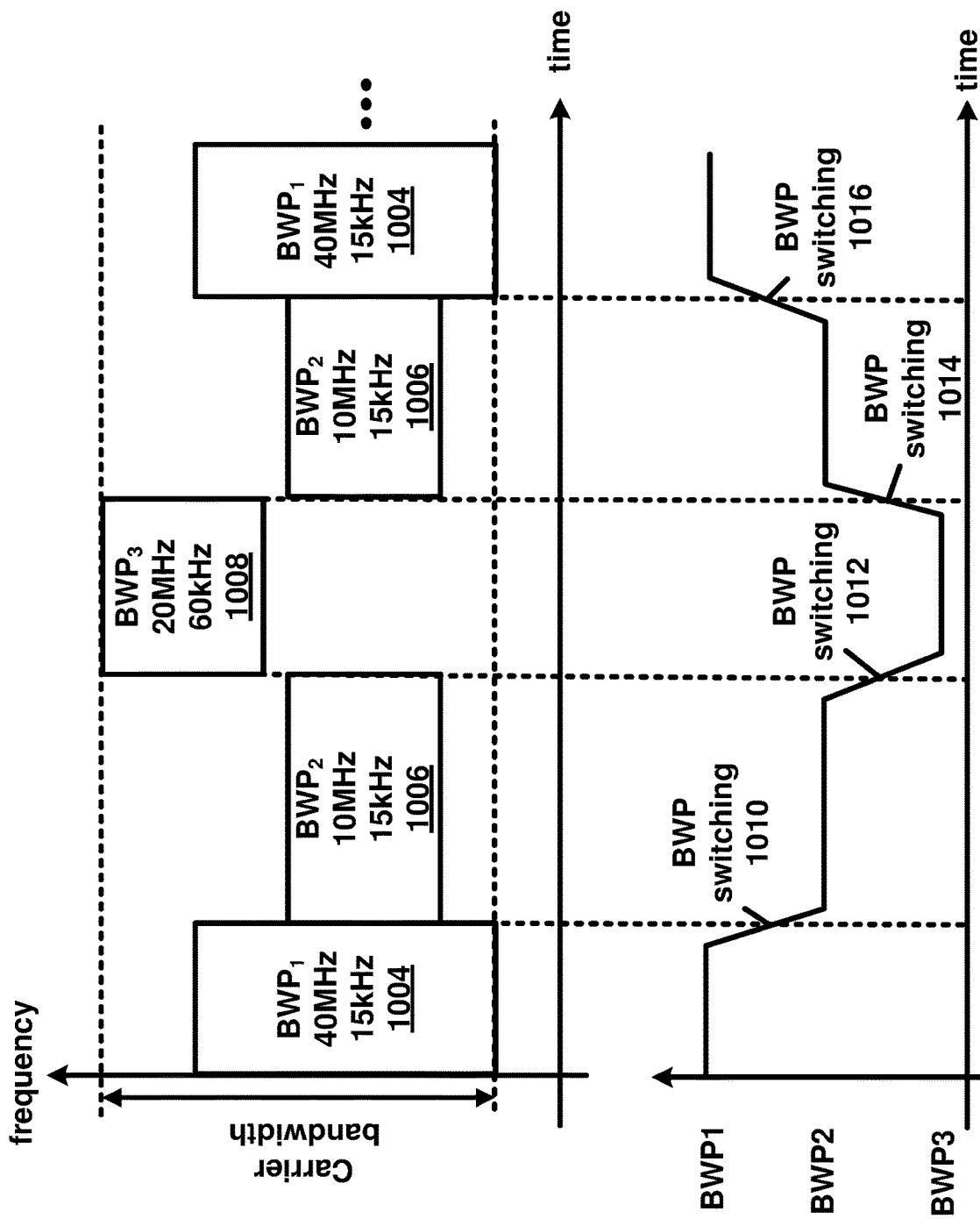
FIG. 10 shows example adaptation and switching of bandwidth parts in accordance with several of various embodiments of the present disclosure.

FIG. 10 shows an example of bandwidth part adaptation and switching. In this example, three BWPs (BWP$_1$ 1004, BWP$_2$ 1006 and BWP$_3$ 1008) are configured for a UE on a carrier bandwidth. The BWP$_1$ is configured with a bandwidth of 40 MHz and a numerology with subcarrier spacing of 15 KHz, the BWP$_2$ is configured with a bandwidth of 10 MHz and a numerology with subcarrier spacing of 15 KHz and the BWP$_3$ is configured with a bandwidth of 20 MHz and a subcarrier spacing of 60 KHz. The wireless device may switch from a first BWP (e.g., BWP$_1$) to a second BWP (e.g., BWP$_2$). An active BWP of the cell may change from the first BWP to the second BWP in response to the BWP switching.

The BWP switching (e.g., BWP switching 1010, BWP switching 1012, BWP switching 1014, or BWP switching 1016 in FIG. 10) may be based on a command from the base station. The command may be a DCI comprising scheduling information for the UE in the second BWP. In case of uplink BWP switching, the first BWP and the second BWP may be uplink BWPs and the scheduling information may be an uplink grant for uplink transmission via the second BWP. In case of downlink BWP switching, the first BWP and the second BWP may be downlink BWPs and the scheduling information may be a downlink assignment for downlink reception via the second BWP.

The BWP switching (e.g., BWP switching 1010, BWP switching 1012, BWP switching 1014, or BWP switching 1016 in FIG. 10) may be based on an expiry of a timer. The base station may configure a wireless device with a BWP inactivity timer and the wireless device may switch to a default BWP (e.g., default downlink BWP) based on the expiry of the BWP inactivity timer. The expiry of the BWP inactivity timer may be an indication of low activity on the current active downlink BWP. The base station may configure the wireless device with the default downlink BWP. If the base station does not configure the wireless device with the default BWP, the default BWP may be an initial downlink BWP. The initial active BWP may be the BWP that the wireless device receives scheduling information for remaining system information upon transition to an RRC_CONNECTED state.

A wireless device may monitor a downlink control channel of a downlink BWP. For example, the UE may monitor a set of PDCCH candidates in configured monitoring occasions in one or more configured COntrol REsource SETs (CORESETs) according to the corresponding search space configurations. A search space configuration may define how/where to search for PDCCH candidates. For example, the search space configuration parameters may comprise a monitoring periodicity and offset parameter indicating the slots for monitoring the PDCCH candidates. The search space configuration parameters may further comprise a parameter indicating a first symbol with a slot within the slots determined for monitoring PDCCH candidates. A search space may be associated with one or more CORESETs and the search space configuration may indicate one or more identifiers of the one or more CORESETs. The search space configuration parameters may further indicate that whether the search space is a common search space or a UE-specific search space. A common search space may be monitored by a plurality of wireless devices and a UE-specific search space may be dedicated to a specific UE.

Figure 11A:
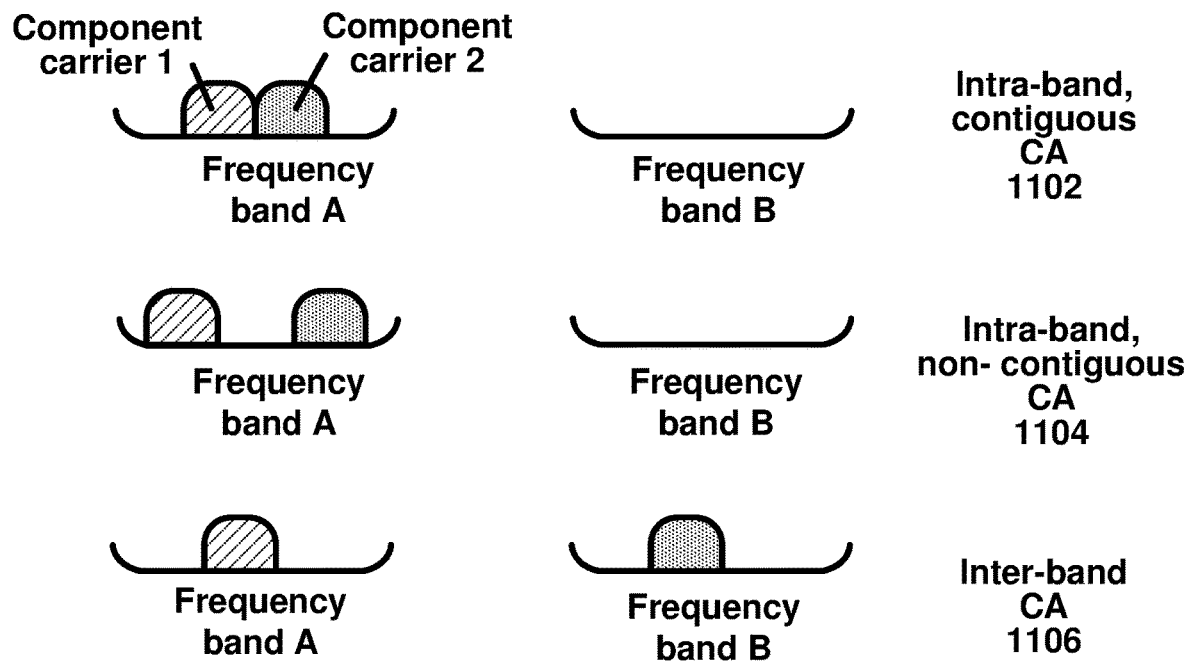
FIG. 11A shows example arrangements of carriers in carrier aggregation in accordance with several of various embodiments of the present disclosure.

FIG. 11A shows example arrangements of carriers in carrier aggregation in accordance with several of various embodiments of the present disclosure. With carrier aggregation, multiple NR component carriers (CCs) may be aggregated. Downlink transmissions to a wireless device may take place simultaneously on the aggregated downlink CCs resulting in higher downlink data rates. Uplink transmissions from a wireless device may take place simultaneously on the aggregated uplink CCs resulting in higher uplink data rates. The component carriers in carrier aggregation may be on the same frequency band (e.g., intra-band carrier aggregation) or on different frequency bands (e.g., inter-band carrier aggregation). The component carriers may also be contiguous or non-contiguous. This results in three possible carrier aggregation scenarios, intra-band contiguous CA 1102, intra-band non-contiguous CA 1104 and inter-band CA 1106 as shown in FIG. 11A. Depending on the UE capability for carrier aggregation, a UE may transmit and/or receive on multiple carriers or for a UE that is not capable of carrier aggregation, the UE may transmit and/or receive on one component carrier at a time. In this disclosure, the carrier aggregation is described using the term cell and a carrier aggregation capable UE may transmit and/or receive via multiple cells.

In carrier aggregation, a UE may be configured with multiple cells. A cell of the multiple cells configured for the UE may be referred to as a Primary Cell (PCell). The PCell may be the first cell that the UE is initially connected to. One or more other cells configured for the UE may be referred to as Secondary Cells (SCells). The base station may configure a UE with multiple SCells. The configured SCells may be deactivated upon configuration and the base station may dynamically activate or deactivate one or more of the configured SCells based on traffic and/or channel conditions. The base station may activate or deactivate configured SCells using a SCell Activation/Deactivation MAC CE. The SCell Activation/Deactivation MAC CE may comprise a bitmap, wherein each bit in the bitmap may correspond to a SCell and the value of the bit indicates an activation status or deactivation status of the SCell.

An SCell may also be deactivated in response to expiry of a SCell deactivation timer of the SCell. The expiry of an SCell deactivation timer of an SCell may be an indication of low activity (e.g., low transmission or reception activity) on the SCell. The base station may configure the SCell with an SCell deactivation timer. The base station may not configure an SCell deactivation timer for an SCell that is configured with PUCCH (also referred to as a PUCCH SCell). The configuration of the SCell deactivation timer may be per configured SCell and different SCells may be configured with different SCell deactivation timer values. The SCell deactivation timer may be restarted based on one or more criteria including reception of downlink control information on the SCell indicating uplink grant or downlink assignment for the SCell or reception of downlink control information on a scheduling cell indicating uplink grant or downlink assignment for the SCell or transmission of a MAC PDU based on a configured uplink grant or reception of a configured downlink assignment.

A PCell for a UE may be an SCell for another UE and a SCell for a UE may be PCell for another UE. The configuration of PCell may be UE-specific. One or more SCells of the multiple SCells configured for a UE may be configured as downlink-only SCells, e.g., may only be used for downlink reception and may not be used for uplink transmission. In case of self-scheduling, the base station may transmit signaling for uplink grants and/or downlink assignments on the same cell that the corresponding uplink or downlink transmission takes place. In case of cross-carrier scheduling, the base station may transmit signaling for uplink grants and/or downlink assignments on a cell different from the cell that the corresponding uplink or downlink transmission takes place.

Figure 11B:
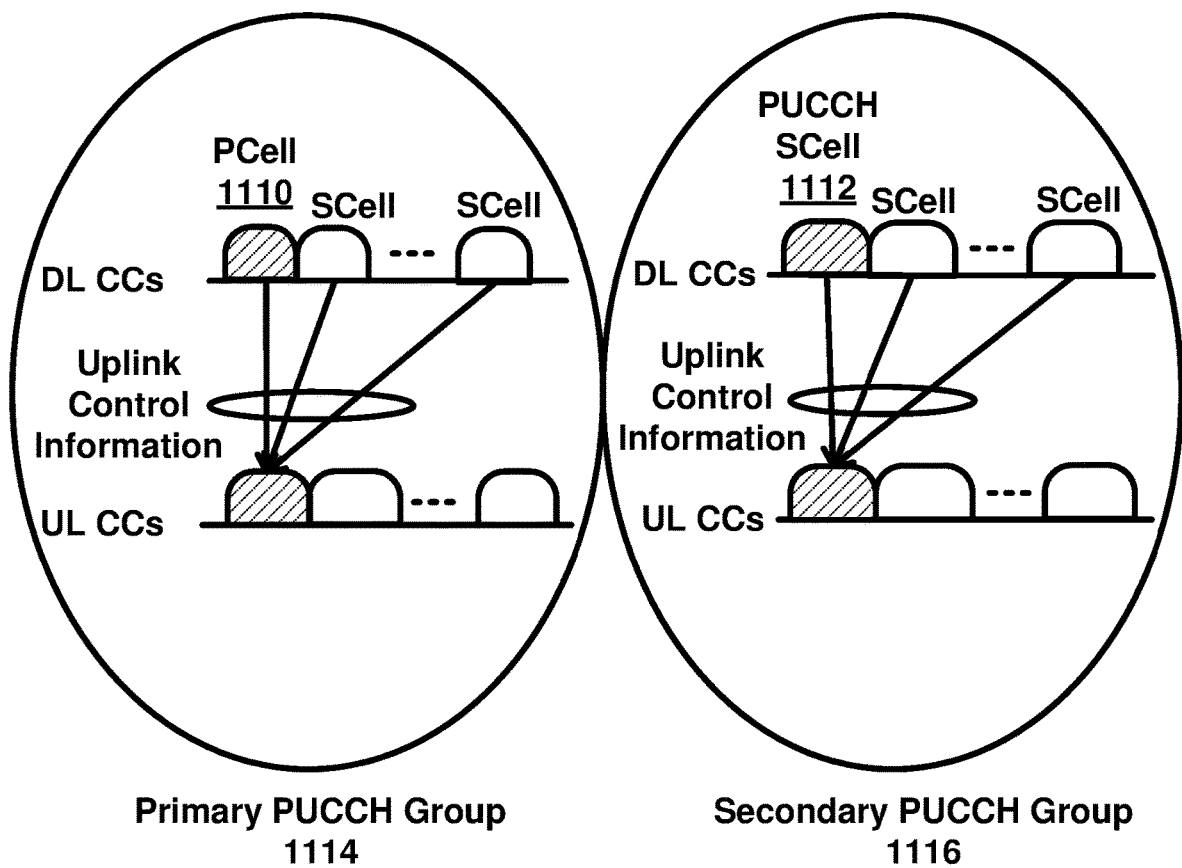
FIG. 11B shows examples of uplink control channel groups in accordance with several of various embodiments of the present disclosure.

FIG. 11B shows examples of uplink control channel groups in accordance with several of various embodiments of the present disclosure. A base station may configure a UE with multiple PUCCH groups wherein a PUCCH group comprises one or more cells. For example, as shown in FIG. 11B, the base station may configure a UE with a primary PUCCH group 1114 and a secondary PUCCH group 1116. The primary PUCCH group may comprise the PCell 1110 and one or more first SCells. First UCI corresponding to the PCell and the one or more first SCells of the primary PUCCH group may be transmitted by the PUCCH of the PCell. The first UCI may be, for example, HARQ feedback for downlink transmissions via downlink CCs of the PCell and the one or more first SCells. The secondary PUCCH group may comprise a PUCCH SCell and one or more second SCells. Second UCI corresponding to the PUCCH SCell and the one or more second SCells of the secondary PUCCH group may be transmitted by the PUCCH of the PUCCH SCell. The second UCI may be, for example, HARQ feedback for downlink transmissions via downlink CCs of the PUCCH SCell and the one or more second SCells.

Figures 12A, 12B, 12C:
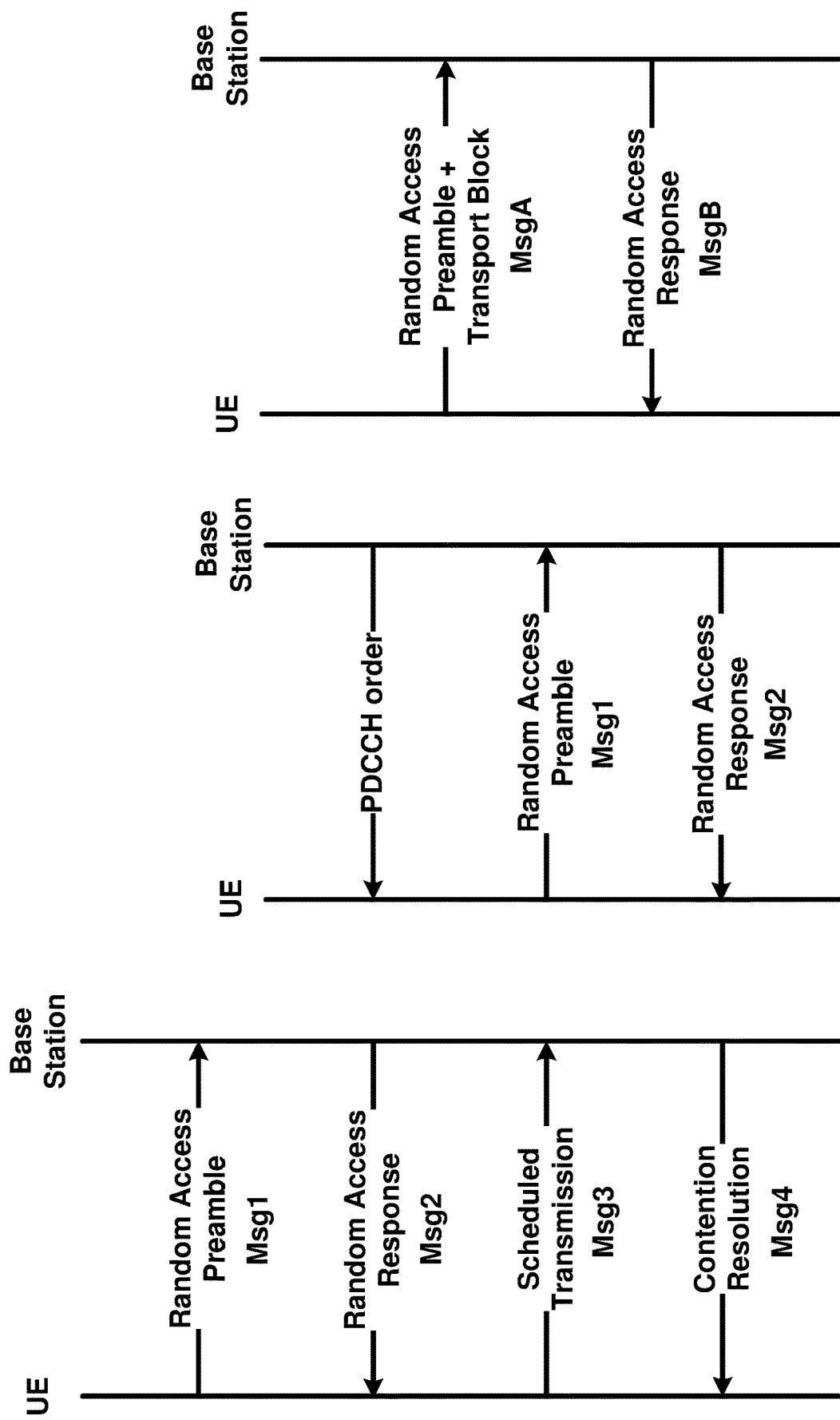
FIG. 12A, FIG. 12B and FIG. 12C show example random access processes in accordance with several of various embodiments of the present disclosure.

FIG. 12A, FIG. 12B and FIG. 12C show example random access processes in accordance with several of various embodiments of the present disclosure. FIG. 12A shows an example of four step contention-based random access (CBRA) procedure. The four-step CBRA procedure includes exchanging four messages between a UE and a base station. Msg1 may be for transmission (or retransmission) of a random access preamble by the wireless device to the base station. Msg2 may be the random access response (RAR) by the base station to the wireless device. Msg3 is the scheduled transmission based on an uplink grant indicated in Msg2 and Msg4 may be for contention resolution.

The base station may transmit one or more RRC messages comprising configuration parameters of the random access parameters. The random access parameters may indicate radio resources (e.g., time-frequency resources) for transmission of the random access preamble (e.g., Msg1), configuration index, one or more parameters for determining the power of the random access preamble (e.g., a power ramping parameter, a preamble received target power, etc.), a parameter indicating maximum number of preamble transmission, RAR window for monitoring RAR, cell-specific random access parameters and UE specific random access parameters. The UE-specific random access parameters may indicate one or more PRACH occasions for random access preamble (e.g., Msg1) transmissions. The random access parameters may indicate association between the PRACH occasions and one or more reference signals (e.g., SSB or CSI-RS). The random access parameters may further indicate association between the random access preambles and one or more reference signals (e.g., SBB or CSI-RS). The UE may use one or more reference signals (e.g., SSB(s) or CSI-RS(s)) and may determine a random access preamble to use for Msg1 transmission based on the association between the random access preambles and the one or more reference signals. The UE may use one or more reference signals (e.g., SSB(s) or CSI-RS(s)) and may determine the PRACH occasion to use for Msg1 transmission based on the association between the PRACH occasions and the reference signals. The UE may perform a retransmission of the random access preamble if no response is received with the RAR window following the transmission of the preamble. UE may use a higher transmission power for retransmission of the preamble. UE may determine the higher transmission power of the preamble based on the power ramping parameter.

Msg2 is for transmission of RAR by the base station. Msg2 may comprise a plurality of RARs corresponding to a plurality of random access preambles transmitted by a plurality of UEs. Msg2 may be associated with a random access temporary radio identifier (RA-RNTI) and may be received in a common search space of the UE. The RA-RNTI may be based on the PRACH occasion (e.g., time and frequency resources of a PRACH) in which a random access preamble is transmitted. RAR may comprise a timing advance command for uplink timing adjustment at the UE, an uplink grant for transmission of Msg3 and a temporary C-RNTI. In response to the successful reception of Msg2, the UE may transmit the Msg3. Msg3 and Msg4 may enable contention resolution in case of CBRA. In a CBRA, a plurality of UEs may transmit the same random access preamble and may consider the same RAR as being corresponding to them. UE may include a device identifier in Msg3 (e.g., a C-RNTI, temporary C-RNTI or other UE identity). Base station may transmit the Msg4 with a PDSCH and UE may assume that the contention resolution is successful in response to the PDSCH used for transmission of Msg4 being associated with the UE identifier included in Msg3.

FIG. 12B shows an example of a contention-free random access (CFRA) process. Msg 1 (random access preamble) and Msg 2 (random access response) in FIG. 12B for CFRA may be analogous to Msg 1 and Msg 2 in FIG. 12A for CBRA. In an example, the CFRA procedure may be initiated in response to a PDCCH order from a base station. The PDCCH order for initiating the CFRA procedure by the wireless device may be based on a DCI having a first format (e.g., format 1_0). The DCI for the PDCCH order may comprise a random access preamble index, an UL/SUL indicator indicating an uplink carrier of a cell (e.g., normal uplink carrier or supplementary uplink carrier) for transmission of the random access preamble, a SS/PBCH index indicating the SS/PBCH that may be used to determine a RACH occasion for PRACH transmission, a PRACH mask index indicating the RACH occasion associated with the SS/PBCH indicated by the SS/PBCH index for PRACH transmission, etc. In an example, the CFRA process may be started in response to a beam failure recovery process. The wireless device may start the CFRA for the beam failure recovery without a command (e.g., PDCCH order) from the base station and by using the wireless device dedicated resources.

FIG. 12C shows an example of a two-step random access process comprising two messages exchanged between a wireless device and a base station. Msg A may be transmitted by the wireless device to the base station and may comprise one or more transmissions of a preamble and/or one or more transmissions of a transport block. The transport block in Msg A and Msg 3 in FIG. 12A may have similar and/or equivalent contents. The transport block of Msg A may comprise data and control information (e.g., SR, HARQ feedback, etc.). In response to the transmission of Msg A, the wireless device may receive Msg B from the base station. Msg B in FIG. 12C and Msg 2 (e.g., RAR) illustrated in FIGS. 12A and 12B may have similar and/or equivalent content.

The base station may periodically transmit synchronization signals (SSs), e.g., primary SS (PSS) and secondary SS (SSS) along with PBCH on each NR cell. The PSS/SSS together with PBCH is jointly referred to as a SS/PBCH block. The SS/PBCH block enables a wireless device to find a cell when entering to the mobile communications network or find new cells when moving within the network. The SS/PBCH block spans four OFDM symbols in time domain. The PSS is transmitted in the first symbol and occupies 127 subcarriers in frequency domain. The SSS is transmitted in the third OFDM symbol and occupies the same 127 subcarriers as the PSS. There are eight and nine empty subcarriers on each side of the SSS. The PBCH is transmitted on the second OFDM symbol occupying 240 subcarriers, the third OFDM symbol occupying 48 subcarriers on each side of the SSS, and on the fourth OFDM symbol occupying 240 subcarriers. Some of the PBCH resources indicated above may be used for transmission of the demodulation reference signal (DMRS) for coherent demodulation of the PBCH. The SS/PBCH block is transmitted periodically with a period ranging from 5 ms to 160 ms. For initial cell search or for cell search during inactive/idle state, a wireless device may assume that that the SS/PBCH block is repeated at least every 20 ms.

In NR, transmissions using of antenna arrays, with many antenna elements, and beamforming plays an important role specially in higher frequency bands. Beamforming enables higher capacity by increasing the signal strength (e.g., by focusing the signal energy in a specific direction) and by lowering the amount interference received at the wireless devices. The beamforming techniques may generally be divided to analog beamforming and digital beamforming techniques. With digital beamforming, signal processing for beamforming is carried out in the digital domain before digital-to-analog conversion and detailed control of both amplitude and phase of different antenna elements may be possible. With analog beamforming, the signal processing for beamforming is carried out in the analog domain and after the digital to analog conversion. The beamformed transmissions may be in one direction at a time. For example, the wireless devices that are in different directions relative to the base station may receive their downlink transmissions at different times. For analog receiver-side beamforming, the receiver may focus its receiver beam in one direction at a time.

In NR, the base station may use beam sweeping for transmission of SS/PBCH blocks. The SS/PBCH blocks may be transmitted in different beams using time multiplexing. The set of SS/PBCH blocks that are transmitted in one beam sweep may be referred to as a SS/PBCH block set. The period of PBCH/SSB block transmission may be a time duration between a SS/PBCH block transmission in a beam and the next SS/PBCH block transmission in the same beam. The period of SS/PBCH block is, therefore, also the period of the SS/PBCH block set.

Figure 13A:
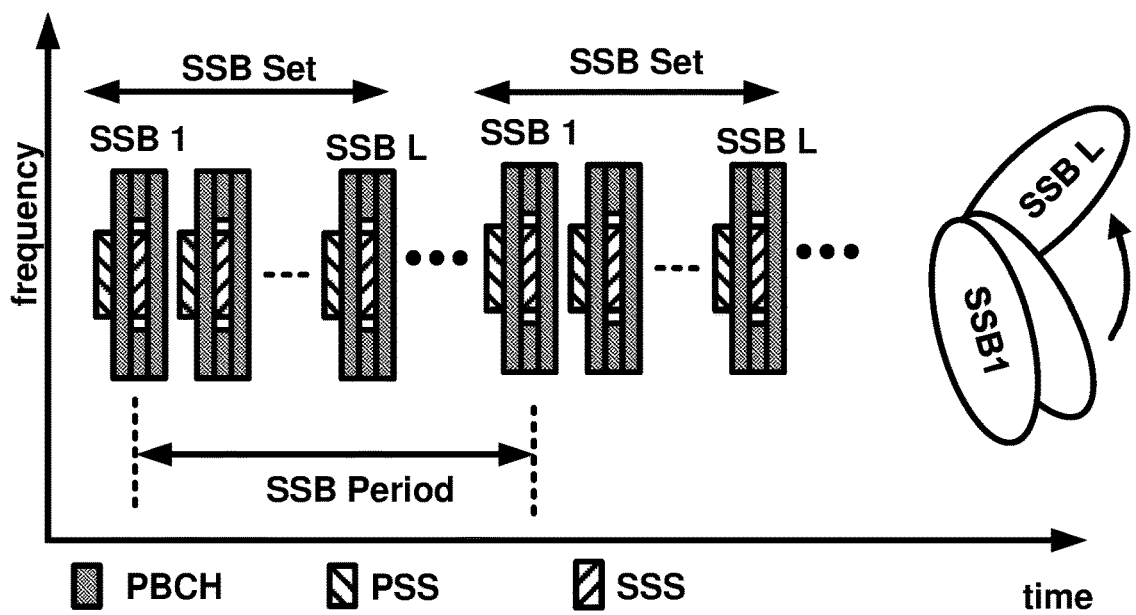
FIG. 13A shows example time and frequency structure of SSBs and their associations with beams in accordance with several of various embodiments of the present disclosure.

FIG. 13A shows example time and frequency structure of SS/PBCH blocks and their associations with beams in accordance with several of various embodiments of the present disclosure. In this example, a SS/PBCH block (also referred to as SSB) set comprise L SSBs wherein an SSB in the SSB set is associated with (e.g., transmitted in) one of L beams of a cell. The transmission of SBBs of an SSB set may be confined within a 5 ms interval, either in a first half-frame or a second half-frame of a 10 ms frame. The number of SSBs in an SSB set may depend on the frequency band of operation. For example, the number of SSBs in a SSB set may be up to four SSBs in frequency bands below 3 GHz enabling beam sweeping of up to four beams, up to eight SSBs in frequency bands between 3 GHz and 6 GHz enabling beam sweeping of up to eight beams, and up to sixty four SSBs in higher frequency bands enabling beam sweeping of up to sixty four beams. The SSs of an SSB may depend on a physical cell identity (PCI) of the cell and may be independent of which beam of the cell is used for transmission of the SSB. The PBCH of an SSB may indicate a time index parameter and the wireless device may determine the relative position of the SSB within the SSB set using the time index parameter. The wireless device may use the relative position of the SSB within an SSB set for determining the frame timing and/or determining RACH occasions for a random access process.

A wireless device entering the mobile communications network may first search for the PSS. After detecting the PSS, the wireless device may determine the synchronization up to the periodicity of the PSS. By detecting the PSS, the wireless device may determine the transmission timing of the SSS. The wireless device may determine the PCI of the cell after detecting the SSS. The PBCH of a SS/PBCH block is a downlink physical channel that carries the MIB. The MIB may be used by the wireless device to obtain remaining system information (RMSI) that is broadcast by the network. The RMSI may include System Information Block 1 (SIB1) that contains information required for the wireless device to access the cell.

As discussed earlier, the wireless device may determine a time index parameter from the SSB. The PBCH comprises a half-frame parameter indicating whether the SSB is in the first 5 ms half or the second 5 ms half of a 10 ms frame. The wireless device may determine the frame boundary using the time index parameter and the half-frame parameter. In addition, the PBCH may comprise a parameter indicating the system frame number (SFN) of the cell.

The base station may transmit CSI-RS and a UE may measure the CSI-RS to obtain channel state information (CSI). The base station may configure the CSI-RS in a UE-specific manner. In some scenarios, same set of CSI-RS resources may be configured for multiple UEs and one or more resource elements of a CSI-RS resource may be shared among multiple UEs. A CSI-RS resource may be configured such that it does not collide with a CORESET configured for the wireless device and/or with a DMRS of a PDSCH scheduled for the wireless device and/or transmitted SSBs. The UE may measure one or more CSI-RSs configured for the UE and may generate a CSI report based on the CSI-RS measurements and may transmit the CSI report to the base station for scheduling, link adaptation and/or other purposes.

NR supports flexible CSI-RS configurations. A CSI-RS resource may be configured with single or multiple antenna ports and with configurable density. Based on the number of configured antenna ports, a CSI-RS resource may span different number of OFDM symbols (e.g., 1, 2, and 4 symbols). The CSI-RS may be configured for a downlink BWP and may use the numerology of the downlink BWP. The CSI-RS may be configured to cover the full bandwidth of the downlink BWP or a portion of the downlink BWP. In some case, the CSI-RS may be repeated in every resource block of the CSI-RS bandwidth, referred to as CSI-RS with density equal to one. In some cases, the CSI-RS may be configured to be repeated in every other resource block of the CSI-RS bandwidth. CSI-RS may be non-zero power (NZP) CSI-RS or zero-power (ZP) CSI-RS.

The base station may configure a wireless device with one or more sets of NZP CSI-RS resources. The base station may configure the wireless device with a NZP CSI-RS resource set using an RRC information element (IE) NZP-CSI-RS-ResourceSet indicating a NZP CSI-RS resource set identifier (ID) and parameters specific to the NZP CSI-RS resource set. An NZP CSI-RS resource set may comprise one or more CSI-RS resources. An NZP CSI-RS resource set may be configured as part of the CSI measurement configuration.

The CSI-RS may be configured for periodic, semi-persistent or aperiodic transmission. In case of the periodic and semi-persistent CSI-RS configurations, the wireless device may be configured with a CSI resource periodicity and offset parameter that indicate a periodicity and corresponding offset in terms of number of slots. The wireless device may determine the slots that the CSI-RSs are transmitted. For semi-persistent CSI-RS, the CSI-RS resources for CSI-RS transmissions may be activated and deactivated by using a semi-persistent (SP) CSI-CSI Resource Set Activation/Deactivation MAC CE. In response to receiving a MAC CE indicating activation of semi-persistent CSI-RS resources, the wireless device may assume that the CSI-RS transmissions will continue until the CSI-RS resources for CSI-RS transmissions are activated.

As discussed before, CSI-RS may be configured for a wireless device as NZP CSI-RS or ZP CSI-RS. The configuration of the ZP CSI-RS may be similar to the NZP CSI-RS with the difference that the wireless device may not carry out measurements for the ZP CSI-RS. By configuring ZP CSI-RS, the wireless device may assume that a scheduled PDSCH that includes resource elements from the ZP CSI-RS is rate matched around those ZP CSI-RS resources. For example, a ZP CSI-RS resource configured for a wireless device may be an NZP CSI-RS resource for another wireless device. For example, by configuring ZP CSI-RS resources for the wireless device, the base station may indicate to the wireless device that the PDSCH scheduled for the wireless device is rate matched around the ZP CSI-RS resources.

A base station may configure a wireless device with channel state information interference measurement (CSI-IM) resources. Similar to the CSI-RS configuration, configuration of locations and density of CSI-IM resources may be flexible. The CSI-IM resources may be periodic (configured with a periodicity), semi-persistent (configured with a periodicity and activated and deactivated by MAC CE) or aperiodic (triggered by a DCI).

Tracking reference signals (TRSs) may be configured for a wireless device as a set of sparse reference signals to assist the wireless in time and frequency tracking and compensating time and frequency variations in its local oscillator. The wireless device may further use the TRSs for estimating channel characteristics such as delay spread or doppler frequency. The base station may use a CSI-RS configuration for configuring TRS for the wireless device. The TRS may be configured as a resource set comprising multiple periodic NZP CSI-RS resources.

A base station may configure a UE and the UE may transmit sounding reference signals (SRSs) to enable uplink channel sounding/estimation at the base station. The SRS may support up to four antenna ports and may be designed with low cubic metric enabling efficient operation of the wireless device amplifier. The SRS may span one or more (e.g., one, two or four) consecutive OFDM symbols in time domain and may be located within the last n (e.g., six) symbols of a slot. In the frequency domain, the SRS may have a structure that is referred to as a comb structure and may be transmitted on every Nth subcarrier. Different SRS transmissions from different wireless devices may have different comb structures and may be multiplexed in frequency domain.

A base station may configure a wireless device with one or more SRS resource sets and an SRS resource set may comprise one or more SRS resources. The SRS resources in an SRS resources set may be configured for periodic, semi-persistent or aperiodic transmission. The periodic SRS and the semi-persistent SRS resources may be configured with periodicity and offset parameters. The Semi-persistent SRS resources of a configured semi-persistent SRS resource set may be activated or deactivated by a semi-persistent (SP) SRS Activation/Deactivation MAC CE. The set of SRS resources included in an aperiodic SRS resource set may be activated by a DCI. A value of a field (e.g., an SRS request field) in the DCI may indicate activation of resources in an aperiodic SRS resource set from a plurality of SRS resource sets configured for the wireless device.

An antenna port may be associated with one or more reference signals. The receiver may assume that the one or more reference signals, associated with the antenna port, may be used for estimating channel corresponding to the antenna port. The reference signals may be used to derive channel state information related to the antenna port. Two antenna ports may be referred to as quasi co-located if characteristics (e.g., large-scale properties) of the channel over which a symbol is conveyed on one antenna port may be inferred from the channel over which a symbol is conveyed from another antenna port. For example, a UE may assume that radio channels corresponding to two different antenna ports have the same large-scale properties if the antenna ports are specified as quasi co-located. In some cases, the UE may assume that two antenna ports are quasi co-located based on signaling received from the base station. Spatial quasi-colocation (QCL) between two signals may be, for example, due to the two signals being transmitted from the same location and in the same beam. If a receive beam is good for a signal in a group of signals that are spatially quasi co-located, it may be assumed also be good for the other signals in the group of signals.

The CSI-RS in the downlink and the SRS in uplink may serve as quasi-location (QCL) reference for other physical downlink channels and physical uplink channels, respectively. For example, a downlink physical channel (e.g., PDSCH or PDCCH) may be spatially quasi co-located with a downlink reference signal (e.g., CSI-RS or SSB). The wireless device may determine a receive beam based on measurement on the downlink reference signal and may assume that the determined received beam is also good for reception of the physical channels (e.g., PDSCH or PDCCH) that are spatially quasi co-located with the downlink reference signal. Similarly, an uplink physical channel (e.g., PUSCH or PUCCH) may be spatially quasi co-located with an uplink reference signal (e.g., SRS). The base station may determine a receive beam based on measurement on the uplink reference signal and may assume that the determined received beam is also good for reception of the physical channels (e.g., PUSCH or PUCCH) that are spatially quasi co-located with the uplink reference signal.

The Demodulation Reference Signals (DM-RSs) enables channel estimation for coherent demodulation of downlink physical channels (e.g., PDSCH, PDCCH and PBH) and uplink physical channels (e.g., PUSCH and PUCCH). The DM-RS may be located early in the transmission (e.g., front-loaded DM-RS) and may enable the receiver to obtain the channel estimate early and reduce the latency. The time-domain structure of the DM-RS (e.g., symbols wherein the DM-RS are located in a slot) may be based on different mapping types.

The Phase Tracking Reference Signals (PT-RSs) enables tracking and compensation of phase variations across the transmission duration. The phase variations may be, for example, due to oscillator phase noise. The oscillator phase noise may become more sever in higher frequencies (e.g., mmWave frequency bands). The base station may configure the PT-RS for uplink and/or downlink. The PT-RS configuration parameters may indicate frequency and time density of PT-RS, maximum number of ports (e.g., uplink ports), resource element offset, configuration of uplink PT-RS without transform precoder (e.g., CP-OFDM) or with transform precoder (e.g., DFT-s-OFDM), etc. The subcarrier number and/or resource blocks used for PT-RS transmission may be based on the C-RNTI of the wireless device to reduce risk of collisions between PT-RSs of wireless devices scheduled on overlapping frequency domain resources.

Figure 13B:
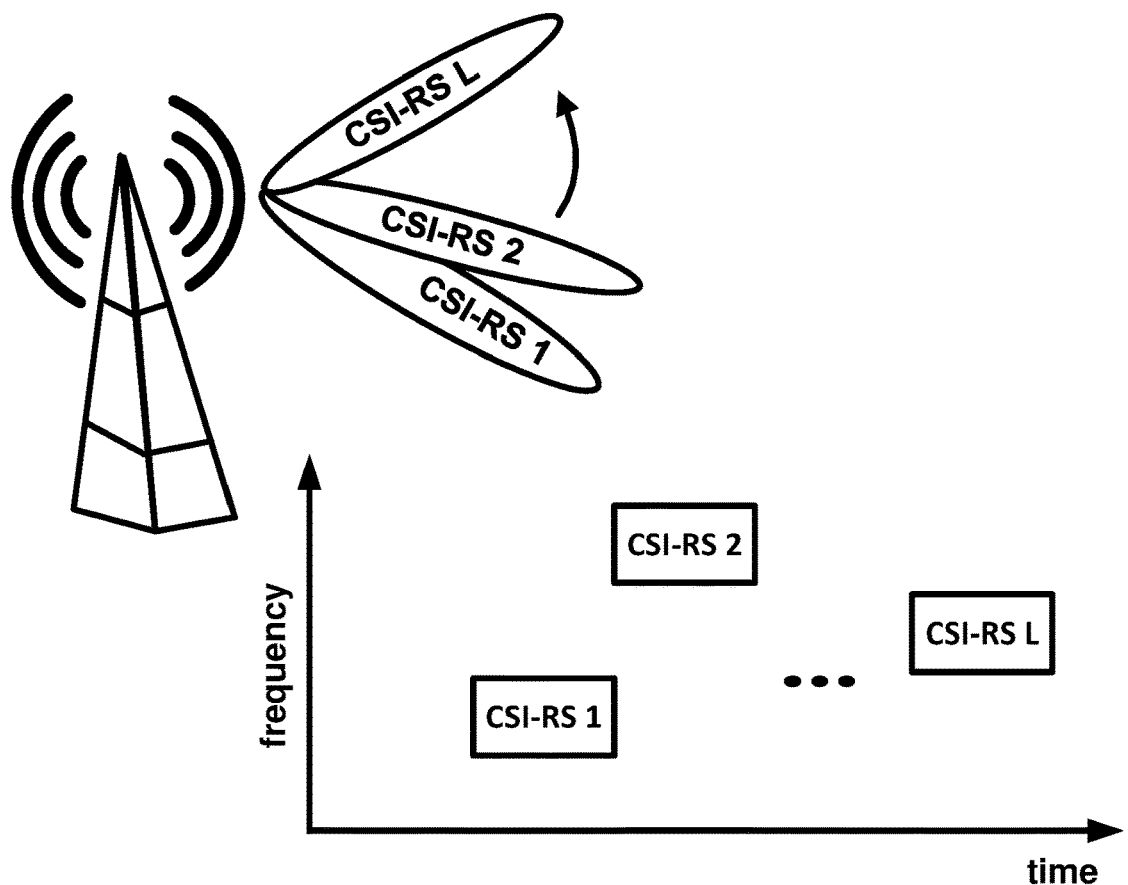
FIG. 13B shows example time and frequency structure of CSI-RSs and their association with beams in accordance with several of various embodiments of the present disclosure.

FIG. 13B shows example time and frequency structure of CSI-RSs and their association with beams in accordance with several of various embodiments of the present disclosure. A beam of the L beams shown in FIG. 13B may be associated with a corresponding CSI-RS resource. The base station may transmit the CSI-RSs using the configured CSI-RS resources and a UE may measure the CSI-RSs (e.g., received signal received power (RSRP) of the CSI-RSs) and report the CSI-RS measurements to the base station based on a reporting configuration. For example, the base station may determine one or more transmission configuration indication (TCI) states and may indicate the one or more TCI states to the UE (e.g., using RRC signaling, a MAC CE and/or a DCI). Based on the one or more TCI states indicated to the UE, the UE may determine a downlink receive beam and receive downlink transmissions using the receive beam. In case of a beam correspondence, the UE may determine a spatial domain filter of a transmit beam based on spatial domain filter of a corresponding receive beam. Otherwise, the UE may perform an uplink beam selection procedure to determine the spatial domain filter of the transmit beam. The UE may transmit one or more SRSs using the SRS resources configured for the UE and the base station may measure the SRSs and determine/select the transmit beam for the UE based the SRS measurements. The base station may indicate the selected beam to the UE. The CSI-RS resources shown in FIG. 13B may be for one UE. The base station may configure different CSI-RS resources associated with a given beam for different UEs by using frequency division multiplexing.

A base station and a wireless device may perform beam management procedures to establish beam pairs (e.g., transmit and receive beams) that jointly provide good connectivity. For example, in the downlink direction, the UE may perform measurements for a beam pair and estimate channel quality for a transmit beam by the base station (or a transmission reception point (TRP) more generally) and the receive beam by the UE. The UE may transmit a report indicating beam pair quality parameters. The report may comprise one or more parameters indicating one or more beams (e.g., a beam index, an identifier of reference signal associated with a beam, etc.), one or more measurement parameters (e.g., RSRP), a precoding matrix indicator (PMI), a channel quality indicator (CQI), and/or a rank indicator (RI).

Figure 14A:
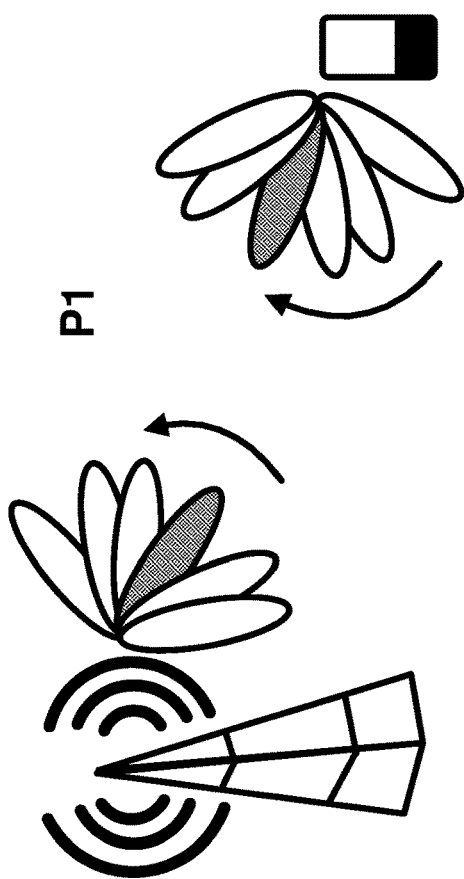
FIG. 14A, FIG. 14B and FIG. 14C show example beam management processes in accordance with several of various embodiments of the present disclosure.
Figure 14C:
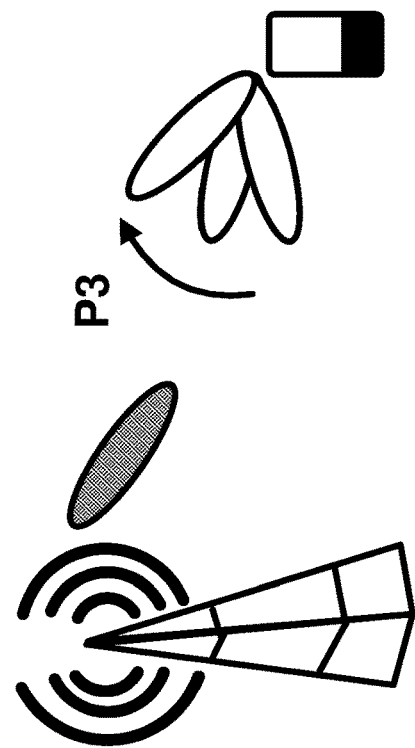
Figure 14B:
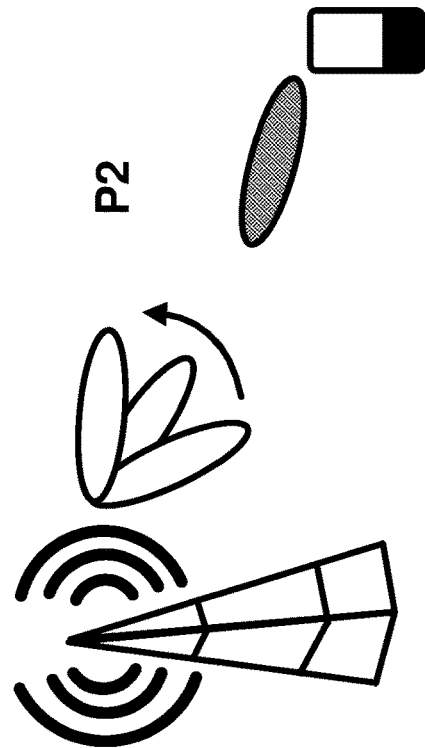

FIG. 14A, FIG. 14B and FIG. 14C show example beam management processes (referred to as P1, P2 and P3, respectively) in accordance with several of various embodiments of the present disclosure. The P1 process shown in FIG. 14A may enable, based on UE measurements, selection of a base station (or TRP more generally) transmit beam and/or a wireless device receive beam. The TRP may perform a beam sweeping procedure where the TRP may sequentially transmit reference signals (e.g., SSB and/or CSI-RS) on a set of beams and the UE may select a beam from the set of beams and may report the selected beam to the TRP. The P2 procedure as shown in FIG. 14B may be a beam refinement procedure. The selection of the TRP transmit beam and the UE receive beam may be regularly reevaluated due to movements and/or rotations of the UE or movement of other objects. In an example, the base station may perform the beam sweeping procedure over a smaller set of beams and the UE may select the best beam over the smaller set. In an example, the beam shape may be narrower compared to beam selected based on the P1 procedure. Using the P3 procedure as shown in FIG. 14C, the TRP may fix its transmit beam and the UE may refine its receive beam.

A wireless device may receive one or more messages from a base station. The one or more messages may comprise one or more RRC messages. The one or more messages may comprise configuration parameters of a plurality of cells for the wireless device. The plurality of cells may comprise a primary cell and one or more secondary cells. For example, the plurality of cells may be provided by a base station and the wireless device may communicate with the base station using the plurality of cells. For example, the plurality of cells may be provided by multiple base station (e.g., in case of dual and/or multi-connectivity). The wireless device may communicate with a first base station, of the multiple base stations, using one or more first cells of the plurality of cells. The wireless device may communicate with a second base station of the multiple base stations using one or more second cells of the plurality of cells.

The one or more messages may comprise configuration parameters used for processes in physical, MAC, RLC, PCDP, SDAP, and/or RRC layers of the wireless device. For example, the configuration parameters may include values of timers used in physical, MAC, RLC, PCDP, SDAP, and/or RRC layers. For example, the configuration parameters may include parameters for configurating different channels (e.g., physical layer channel, logical channels, RLC channels, etc.) and/or signals (e.g., CSI-RS, SRS, etc.).

Upon starting a timer, the timer may start running until the timer is stopped or until the timer expires. A timer may be restarted if it is running. A timer may be started if it is not running (e.g., after the timer is stopped or after the timer expires). A timer may be configured with or may be associated with a value (e.g., an initial value). The timer may be started or restarted with the value of the timer. The value of the timer may indicate a time duration that the timer may be running upon being started or restarted and until the timer expires. The duration of a timer may not be updated until the timer is stopped or expires (e.g., due to BWP switching). This specification may disclose a process that includes one or more timers. The one or more timers may be implemented in multiple ways. For example, a timer may be used by the wireless device and/or base station to determine a time window [t1, t2], wherein the timer is started at time t1 and expires at time t2 and the wireless device and/or the base station may be interested in and/or monitor the time window [t1, t2], for example to receive a specific signaling. Other examples of implementation of a timer may be provided.

Figure 15:
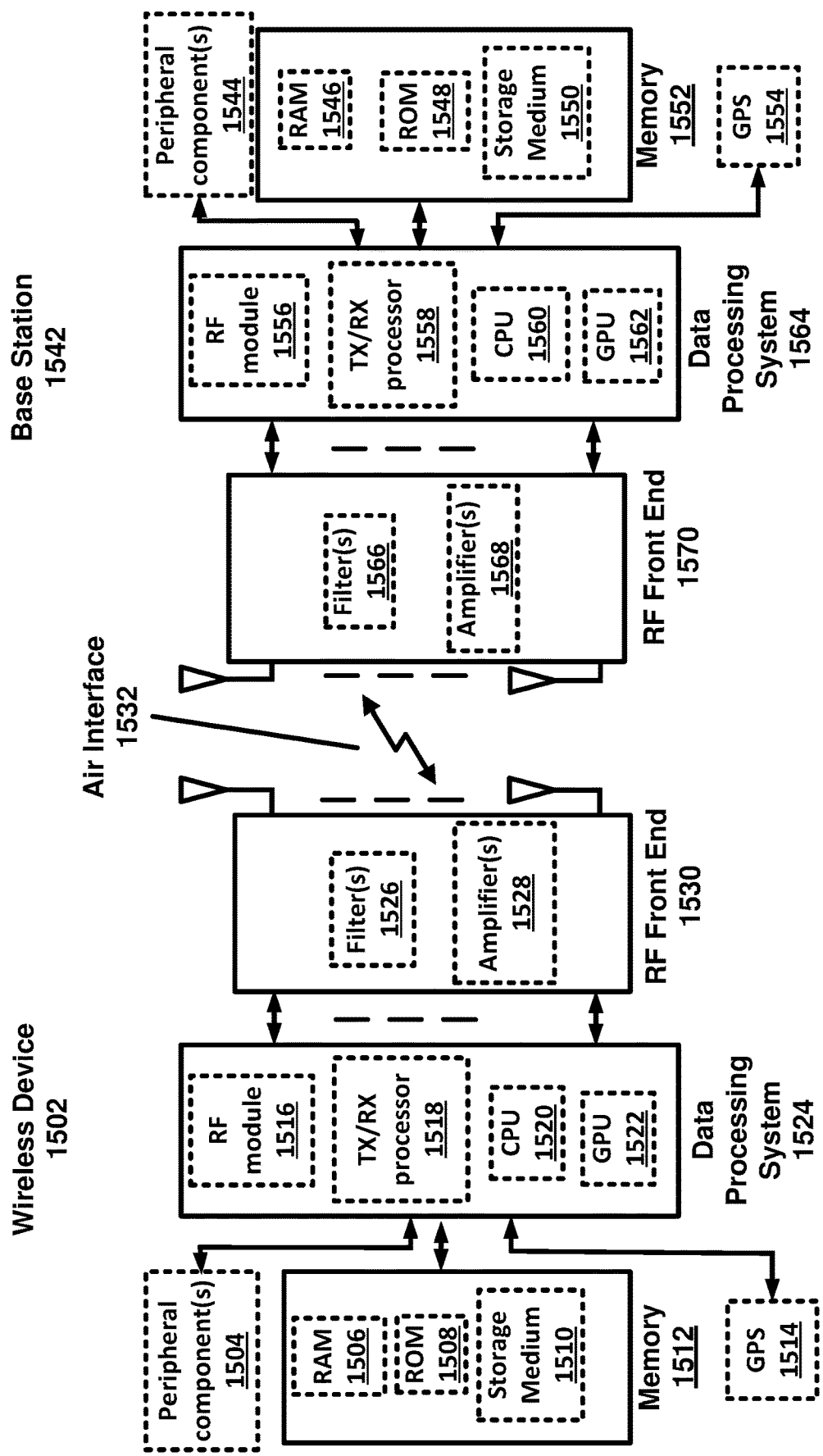
FIG. 15 shows example components of a wireless device and a base station that are in communication via an air interface in accordance with several of various embodiments of the present disclosure.

FIG. 15 shows example components of a wireless device and a base station that are in communication via an air interface in accordance with several of various embodiments of the present disclosure. The wireless device 1502 may communicate with the base station 1542 over the air interface 1532. The wireless device 1502 may include a plurality of antennas. The base station 1542 may include a plurality of antennas. The plurality of antennas at the wireless device 1502 and/or the base station 1542 enables different types of multiple antenna techniques such as beamforming, single-user and/or multi-user MIMO, etc.

The wireless device 1502 and the base station 1542 may have one or more of a plurality of modules/blocks, for example RF front end (e.g., RF front end 1530 at the wireless device 1502 and RF front end 1570 at the base station 1542), Data Processing System (e.g., Data Processing System1524 at the wireless device 1502 and Data Processing System1564 at the base station 1542), Memory (e.g., Memory 1512 at the wireless device 1502 and Memory 1542 at the base station1542). Additionally, the wireless device 1502 and the base station 1542 may have other modules/blocks such as GPS (e.g., GPS 1514 at the wireless device 1502 and GPS 1554 at the base station 1542).

An RF front end module/block may include circuitry between antennas and a Data Processing System for proper conversion of signals between these two modules/blocks. An RF front end may include one or more filters (e.g., Filter(s) 1526 at RF front end 1530 or Filter(s) 1566 at the RF front end 1570), one or more amplifiers (e.g., Amplifier(s) 1528 at the RF front end 1530 and Amplifier(s) 1568 at the RF front end 1570). The Amplifier(s) may comprise power amplifier (s) for transmission and low-noise amplifier(s) (LNA(s)) for reception.

The Data Processing System 1524 and the Data Processing System 1564 may process the data to be transmitted or the received signals by implementing functions at different layers of the protocol stack such as PHY, MAC, RLC, etc. Example PHY layer functions that may be implemented by the Data Processing System1524 and/or 1564 may include forward error correction, interleaving, rate matching, modulation, precoding, resource mapping, MIMO processing, etc. Similarly, one or more functions of the MAC layer, RLC layer and/or other layers may be implemented by the Data Processing System1524 and/or the Data Processing System1564. One or more processes described in the present disclosure may be implemented by the Data Processing System1524 and/or the Data Processing System1564. A Data Processing System may include an RF module (RF module 1516 at the Data Processing System1524 and RF module 1556 at the Data Processing System1564) and/or a TX/RX processor (e.g., TX/RX processor 1518 at the Data Processing System1524 and TX/RX processor 1558 at the Data Processing System1566) and/or a central processing unit (CPU) (e.g., CPU 1520 at the Data Processing System1524 and CPU 1560 at the Data Processing System1564) and/or a graphical processing unit (GPU) (e.g., GPU 1522 at the Data Processing System1524 and GPU 1562 at the Data Processing System1564).

The Memory 1512 may have interfaces with the Data Processing System 1524 and the Memory 1552 may have interfaces with Data Processing System1564, respectively. The Memory 1512 or the Memory 1552 may include non-transitory computer readable mediums (e.g., Storage Medium 1510 at the Memory 1512 and Storage Medium 1550 at the Memory 1552) that may store software code or instructions that may be executed by the Data Processing System1524 and Data Processing System1564, respectively, to implement the processes described in the present disclosure. The Memory 1512 or the Memory 1552 may include random-access memory (RAM) (e.g., RAM 1506 at the Memory 1512 or RAM 1546 at the Memory 1552) or read-only memory (ROM) (e.g., ROM 1508 at the Memory 1512 or ROM 1548 at the Memory 1552) to store data and/or software codes.

The Data Processing System1524 and/or the Data Processing System1564 may be connected to other components such as a GPS module 1514 and a GPS module 1554, respectively, wherein the GPS module 1514 and a GPS module 1554 may enable delivery of location information of the wireless device 1502 to the Data Processing System1524 and location information of the base station 1542 to the Data Processing System1564. One or more other peripheral components (e.g., Peripheral Component(s) 1504 or Peripheral Component(s) 1544) may be configured and connected to the data Processing System1524 and data Processing System1564, respectively.

In example embodiments, a wireless device may be configured with parameters and/or configuration arrangements. For example, the configuration of the wireless device with parameters and/or configuration arrangements may be based on one or more control messages that may be used to configure the wireless device to implement processes and/or actions. The wireless device may be configured with the parameters and/or the configuration arrangements regardless of the wireless device being in operation or not in operation. For example, software, firmware, memory, hardware and/or a combination thereof and/or alike may be configured in a wireless device regardless of the wireless device being in operation or not operation. The configured parameters and/or settings may influence the actions and/or processes performed by the wireless device when in operation.

In example embodiments, a wireless device may receive one or more message comprising configuration parameters. For example, the one or more messages may comprise radio resource control (RRC) messages. A parameter of the configuration parameters may be in at least one of the one or more messages. The one or more messages may comprise information element (IEs). An information element may be a structural element that includes single or multiple fields. The fields in an IE may be individual contents of the IE. The terms configuration parameter, IE and field may be used equally in this disclosure. The IEs may be implemented using a nested structure, wherein an IE may include one or more other IEs and an IE of the one or more other IEs may include one or more additional IEs. With this structure, a parent IE contains all the offspring IEs as well. For example, a first IE containing a second IE, the second IE containing a third IE, and the third IE containing a fourth IE may imply that the first IE contains the third IE and the fourth IE.

In an example and for TDD configurations, dropping of SPS HARQ feedback due to collision/overlap of scheduled HARQ feedback transmission via PUCCH with at least one DL or flexible symbol (e.g., determined based on slot format) may be avoided. In an example, to address SPS HARQ-ACK dropping for TDD systems, a HARQ feedback may be deferred until a next (e.g., first) available PUCCH. In an example, to address SPS HARQ-ACK dropping for TDD systems, a one-shot/Type-3 codebook type may be dynamically triggered.

In an example, deferring of SPS HARQ-ACK dropped due to TDD specific collisions until a next available PUCCH may be based on semi-static configuration of slot format. In an example, semi-statically configured flexible symbols may be considered for PUCCH availability.

In an example, SPS HARQ-ACK deferral may be jointly configured per PUCCH cell group. Any SPS HARQ-ACK within a PUCCH cell group may be subject to deferral. In an example, the SPS HARQ-ACK deferral may be configured per SPS configuration.

In an example, for SPS HARQ-ACK, the deferral from the initial slot/sub-slot determined by k1 in the activation DCI to the target slot/sub-slot determined by $k1+k1_{def}$, the UE may check the validity of a target slot/sub-slot evaluating from one slot/sub-slot to the next sub/sub-slot (e.g., in principle $k1_{def}$ granularity may be one slot/sub-slot). In an example, there may be a limit on the minimum deferral considered the required UE processing ($k1_{def} \geq 0$). In an example, there may be a limit on the maximum deferral.

In an example, for SPS HARQ-ACK deferral, for the determination of valid symbols in the initial slot/sub-slot a collision with semi-static DL symbols, SSB and CORESET #0 may be regarded as 'invalid' or 'no symbols for UL transmission'.

In an example, for SPS HARQ-ACK deferral, a limit on the maximum deferral of SPS HARQ in terms of $k1_{def}$ or $k1+k1_{def}$ may be considered. In an example, the limitation may be given by a maximum value of $k1_{def}$ or a maximum of $k1_{eff}=k1+k1_{def}$.

In an example, for SPS HARQ-ACK deferral, there may be no lower limit defined for $k1_{def}$.

In an example, to handle the collision for the same HARQ process due to deferred SPS HARQ-ACK, in case the UE receives PDSCH of a certain HARQ Process ID, the deferred SPS HARQ bit(s) for this HARQ Process ID may be dropped.

In an example, simultaneous PUSCH/PUCCH transmission may be supported/allowed within a cell group. For example, a wireless device may receive a configuration parameter that may indicate whether simultaneous PUSCH/PUCCH is supported/allowed within a cell group.

In an example, HARQ-ACK multiplexing on PUSCH may be in a sub-slot basis.

In an example, a SPS HARQ may be skipped for a skipped PDSCH transmission.

In an example, PUCCH (at least for HARQ feedback) may be repeated in a sub-slot basis.

In an example, a cancelled HARQ feedback may be retransmitted in a later timing.

In an example, for PUCCH carrier switching for HARQ feedback transmission, PUCCH carrier switching may be considered for cells that are part of the active uplink carrier aggregation (CA) configuration.

In an example, for SPS HARQ skipping for skipped SPS PDSCH, 'NACK skipping' for (skipped) SPS PDSCH may be used.

In an example, for SPS HARQ skipping for skipped SPS PDSCH, skipped SPS PDSCH occasions may be dynamically indicated.

In an example, for SPS HARQ payload size reduction (of non-skipped SPS PDSCH), one or more of the following may be used: ACK skipping, NACK skipping (e.g., ACK-only transmission), HARQ bundling/compression, HARQ-ACK disabling/skipping for certain SPS configurations (for example, the skipping/disabling may be higher-layer configured per SPS configuration).

In an example, for SPS HARQ-ACK deferral, the initial HARQ-ACK transmission occasion may be considered to determine the out-of-order HARQ condition.

In an example, the MAC entity may be configured by RRC with a DRX functionality that controls the UE's PDCCH monitoring activity for a plurality of the MAC entity's RNTIs (e.g., C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI). When in RRC_CONNECTED and if DRX is configured, the MAC entity may monitor the PDCCH discontinuously using the DRX operation for the activated Serving Cells.

In an example, RRC may control DRX operation by configuring the following parameters: drx-onDurationTimer (e.g., the duration at the beginning of a DRX cycle); drx-SlotOffset (e.g., the delay before starting the drx-onDurationTimer); drx-InactivityTimer (e.g., the duration after the PDCCH occasion in which a PDCCH indicates a new UL or DL transmission for the MAC entity); drx-RetransmissionTimerDL (per DL HARQ process except for the broadcast process, e.g. the maximum duration until a DL retransmission is received); drx-RetransmissionTimerUL (per UL HARQ process, e.g., the maximum duration until a grant for UL retransmission is received); drx-LongCycleStartOffset (e.g., the Long DRX cycle and drx-StartOffset which may define the subframe where the Long and Short DRX cycle starts); drx-ShortCycle (e.g., the Short DRX cycle); drx-ShortCycleTimer (e.g., the duration the UE may follow the Short DRX cycle); drx-HARQ-RTT-TimerDL (per DL HARQ process except for the broadcast process, e.g., the minimum duration before a DL assignment for HARQ retransmission is expected by the MAC entity); drx-HARQ-RTT-TimerUL (per UL HARQ process, e.g., the minimum duration before a UL HARQ retransmission grant is expected by the MAC entity).

In an example, serving Cells of a MAC entity may be configured by RRC in a plurality (e.g., two) DRX groups with separate DRX parameters. When RRC does not configure a secondary DRX group, there may be one DRX group and all Serving Cells may belong to that one DRX group. When two DRX groups are configured, each Serving Cell may uniquely be assigned to either of the two groups. The DRX parameters that may be separately configured for each DRX group may be: drx-onDurationTimer, drx-InactivityTimer. The DRX parameters that may be common to the DRX groups may be: drx-SlotOffset, drx-RetransmissionTimerDL, drx-RetransmissionTimerUL, drx-LongCycleStartOffset, drx-ShortCycle, drx-ShortCycleTimer, drx-HARQ-RTT-TimerDL, and drx-HARQ-RTT-TimerUL.

In an example, when a DRX cycle is configured, the Active Time for Serving Cells in a DRX group may include the time while: drx-onDurationTimer or drx-InactivityTimer configured for the DRX group is running; or drx-RetransmissionTimerDL or drx-RetransmissionTimerUL is running on any Serving Cell in the DRX group; or ra-ContentionResolutionTimer or msgB-ResponseWindow is running; or a Scheduling Request is sent on PUCCH and is pending; or a PDCCH indicating a new transmission addressed to the C-RNTI of the MAC entity has not been received after successful reception of a Random Access Response for the Random Access Preamble not selected by the MAC entity among the contention-based Random Access Preamble.

In an example, when DRX is configured, if a MAC PDU is received in a configured downlink assignment: the MAC entity may start the drx-HARQ-RTT-TimerDL for the corresponding HARQ process in the first symbol after the end of the corresponding transmission carrying the DL HARQ feedback; and the MAC entity may stop the drx-RetransmissionTimerDL for the corresponding HARQ process.

In an example, when DRX is configured, if a MAC PDU is transmitted in a configured uplink grant and LBT failure indication is not received from lower layers: the MAC entity may start the drx-HARQ-RTT-TimerUL for the corresponding HARQ process in the first symbol after the end of the first transmission (within a bundle) of the corresponding PUSCH transmission; and the MAC entity may stop the drx-RetransmissionTimerUL for the corresponding HARQ process at the first transmission (within a bundle) of the corresponding PUSCH transmission.

In an example, when DRX is configured, if a drx-HARQ-RTT-TimerDL expires: if the data of the corresponding HARQ process was not successfully decoded: the MAC entity may start the drx-RetransmissionTimerDL for the corresponding HARQ process in the first symbol after the expiry of drx-HARQ-RTT-TimerDL.

In an example, when DRX is configured, if a drx-HARQ-RTT-TimerUL expires: the MAC entity may start the drx-RetransmissionTimerUL for the corresponding HARQ process in the first symbol after the expiry of drx-HARQ-RTT-TimerUL.

In an example, when DRX is configured, if a DRX Command MAC CE or a Long DRX Command MAC CE is received: the MAC entity may stop drx-onDurationTimer for each DRX group; and the MAC entity may stop drx-InactivityTimer for each DRX group.

In an example, when DRX is configured, drx-InactivityTimer for a DRX group may expires. If the Short DRX cycle is configured, the MAC entity may start or restart drx-ShortCycleTimer for this DRX group in the first symbol after the expiry of drx-InactivityTimer; and the MAC entity may use the Short DRX cycle for this DRX group. Otherwise, the MAC entity may use the Long DRX cycle for this DRX group.

In an example, when DRX is configured, if a DRX Command MAC CE is received, the MAC entity may start or restart drx-ShortCycleTimer for each DRX group in the first symbol after the end of DRX Command MAC CE reception; and the MAC entity may use the Short DRX cycle for each DRX group. Otherwise, the MAC entity may use the Long DRX cycle for each DRX group.

In an example, when DRX is configured, if drx-ShortCycleTimer for a DRX group expires: the MAC entity may use the Long DRX cycle for this DRX group.

In an example, when DRX is configured, if a Long DRX Command MAC CE is received: the MAC entity may stop drx-ShortCycleTimer for each DRX group; and the MAC entity may use the Long DRX cycle for each DRX group.

In an example, when DRX is configured, if the Short DRX cycle is used for a DRX group, and [(SFN×10)+subframe number] modulo (drx-ShortCycle)=(drx-StartOffset) modulo (drx-ShortCycle): the MAC entity may start drx-onDurationTimer for this DRX group after drx-SlotOffset from the beginning of the subframe.

In an example, when DRX is configured, if the Long DRX cycle is used for a DRX group, and [(SFN×10)+subframe number] modulo (drx-LongCycle)=drx-StartOffset: the MAC entity may start drx-onDurationTimer for this DRX group after drx-SlotOffset from the beginning of the subframe.

In an example, when DRX is configured, a DRX group may be in Active Time. The MAC entity may monitor the PDCCH on the Serving Cells in this DRX group. If the PDCCH indicates a DL transmission: the MAC entity may start the drx-HARQ-RTT-TimerDL for the corresponding HARQ process in the first symbol after the end of the corresponding transmission carrying the DL HARQ feedback. When HARQ feedback is postponed by PDSCH-to-HARQ_feedback timing indicating a non-numerical k1 value, the corresponding transmission opportunity to send the DL HARQ feedback may be indicated in a later PDCCH requesting the HARQ-ACK feedback. The MAC entity may stop the drx-RetransmissionTimerDL for the corresponding HARQ process. If the PDSCH-to-HARQ_feedback timing indicate a non-numerical k1 value, the MAC entity may start the drx-RetransmissionTimerDL in the first symbol after the PDSCH transmission for the corresponding HARQ process.

In an example, when DRX is configured, a DRX group may be in Active Time. If the PDCCH indicates a UL transmission: the MAC entity may start the drx-HARQ-RTT-TimerUL for the corresponding HARQ process in the first symbol after the end of the first transmission (within a bundle) of the corresponding PUSCH transmission. The MAC entity may stop the drx-RetransmissionTimerUL for the corresponding HARQ process.

In an example, when DRX is configured, a DRX group may be in Active Time. If the PDCCH indicates a new transmission (DL or UL) on a Serving Cell in this DRX group: the MAC entity may start or restart drx-InactivityTimer for this DRX group in the first symbol after the end of the PDCCH reception.

In an example, when DRX is configured, a DRX group may be in Active Time. If a HARQ process receives downlink feedback information and acknowledgement is indicated: the MAC entity may stop the drx-RetransmissionTimerUL for the corresponding HARQ process.

In an example, an IE DRX-Config may be used to configure DRX related parameters. A field/parameter drx-HARQ-RTT-TimerDL may indicate a value in number of symbols of the BWP where the transport block was received. A field/parameter drx-HARQ-RTT-TimerUL may indicate a value in number of symbols of the BWP where the transport block was transmitted. A field/parameter drx-Inactivity-Timer may indicate a value in multiple integers of 1 ms. A field/parameter drx-LongCycleStartOffset may indicate drx-LongCycle in ms and drx-StartOffset in multiples of 1 ms. If drx-ShortCycle is configured, the value of drx-LongCycle may be a multiple of the drx-ShortCycle value. A field/parameter drx-onDurationTimer may indicate a value in multiples of $\frac{1}{32}$ ms (subMilliSeconds) or in ms (milliSecond). A field/parameter drx-RetransmissionTimerDL may indicate a value in number of slot lengths of the BWP where the transport block was received. A field/parameter drx-RetransmissionTimerUL may indicate a value in number of slot lengths of the BWP where the transport block was transmitted. A field/parameter drx-ShortCycleTimer may indicate a value in multiples of drx-ShortCycle. A field/parameter drx-ShortCycle may indicate a value in ms. A field/parameter drx-SlotOffset may indicate a value in $\frac{1}{32}$ ms.

In an example, the IE SPS-Config may be used to configure downlink semi-persistent transmission. Multiple Downlink SPS configurations may be configured in one BWP of a serving cell. A field/parameter harq-CodebookID may indicate the HARQ-ACK codebook index for the corresponding HARQ-ACK codebook for SPS PDSCH and ACK for SPS PDSCH release. A field/parameter harq-ProcID-Offset may indicate the offset used in deriving the HARQ process IDs. A field/parameter mcs-Table may indicate the MCS table the UE may use for DL SPS. A field/parameter n1PUCCH-AN may indicate a HARQ resource for PUCCH for DL SPS. A field/parameter nrof-HARQ-Processes may indicate a number of configured HARQ processes for SPS DL. A field/parameter pdsch-AggregationFactor may indicate number of repetitions for SPS PDSCH. When the field is absent, the UE may apply PDSCH aggregation factor of PDSCH-Config. A field/parameter periodicity may indicate periodicity for DL SPS. A field/parameter sps-ConfigIndex may indicate the index of one of multiple SPS configurations.

In an example, an IE SPS-ConfigIndex may be used to indicate the index of one of multiple DL SPS configurations in one BWP. Semi-Persistent Scheduling (SPS) may be configured by RRC for a Serving Cell per BWP. Multiple assignments may be active simultaneously in the same BWP. Activation and deactivation of the DL SPS may be independent among the Serving Cells.

In an example, for the DL SPS, a DL assignment may be provided by PDCCH, and stored or cleared based on L1 signaling indicating SPS activation or deactivation.

In an example, RRC may configure the following parameters when the SPS is configured: cs-RNTI: CS-RNTI for activation, deactivation, and retransmission; nrofHARQ-Processes: indicating the number of configured HARQ processes for SPS; harq-ProcID-Offset: indicating offset of HARQ process for SPS; periodicity: periodicity of configured downlink assignment for SPS.

In an example, when the SPS is released by upper layers, the corresponding configurations may be released.

In an example, after a downlink assignment is configured for SPS, the MAC entity may consider sequentially that the $N^{th}$ downlink assignment occurs in the slot for which:

(numberOfSlotsPerFrame×SFN+slot number in the frame)=[(numberOfSlotsPerFrame×SFN$_{start\ time}$+slot$_{start\ time}$)+N×periodicity×numberOfSlotsPerFrame/10] modulo(1024×numberOfSlotsPerFrame)

where SFN$_{start\ time}$ and slot$_{start\ time}$ are the SFN and slot, respectively, of the first transmission of PDSCH where the configured downlink assignment was (re-)initialized.

In an example, an IE SlotFormatCombinationsPerCell may be used to configure the SlotFormatCombinations applicable for one serving cell. A field/parameter slotFormatCombinationId may indicate an ID used in the DCI payload to dynamically select this SlotFormatCombination. A field/parameter slotFormats may indicate slot formats that occur in consecutive slots in time domain order. A field/parameter enableConfiguredUL, if configured, the UE may be allowed to transmit uplink signals (SRS, PUCCH, CG-PUSCH) in the set of symbols of the slot when the UE does not detect a DCI format 2_0 providing a slot format for the set of symbols. A field/parameter positionInDCI may indicate the (starting) position (bit) of the slotFormatCombinationId (SFI-Index) for this serving cell (servingCellId) within the DCI payload. A field/parameter servingCellId may indicate the ID of the serving cell for which the slotFormatCombinations are applicable. A field/parameter slotFormatCombinations may indicate a list with SlotFormatCombinations. Each SlotFormatCombination may comprise of one or more SlotFormats. A field/parameter subcarrierSpacing2 may indicate a reference subcarrier spacing for a Slot Format Combination on an FDD or SUL cell. A field/parameter subcarrierSpacing may indicate a reference subcarrier spacing for this Slot Format Combination.

In an example, an IE SlotFormatIndicator may be used to configure monitoring a Group-Common-PDCCH for Slot-Format-Indicators (SFI).

In an example, for a serving cell in the set of serving cells, the UE may be provided: an identity of the serving cell by servingCellId; a location of a SFI-index field in DCI format 2_0 by positionInDCI; a set of slot format combinations by slotFormatCombinations, where each slot format combination in the set of slot format combinations includes one or more slot formats indicated by a respective slotFormats for the slot format combination, and a mapping for the slot format combination provided by slotFormats to a corresponding SFI-index field value in DCI format 2_0 provided by slotFormatCombinationId.

In an example, an IE ControlResourceSetZero may be used to configure CORESET #0 of the initial BWP.

In an example, an IE PDCCH-ConfigCommon may be used to configure cell specific PDCCH parameters provided in SIB as well as in dedicated signaling.

In an example, an IE commonControlResourceSet may indicate an additional common control resource set which may be configured and used for any common or UE-specific search space. If the network configures this field, it may use a ControlResourceSetId other than 0 for this ControlResourceSet. The network may configure the commonControlResourceSet in SIB1 so that it is contained in the bandwidth of CORESET #0. In an example, a field/parameter controlResourceSetZero may indicate parameters of the common CORESET #0 which may be used in any common or UE-specific search spaces. In an example, a field/parameter searchSpaceZero may indicate parameters of the common SearchSpace #0.

In an example, RRC may configure the following parameters for the maintenance of UL time alignment: timeAlignmentTimer (per time alignment goup (TAG)) which may control how long the MAC entity may consider the Serving Cells belonging to the associated TAG to be uplink time aligned.

In an example, when a Timing Advance Command MAC CE is received, and if an NTA has been maintained with the indicated TAG: the MAC entity may apply the Timing Advance Command for the indicated TAG; and the MAC entity may strat or restart the timeAlignmentTimer associated with the indicated TAG.

In an example, a Timing Advance Command may be received in a Random Access Response message for a Serving Cell belonging to a TAG or in a MSGB for an SpCell. If the Random Access Preamble was not selected by the MAC entity among the contention-based Random Access Preamble: the MAC entity may apply the Timing Advance Command for this TAG; and the MAC entity may start or restart the timeAlignmentTimer associated with this TAG. Otherwise, if the timeAlignmentTimer associated with this TAG is not running: the MAC entity may apply the Timing Advance Command for this TAG; and may start the timeAlignmentTimer associated with this TAG. When the Contention Resolution is considered not successful or after transmitting HARQ feedback for MAC PDU including UE Contention Resolution Identity MAC CE: the MAC entity may stop timeAlignmentTimer associated with this TAG. Otherwise, the MAC entity may ignore the received Timing Advance Command.

In an example, when an Absolute Timing Advance Command is received in response to a MSGA transmission including C-RNTI MAC CE, the MAC entity may apply the Timing Advance Command for PTAG; and may start or restart the timeAlignmentTimer associated with PTAG.

In an example, a timeAlignmentTimer may be expired. If the timeAlignmentTimer is associated with the PTAG: the MAC entity may flush HARQ buffers for all Serving Cells; notify RRC to release PUCCH for all Serving Cells, if configured; notify RRC to release SRS for all Serving Cells, if configured; clear configured downlink assignments and configured uplink grants; consider running timeAlignmentTimers as expired; and maintain NTA of all TAGs. If the timeAlignmentTimer is associated with an STAG, then for all Serving Cells belonging to this TAG: the MAC entity may flush all HARQ buffers; notify RRC to release PUCCH, if configured; notify RRC to release SRS, if configured; clear any configured downlink assignments and configured uplink grants; clear any PUSCH resource for semi-persistent CSI reporting; and maintain NTA of this TAG.

In an example, when the MAC entity stops uplink transmissions for an SCell due to the fact that the maximum uplink transmission timing difference between TAGs of the MAC entity or the maximum uplink transmission timing difference between TAGs of any MAC entity of the UE is exceeded, the MAC entity may consider the timeAlignmentTimer associated with the SCell as expired.

In an exmaple, the MAC entity may not perform any uplink transmission on a Serving Cell except the Random Access Preamble and MSGA transmission when the timeAlignmentTimer associated with the TAG to which this Serving Cell belongs is not running. Furthermore, when the timeAlignmentTimer associated with the PTAG is not running, the MAC entity may not perform any uplink transmission on any Serving Cell except the Random Access Preamble and MSGA transmission on the SpCell.

Figure 16:
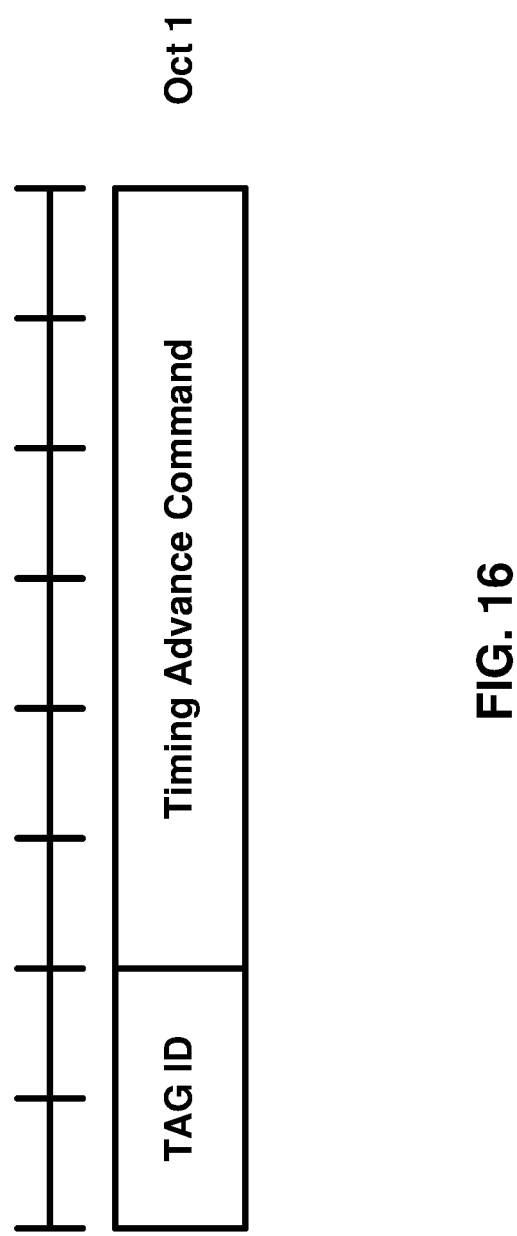
FIG. 16 shows an example of timing advance medium access control (MAC) control element (CE) in accordance with several of various embodiments of the present disclosure.

In an example, a Timing Advance Command MAC CE may be identified by MAC subheader with a corresponding logical channel identifier (LCID). In an example, the Timing Advance Command MAC CE may have a fixed size and may comprise a single octet as shown in FIG. 16. A TAG Identity (TAG ID) field may indicate the TAG Identity of the addressed TAG. In an example, a TAG containing the SpCell may have the TAG Identity 0. The length of the field may be 2 bits. A Timing Advance Command field may indicate the index value TA (0, 1, 2 . . . 63) used to control the amount of timing adjustment that MAC entity may have to apply. In an example, the length of the Timing Advance Command field may be 6 bits.

Figure 17:
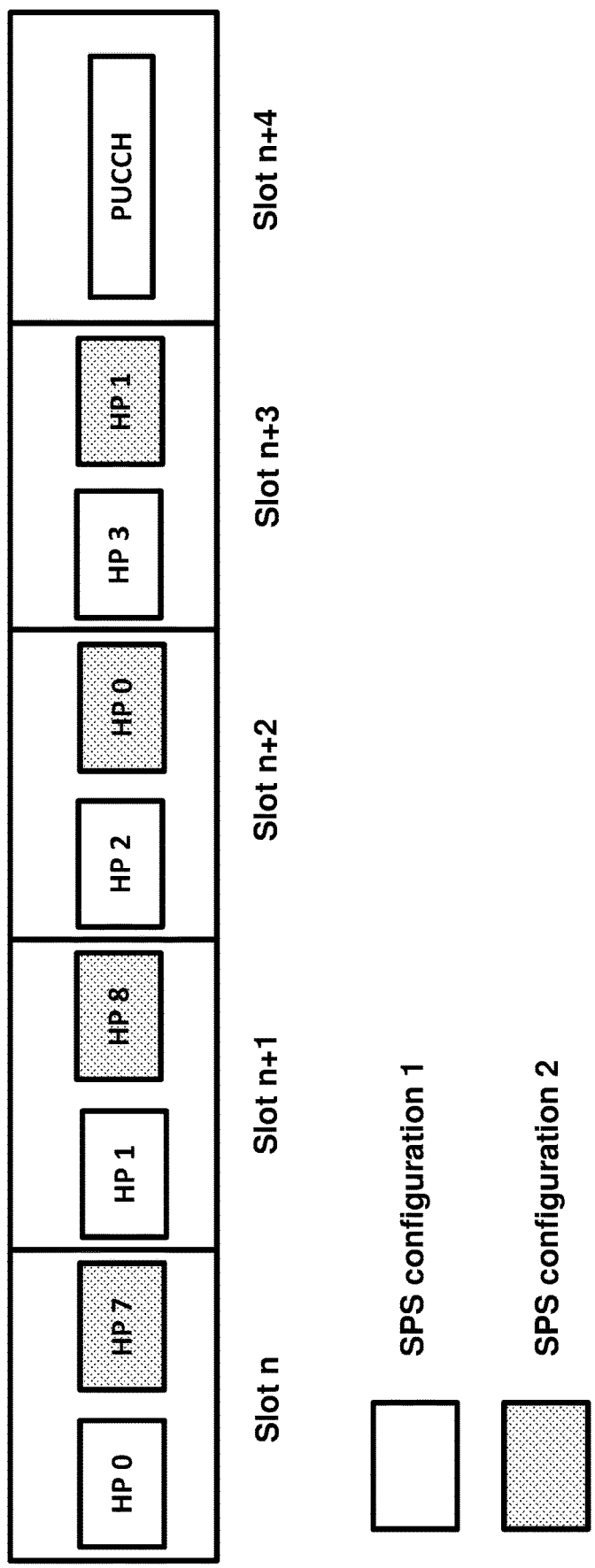
FIG. 17 show an example process in accordance with several of various embodiments of the present disclosure.

In an example, a later PDSCH (e.g., a SPS PDSCH) with a given HARQ process may be transmitted before the feedback of an early PDSCH (e.g., SPS PDSCH) with the same HARQ process. An example is shown in FIG. 17. HARQ process 0 of SPS configuration 1 may be transmitted in slot n, and the corresponding HARQ feedback may be deferred to slot n+4. The same HARQ process of SPS configuration 2 may be transmitted slot n+2.

In an example, if the HARQ feedback corresponding to a first PDSCH (e.g., first SPS PDSCH) with a given HARQ process is transmitted in slot j, and a second PDSCH (e.g., second SPS PDSCH) with the same HARQ process is transmitted before slot j, the wireless device may drop the HARQ feedback information corresponding to the first PDSCH (e.g., the first SPS PDSCH). In an example, no HARQ feedback may be transmitted for the first PDSCH (e.g., the first SPS PDSCH).

In an example, if HARQ feedback corresponding to a first PDSCH (e.g., first SPS PDSCH) with a given HARQ process is deferred to slot j, and a second PDSCH (e.g., second SPS PDSCH) with the same HARQ process is transmitted before slot j, the wireless device may drop the HARQ feedback information corresponding to the first PDSCH (e.g., first SPS PDSCH) and may be A HARQ feedback, associated with a downlink transport block, may be skipped or may be deferred due to a scheduled timing (e.g., slot/sub-slot) of the HARQ feedback not being available or valid for transmission of the HARQ feedback. Existing wireless device and/or wireless network processes (such as DRX, wireless device feedback, etc.) may lead to inefficient wireless device and wireless network performance. There is a need to enhance the exiting wireless device and/or wireless network processes (such as DRX, wireless device feedback, etc.). Example embodiments enhance the existing wireless device and/or wireless network processes.

In example embodiments, a wireless device may receive one or more messages (e.g., one or more RRC messages) comprising configuration parameters of one or more cells. In an example with carrier aggregation, the one or more cells may comprise a primary cell and one or more secondary cells. In an example, the one or more cells may be provided by one base station (e.g., in case of single connectivity) or may be provided by a plurality of base stations (e.g., in case of multi-connectivity, e.g., dual connectivity in case of two base stations). The configuration parameters may comprise discontinuous reception (DRX) configuration parameters. The DRX configuration parameters may comprise a first parameter indicating a value of a DRX retransmission timer (e.g., a downlink DRX retransmission timer or an uplink DRX retransmission timer).

Figure 18:
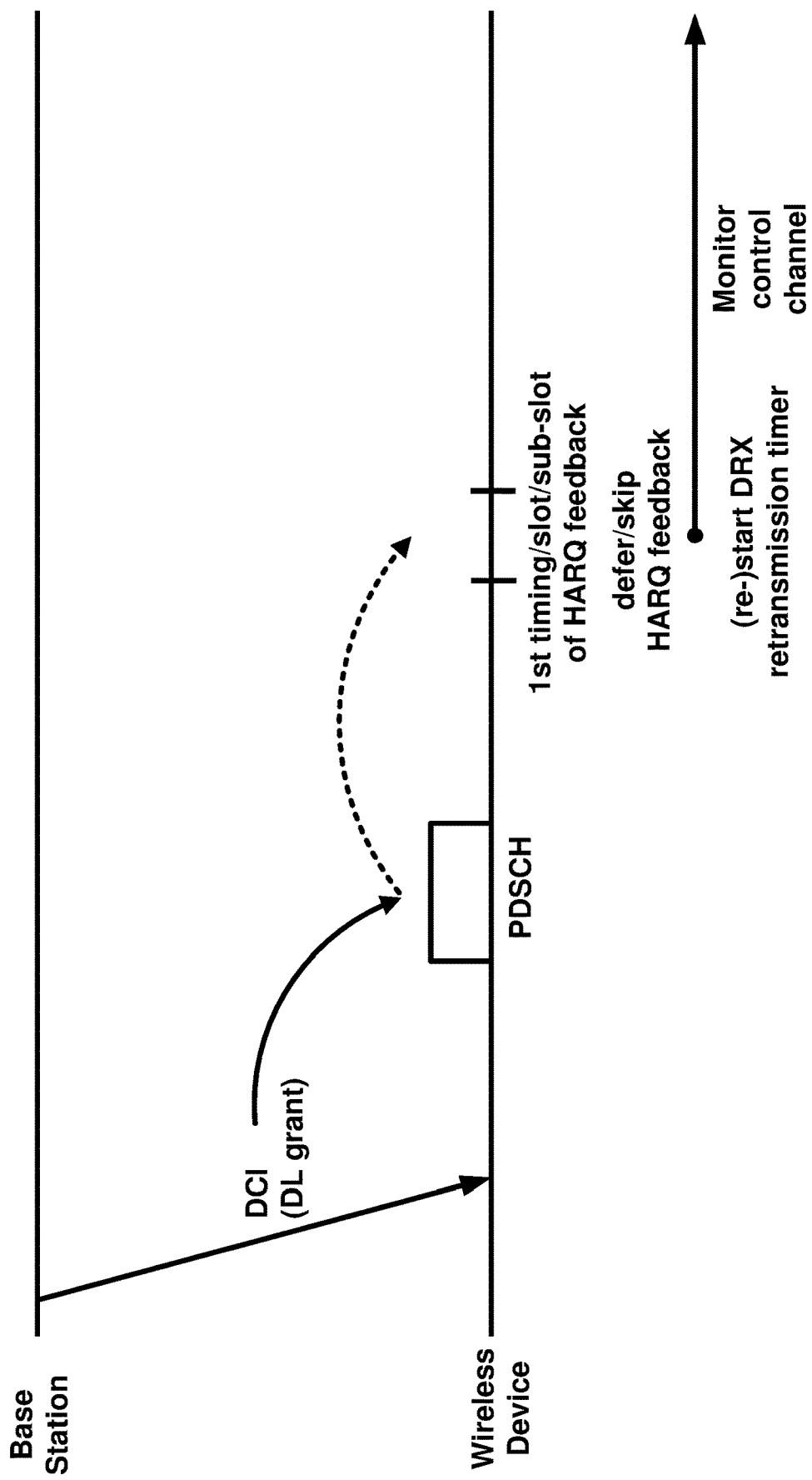
FIG. 18 show an example process in accordance with several of various embodiments of the present disclosure.
Figure 19:
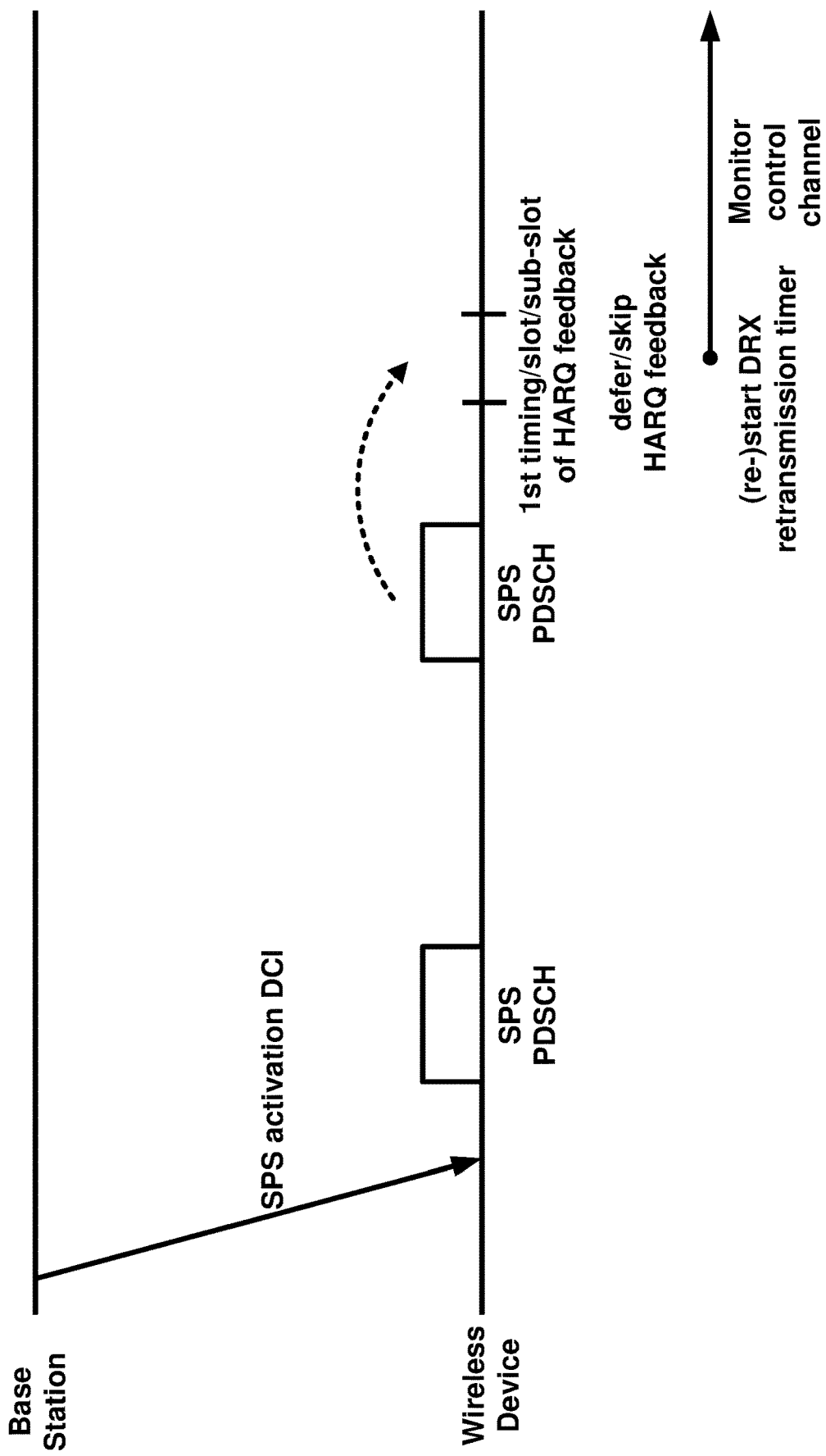
FIG. 19 show an example process in accordance with several of various embodiments of the present disclosure.

In an example embodiment as shown in FIG. 18 and FIG. 19, a wireless device may receive a first downlink transport block. For the example shown in FIG. 18, the wireless device may receive a DCI comprising a dynamic downlink assignment indicating parameters (e.g., radio resources, HARQ related parameters, etc.) for reception of the first downlink transport block via a physical downlink shared channel (PDSCH). For the example shown in FIG. 19, the configuration parameters received via the one or more messages (e.g., the one or more RRC messages) may comprise downlink semi-persistent scheduling (SPS) configuration parameters of a downlink SPS configuration. The wireless device may receive an SPS activation DCI indicating activation of the downlink SPS configuration. As shown in FIG. 19, a plurality of SPS resources may be activated in response to reception of the SPS activation DCI, wherein the plurality of resources may be based on the downlink SPS configuration parameters and based on the SPS activation DCI. The wireless device may receive the first downlink transport block (e.g., based on a dynamic downlink assignment as shown in FIG. 18 or based on a configured downlink assignment as shown in FIG. 19).

The wireless device may determine a first timing of a first HARQ feedback associated with the first downlink transport block. The wireless device may determine the first timing of the first HARQ feedback based on a PDSCH-to-HARQ feedback timing field of the DCI (e.g., the DCI comprising the dynamic grant as shown in FIG. 18 or the SPS activation DCI as shown in FIG. 19) and the timing of reception of the first downlink transport block. The first timing of the first HARQ feedback (e.g., a first slot or a first sub-slot that the first HARQ feedback is scheduled to be transmitted), associated with the first downlink transport block, may collide/overlap in one or more symbols with one or more semi-static downlink symbols or may collide/overlap in one or more symbols with a synchronization signal block (SSB) or may collide/overlap in one or more symbols with CORESET #0 (e.g., used for monitoring a common search space and for reception of scheduling information of system information (e.g., system information block 1 (SIB1)). In response to the determination that the first timing overlaps/collides in one or more symbols with the one or more semi-static downlink symbols or with a SSB or with a CORESET #0, the wireless device may determine to skip or to defer the first HARQ feedback associated with the downlink transport block. For example, the wireless device may determine to defer the first HARQ feedback to a first available timing/slot/sub-slot/symbols that are available/useful for transmission of the HARQ feedback, for example, based on the first available timing/slot/sub-slot/symbols not colliding/overlapping with semi-static downlink symbols or not colliding/overlapping with SSB or not colliding/overlapping with CORESET #0.

In response to the determination to skip or to defer the first HARQ feedback, the wireless device may start or restart the DRX retransmission timer (e.g., the downlink retransmission timer) with the value indicated by the first parameter (e.g., drx-RetransmissionTimerDL) in the DRX configuration parameters. The wireless device may start the DRX retransmission timer for the HARQ process associated with the first downlink transport. For example, the HARQ process may be indicated by the downlink assignment (e.g., indicated by the DCI in FIG. 18) or the wireless device may determine the HARQ process associated with the first downlink transport block based on a timing of the downlink transport block in case the first downlink transport block is a SPS downlink transport block as shown in FIG. 19. The wireless device may be in a DRX Active time while the DRX retransmission timer is running and may monitor a downlink control channel while the DRX retransmission timer is running/the wireless device is in DRX Active time. In an example, in response to monitoring the control channel, the wireless device may receive a DCI comprising a downlink assignment for reception of a third downlink transport block for the HARQ process associated with the first downlink transport block.

In an example, the wireless device may receive a second downlink transport block. For example, the wireless device may receive a second DCI comprising a second downlink assignment indicating parameters for reception of the second downlink transport block. For example, the wireless device may receive the second downlink transport block via resources associated with the downlink SPS configuration. The wireless device may determine a second timing of a second HARQ feedback associated with the second downlink transport block. The wireless device may determine the second timing of the second HARQ feedback based on a PDSCH-to-HARQ feedback timing field of the second DCI (e.g., the second DCI comprising the second downlink assignment or the SPS activation DCI) and the timing of reception of the second downlink transport block. The wireless device may determine not to skip or not to defer the second HARQ feedback, for example, in response to the second timing of the second HARQ feedback (e.g., a second slot or a second sub-slot that the HARQ feedback is scheduled to be transmitted), associated with the second downlink transport block, not colliding/not overlapping with a semi-static downlink symbol or not colliding/not overlapping with a synchronization signal block (SSB) or not colliding/ not overlapping with CORESET #0. In response to the determination to not defer or not skip the second HARQ feedback, the wireless device may stop a DRX retransmission timer (e.g., the downlink DRX retransmission timer). The wireless device may stop the DRX retransmission timer for the HARQ process associated with the second downlink transport block. The wireless device may transmit the second HARQ feedback at the second timing. The wireless device may start a HARQ RTT timer (for the HARQ process associated with the second downlink transport block) with a second value. For example, the DRX configuration parameters may comprise a second parameter (e.g., drx-HARQ-RTT-TimerDL) indicating the second value of the HARQ RTT timer. The wireless device may start the DRX retransmission timer, for the corresponding HARQ process, in response to the HARQ RTT timer expiring. The wireless device may be in a DRX Active time in while the DRX retransmission timer is running and may monitor a control channel while in the DRX Active time.

Figure 20:
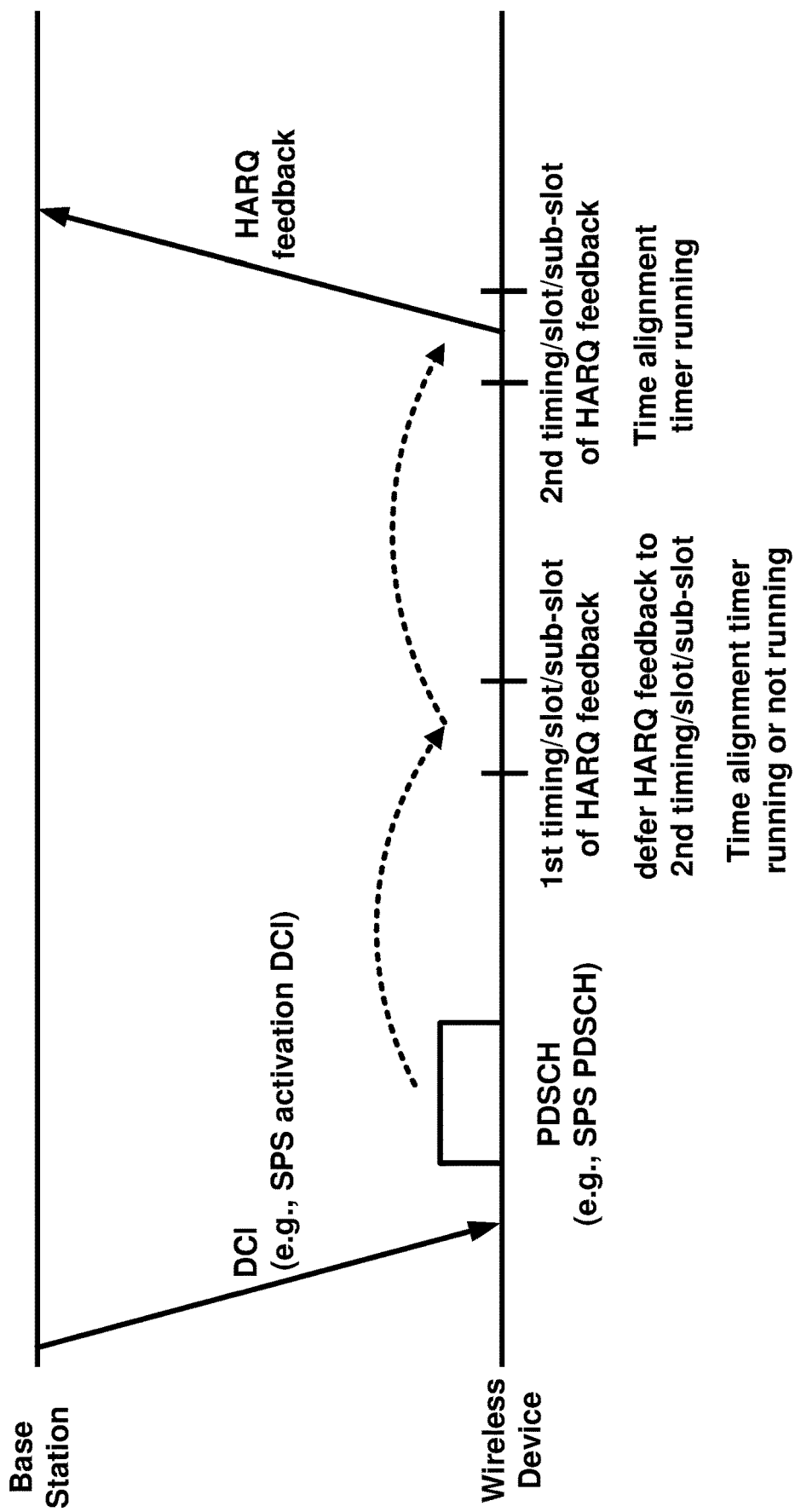
FIG. 20 show an example process in accordance with several of various embodiments of the present disclosure.

In an example embodiment as shown in FIG. 20, a wireless device may receive time alignment group (TAG) configuration parameters indicating that a cell belongs to a TAG. The wireless device may receive a configuration parameter indicating a value of a time alignment timer associated with the cell. The cell may be used for transmission of an uplink control channel, for example, for transmission of HARQ feedback. The wireless device may receive a downlink transport block via a physical downlink shared channel (PDSCH). For example, the wireless device may receive the downlink transport block based on a SPS resource associated with a SPS configuration. For example, the wireless device may receive the downlink transport block based on a DCI comprising a downlink assignment. The wireless device may determine a first timing (e.g., a first sub-slot or a first slot) of a HARQ feedback associated with the downlink transport block. For example, the wireless device may determine the first timing based on a value of a PDSCH-to-HARQ feedback timing field of a DCI (e.g., the DCI comprising the downlink assignment or a SPS activation DCI) and a timing of reception of the downlink transport block. The first timing of the HARQ feedback (e.g., a slot or a sub-slot that the HARQ feedback is scheduled to be transmitted), associated with the downlink transport block, may collide/overlap in one or more symbols with one or more semi-static downlink symbols or may collide/overlap in one or more symbols with a synchronization signal block (SSB) or may collide/overlap in one or more symbols with CORESET #0 (e.g., used for monitoring a common search space and for reception of scheduling information of system information (e.g., system information block 1 (SIB1)). In response to the determination that the first timing overlaps/ collides in one or more symbols with the one or more semi-static downlink symbols or with a SSB or with a CORESET #0, the wireless device may determine to defer the HARQ feedback associated with the downlink transport block to a second timing. For example, the second timing may be an earliest available timing/slot/sub-slot/symbols, after the first timing, that are available/useful for transmission of the HARQ feedback, for example, based on the available timing/slot/sub-slot/symbols not colliding/overlapping with semi-static downlink symbols or not colliding/ overlapping with SSB or not colliding/overlapping with CORESET #0.

The wireless device may determine whether the time alignment timer, associated with the cell, is running at the second timing. The time alignment timer of the cell, used for transmission of HARQ feedback, may be running or may not be running at the first timing. The time alignment timer may be running at the second timing. The wireless device may determine that the time alignment timer is running at the second timing. The wireless device may transmit the HARQ feedback at the second timing based on the time alignment timer running at the second timing. The transmission of the HARQ feedback at the second timing may be irrespective of whether the time alignment timer is running or not running at the first timing.

Figure 21:
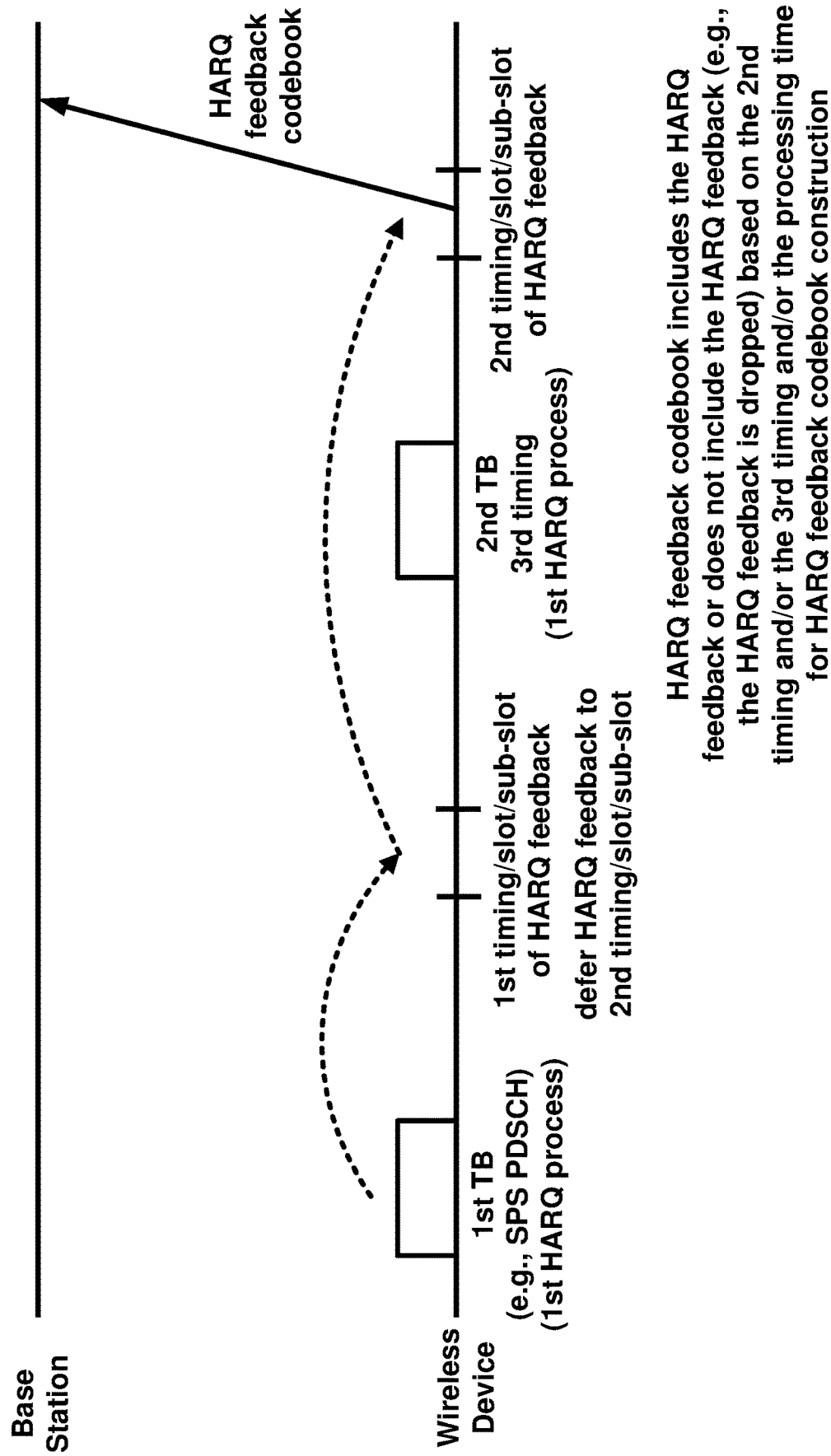
FIG. 21 show an example process in accordance with several of various embodiments of the present disclosure.

In an example embodiment as shown in FIG. 21, a wireless device may receive a first downlink transport block via a physical downlink shared channel (PDSCH). For example, the wireless device may receive the first downlink transport block based on a SPS resource associated with a SPS configuration. For example, the wireless device may receive the first downlink transport block based on a DCI comprising a dynamic downlink assignment indicating parameters (e.g., radio resources, HARQ related parameters, etc.) for reception of the first downlink transport block. The first downlink transport block may be associated with a first HARQ process. For example, the DCI may indicate the first HARQ process number in case the DCI comprises the dynamic downlink assignment. For example, the wireless device may determine the first HARQ process number based on a timing of reception of the first downlink transport block in case of the first downlink transport block being a SPS downlink transport block. The wireless device may determine a first timing (e.g., a first sub-slot or a first slot) of a HARQ feedback associated with the first downlink transport block. For example, the wireless device may determine the first timing based on a value of a PDSCH-to-HARQ feedback timing field of a DCI (e.g., the DCI comprising the dynamic downlink assignment or a SPS activation DCI) and a timing of reception of the first downlink transport block. The first timing of the HARQ feedback (e.g., a slot or a sub-slot that the HARQ feedback is scheduled to be transmitted), associated with the first downlink transport block, may collide/overlap in one or more symbols with one or more semi-static downlink symbols or may collide/overlap in one or more symbols with a synchronization signal block (SSB) or may collide/overlap in one or more symbols with CORESET #0 (e.g., used for monitoring a common search space and for reception of scheduling information of system information (e.g., system information block 1 (SIB1)). In response to the determination that the first timing overlaps/collides in one or more symbols with the one or more semi-static downlink symbols or with a SSB or with a CORESET #0, the wireless device may determine to defer the HARQ feedback associated with the first downlink transport block to a second timing. For example, the second timing may be an earliest available timing/slot/sub-slot/ symbols (e.g., after the first timing) that are available/useful for transmission of the HARQ feedback, for example, based on the available timing/slot/sub-slot/symbols not colliding/overlapping with semi-static downlink symbols or not colliding/overlapping with SSB or not colliding/overlapping with CORESET #0.

The wireless device may receive a second downlink transport block or a DCI scheduling the second downlink transport block at a third timing. The second downlink transport block may be associated with the first HARQ process (e.g., the same HARQ process as the first downlink transport block). In an example, the third timing of reception of the second transport block or the DCI scheduling the second transport block may be before the second timing of scheduled transmission of the deferred HARQ feedback for the first transport block.

The wireless device may construct a HARQ feedback codebook for transmission (e.g., via a PUCCH) at the second timing. The wireless device may determine to multiplex the HARQ feedback or not to multiplex the HARQ feedback based on the third timing and/or based on the second timing and/or based on a processing time for HARQ feedback codebook construction. The wireless device may determine to multiplex the HARQ feedback or to drop the HARQ feedback based on the third timing and/or based on the second timing and/or based on a processing time for HARQ feedback codebook construction. In an example, the processing time for HARQ feedback codebook construction may be based on a wireless device capability parameter. In an example, the wireless device may transmit a capability message to the base station comprising an information element, wherein a value of the information element may indicate the wireless device capability in terms of the HARQ feedback codebook construction such as HARQ feedback codebook construction processing time. For example, based on a difference between the second timing and the third timing being larger than the processing time for HARQ feedback codebook construction, the wireless device may drop (e.g., not multiplex), the HARQ feedback in the HARQ feedback codebook. For example, based on a difference between the second timing and the third timing being smaller than the processing time for HARQ feedback codebook construction, the wireless device may multiplex the HARQ feedback in the HARQ feedback codebook.

In an example embodiment, a wireless device may receive first configuration parameters comprising a first parameter indicating a value of a discontinuous reception (DRX) retransmission timer. The wireless device may determine to skip or to defer a first HARQ feedback, associated with a first downlink transport block, based on a first timing/slot/sub-slot of the first HARQ feedback colliding/overlapping (e.g., in one or more symbols) with one or more semi-static downlink symbols or colliding/overlapping (e.g., in one or more symbols) with synchronization signal block (SSB), or colliding/overlapping (e.g., in one or more symbols) with CORESET #0. In response to the determining, the wireless device may start or restart the DRX retransmission timer with the value for a first HARQ process corresponding to the first transport block. The wireless device may monitor a downlink control channel while the DRX retransmission timer is running.

In an example, the wireless device may receive a downlink control information (DCI) comprising a physical downlink shared channel (PDSCH)-to-hybrid automatic repeat request (HARQ) feedback timing indicator field. The wireless device may receive the downlink transport block based on the DCI. The wireless device may determine the first timing based on a first value of the PDSCH-to-HARQ feedback timing.

In an example, the wireless device may receive second configuration parameters of a downlink semi-persistent scheduling (SPS) configuration. The DCI may indicate activation of the downlink SPS configuration. The wireless device may receive the first downlink transport block based on the second configuration parameters.

In an example, the wireless device may receive a second transport block. The wireless device may determine not to skip or not to defer a second HARQ feedback, associated with the second downlink transport block. For example, based on a second timing/slot/sub-slot of the second HARQ feedback not colliding/overlapping with a semi-static downlink symbol, or the second timing/slot/sub-slot of the second HARQ feedback not colliding/overlapping with synchronization signal block (SSB), or the second timing/slot/sub-slot of the second HARQ feedback not colliding/overlapping with CORESET #0, the wireless device may determine not to skip or not to defer a second HARQ feedback, associated with the second downlink transport block. The wireless device may stop a DRX retransmission timer associated with a second HARQ process corresponding to the second transport block. In an example, the wireless device may transmit the second HARQ feedback. The wireless device may start a HARQ RTT timer in response to transmitting the second HARQ feedback. The wireless device may start or restart the DRX retransmission timer in response to the HARQ RTT timer expiring. In an example, the first configuration parameters may comprise a second parameter indicating a second value of the HARQ RTT timer. The starting or restarting the HARQ RTT timer may be with the second value.

In an example, the wireless device may receive a DCI based on the monitoring. The wireless device may receive, based on the DCI, a third transport block associated with the first HARQ process.

In an example embodiment, a wireless device may a downlink transport block. The wireless device may determine a first timing/slot/sub-slot of a HARQ feedback associated with the downlink transport block. The wireless device may determine to defer the HARQ feedback based on the first timing/slot/sub-slot colliding/overlapping (e.g., in one or more symbols) with one or more semi-static downlink symbols, or colliding/overlapping (e.g., in one or more symbols) with synchronization signal block (SSB), or colliding/overlapping (e.g., in one or more symbols) with CORESET #0. The wireless device may determine a second timing for transmission of the HARQ feedback. The wireless device may determine whether a time alignment timer associated with a cell used for transmission of the HARQ feedback is running at the second timing. The wireless device may transmit the HARQ feedback at the second timing based on a time alignment timer associated with a cell used for transmission of the HARQ feedback being running at the second timing. The wireless device may transmit the HARQ feedback at the second timing, wherein transmitting the HARQ feedback may be based on a time alignment timer associated with a cell used for transmission of the HARQ feedback being running at the second timing and may not be based on and/or may be irrespective of whether the time alignment timer being running or not running at the first timing.

In an example embodiment, a wireless device may receive a transport block associated with a first HARQ process. The wireless device may determine to defer/postpone a first HARQ feedback associated with the first TB from a first timing to a second timing based on the first timing colliding/overlapping (e.g., in one or more symbols) with one or more semi-static downlink symbols, or based on the first timing colliding/overlapping (e.g., in one or more symbols) with synchronization signal block (SSB), or based on the first timing colliding/overlapping (e.g., in one or more symbols) with CORESET #0. The wireless device may receive a second TB/DCI, associated with the first HARQ process, at a third timing. The wireless device may transmit a HARQ feedback codebook at the second timing, wherein the HARQ feedback codebook comprises or does not comprise the first HARQ feedback based on the third timing, the second timing and a processing time associated with HARQ feedback codebook construction.

In an example, the wireless device may receive a first DCI comprising a physical downlink shared channel (PDSCH)-to-hybrid automatic repeat request (HARQ) feedback timing field, wherein the first timing is based on a value of the PDSCH-to-HARQ feedback timing field. In an example, the receiving the first transport block may be based on the first DCI. In an example, the wireless device may receive configuration parameters of a downlink semi-persistent scheduling (SPS) configuration, wherein the first DCI indicates activation of the downlink SPS configuration. In an example, a plurality of SPS resources may be activated in response to reception of the first DCI. The reception of the first transport block may be based on a first SPS resource in the plurality of SPS resources. In an example, the first DCI may comprise a dynamic downlink assignment comprising transmission parameters of the first transport block.

In an example, the HARQ feedback codebook may comprise the first HARQ feedback based on a difference between the third timing and the second timing being smaller than the processing time.

In an example, the HARQ feedback codebook may not comprise the first HARQ feedback based on a difference between the third timing and the second timing being larger than the processing time.

Figure 22:
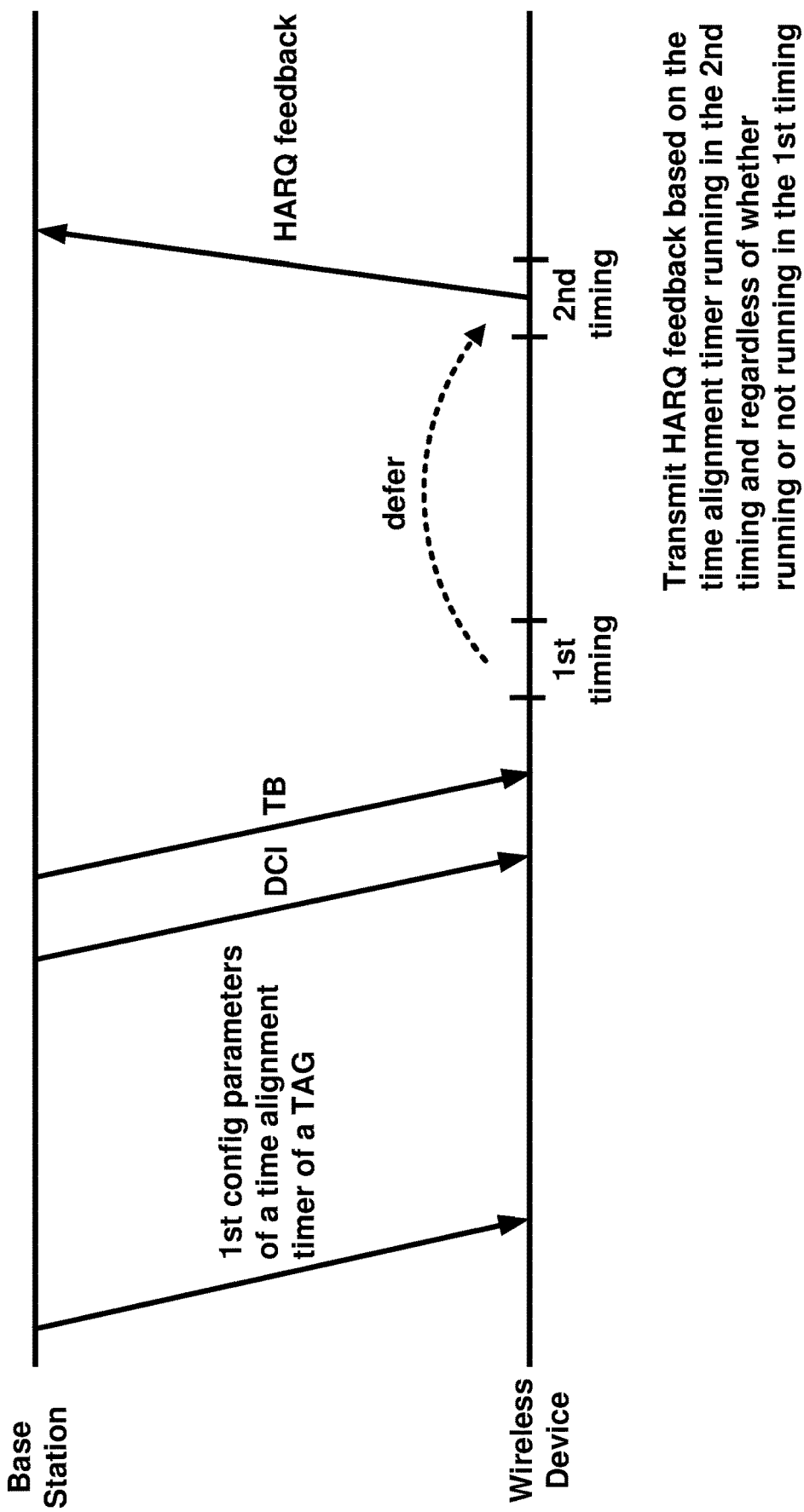
FIG. 22 shows an example process in accordance with several of various embodiments of the present disclosure.

In an example embodiment as shown in FIG. 22, a wireless device may receive one or more messages (e.g., one or more RRC messages) comprising configuration parameters. The one or more messages may comprise configuration parameters of one or more cells comprising a one or more timing advance groups (TAGs). A TAG, in the one or more TAGs, may be associated with a timing advance. For uplink transmissions via a cell, in the TAG, may be based on an uplink timing that is determined based on the timing advance associated with the TAG that includes the cell. The configuration parameters may comprise one or more first configuration parameters of a time alignment timer of a TAG comprising a cell. The one or more first configuration parameters may comprise a first parameter indicating a value of the time alignment timer associated with the TAG. For example, the wireless device may receive a timing advance command MAC CE indicating a timing advance command associated with the TAG and the wireless device may start the time alignment timer, with the value, in response to receiving the timing advance MAC CE.

The wireless device may receive a DCI and may receive a transport block based on the DCI. For example, the wireless device may receive configuration parameters of a semi-persistent scheduling (SPS) configuration, the DCI may be an activation DCI indicating activation of the SPS configuration and the transport block may be a SPS transport block. For example, the SPS configuration parameters may comprise a periodicity parameter indicating a periodicity, e.g., separation between consecutive SPS transport block. For example, the DCI may comprise scheduling information indicating radio resources for receiving the transport block.

The wireless device may determine a first timing of a HARQ feedback associated with the transport block. For example, the DCI may comprise a field (e.g., a PDSCH-to-HARQ feedback timing field) indicating the first timing of the transport block. For example, the wireless device may determine the first timing based on a third timing of receiving the transport block. For example, a value of the PDSCH-to-HARQ feedback timing field of the DCI may indicate a separation/duration between the third timing of the transport block and the first timing of the HARQ feedback and the wireless device may determine the first timing based on the third timing and the value of the PDSCH-to-HARQ feedback timing field of the DCI.

The wireless device may determine to defer transmission of the HARQ feedback associated with the transport block from the first timing to a second timing. In an example, the wireless device may determine to defer transmission of the HARQ feedback based on the first timing overlapping with one or more symbols that include a downlink symbol (e.g., based on one or more semi-static configuration parameters indicating that a symbol in the one or more symbols is a downlink symbol) or based on the first timing overlapping with one or more symbols that include a symbol associated with a synchronization signal/physical broadcast channel block (SS/PBCH block) or based on the first timing overlapping with one or more symbols that include a symbol that belongs to a CORESET (e.g., CORESET #0) that is associated with (e.g., used for receiving scheduling information for receiving) system information (e.g., a system information block, e.g., SIB1). The wireless device may determine the second timing (to which the HARQ feedback is deferred from the first timing) based on the second timing not overlapping with a symbol that is a downlink symbol (e.g., based on one or more semi-static configuration parameters not indicating that the symbol is a downlink symbol) or based on the second timing not overlapping with a symbol that is associated with a synchronization signal/physical broadcast channel block (SS/PBCH block) or based on the second timing not overlapping with a symbol that belongs to a CORESET (e.g., CORESET #0) that is associated with (e.g., used for receiving scheduling information for receiving) system information (e.g., a system information block, e.g., SIB1).

The wireless device may transmit the HARQ feedback, associated with the transport block, in the second timing via the cell (e.g., via the cell belonging to the TAG) based on the time alignment timer, associated with the TAG, running in the second timing. The time alignment timer, associated with the TAG, may be running, or may not be running in the first timing. The wireless device may transmit the HARQ feedback in the second timing based on the time alignment timer, associate with the TAG, running in the second timing and regardless of whether the time alignment timer is running or is not running in the first timing.

In accordance with various exemplary embodiments in the present disclosure, a device (e.g., a wireless device, a base station and/or alike) may include one or more processors and may include memory that may store instructions. The instructions, when executed by the one or more processors, cause the device to perform actions as illustrated in the accompanying drawings and described in the specification. The order of events or actions, as shown in a flow chart of this disclosure, may occur and/or may be performed in any logically coherent order. In some examples, at least two of the events or actions shown may occur or may be performed at least in part simultaneously and/or in parallel. In some examples, one or more additional events or actions may occur or may be performed prior to, after, or in between the events or actions shown in the flow charts of the present disclosure.

Figure 23:
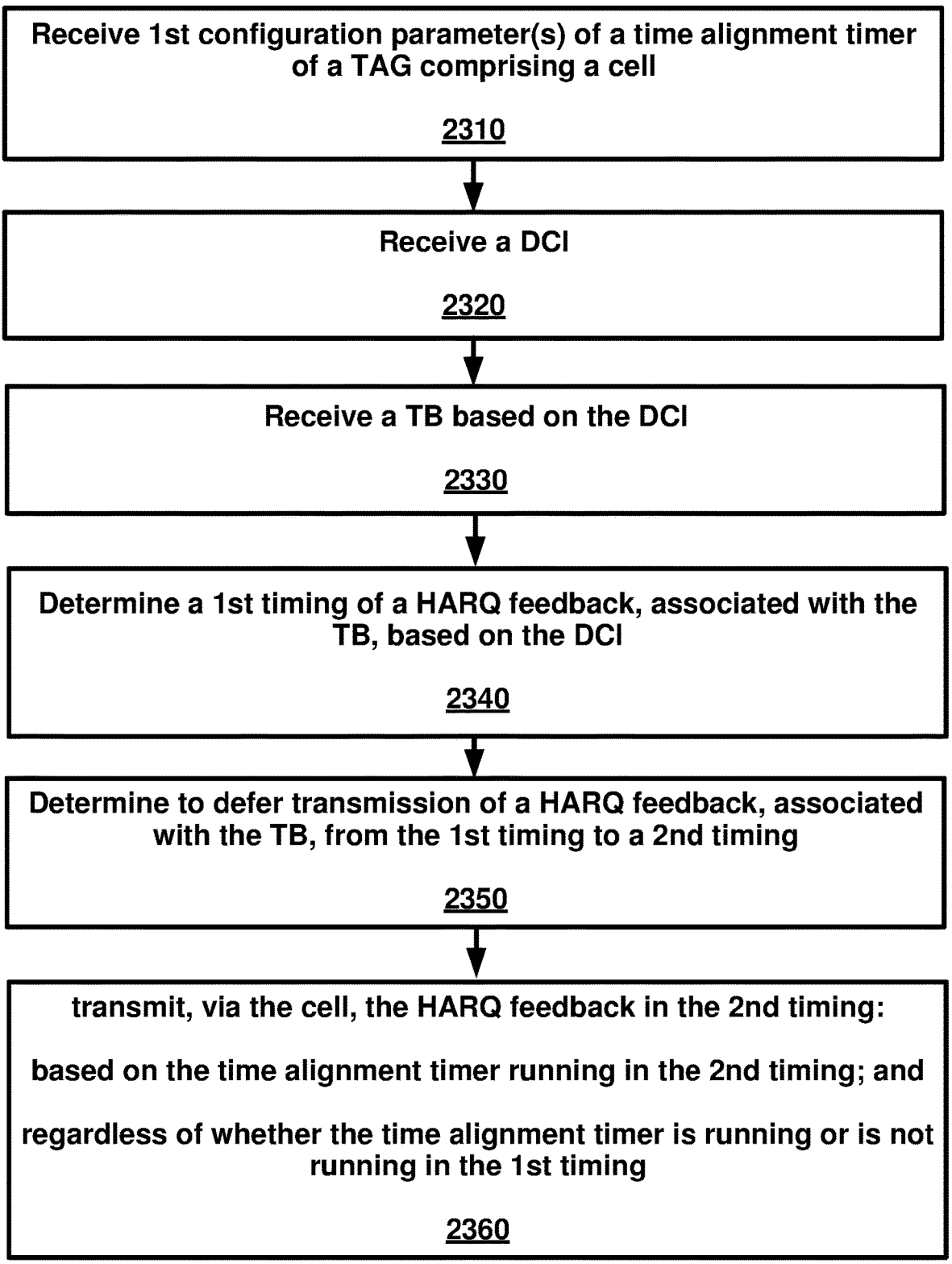
FIG. 23 shows an example flow diagram in accordance with several of various embodiments of the present disclosure.

FIG. 23 shows an example flow diagram in accordance with several of various embodiments of the present disclosure. At 2310, a wireless device may receive one or more first configuration parameters of a time alignment timer of a time alignment group comprising a cell. At 2320, the wireless device may receive a downlink control information (DCI). At 2330, the wireless device may receive a transport block based on the DCI. At 2340, the wireless device may determine a first timing of a hybrid automatic repeat request (HARQ) feedback, associated with the transport block, based on the DCI. At 2350, the wireless device may determine to defer transmission of a hybrid automatic repeat request (HARQ) feedback, associated with the transport block, from the first timing to a second timing. At 2360, the wireless device may transmit, via the cell, the HARQ feedback in the second timing: based on the time alignment timer running in the second timing; and regardless of whether the time alignment timer is running or is not running in the first timing.

In an example embodiment, the determining at 2350, to defer may be based on the first timing overlapping with a symbol that: is a downlink symbol based on a semi-static configuration; or is associated with a synchronization signal block; or belongs to a control resource set (CORESET) associated with a common search space that is used in receiving system information.

In an example embodiment, the DCI, received at 2320, may be a semi-persistent scheduling (SPS) activation DCI. The transport block, received at 2330, may be associated with a SPS configuration. In an example embodiment, the wireless device may receive second configuration parameters of the SPS configuration.

In an example embodiment, the second timing may be an earliest timing, after the first timing, not overlapping with a symbol that: is a downlink symbol based on a semi-static configuration; or is associated with a synchronization signal block; or belongs to a control resource set (CORESET) associated with a common search space that is used in receiving system information.

In an example embodiment, the first timing may be based on a value of a field of the DCI received at 2320. In an example embodiment, the first timing may be based on a third timing of receiving the transport block at 2330.

In an example embodiment, the one or more first configuration parameters, received at 2310, may comprise a first parameter indicating a value of the time alignment timer. In an example embodiment, the wireless device may start the time alignment timer in response to receiving a timing advance command medium access control (MAC) control element (CE). In an example embodiment, the wireless device may apply a timing advance command in response to receiving the timing advance command MAC CE. The timing advance command MAC CE may comprise the timing advance command.

Figure 24:
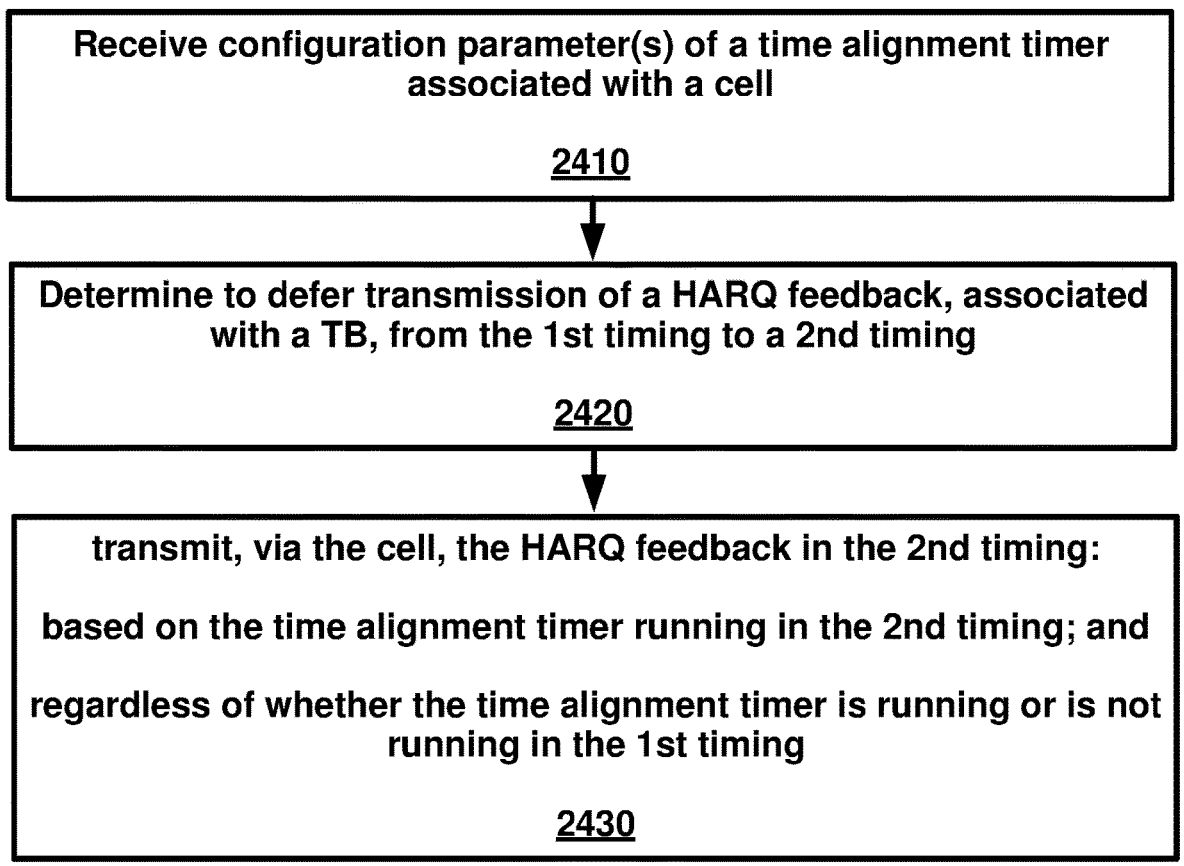
FIG. 24 shows an example flow diagram in accordance with several of various embodiments of the present disclosure.

FIG. 24 shows an example flow diagram in accordance with several of various embodiments of the present disclosure. At 2410, a wireless device may receive one or more configuration parameters of a time alignment timer associated with a cell. At 2420, the wireless device may determine to defer transmission of a hybrid automatic repeat request (HARQ) feedback, associated with a transport block, from a first timing to a second timing. At 2430, the wireless device may transmit, via the cell, the HARQ feedback in the second timing: based on the time alignment timer running in the second timing; and regardless of whether the time alignment timer is running or is not running in the first timing.

Figure 25:
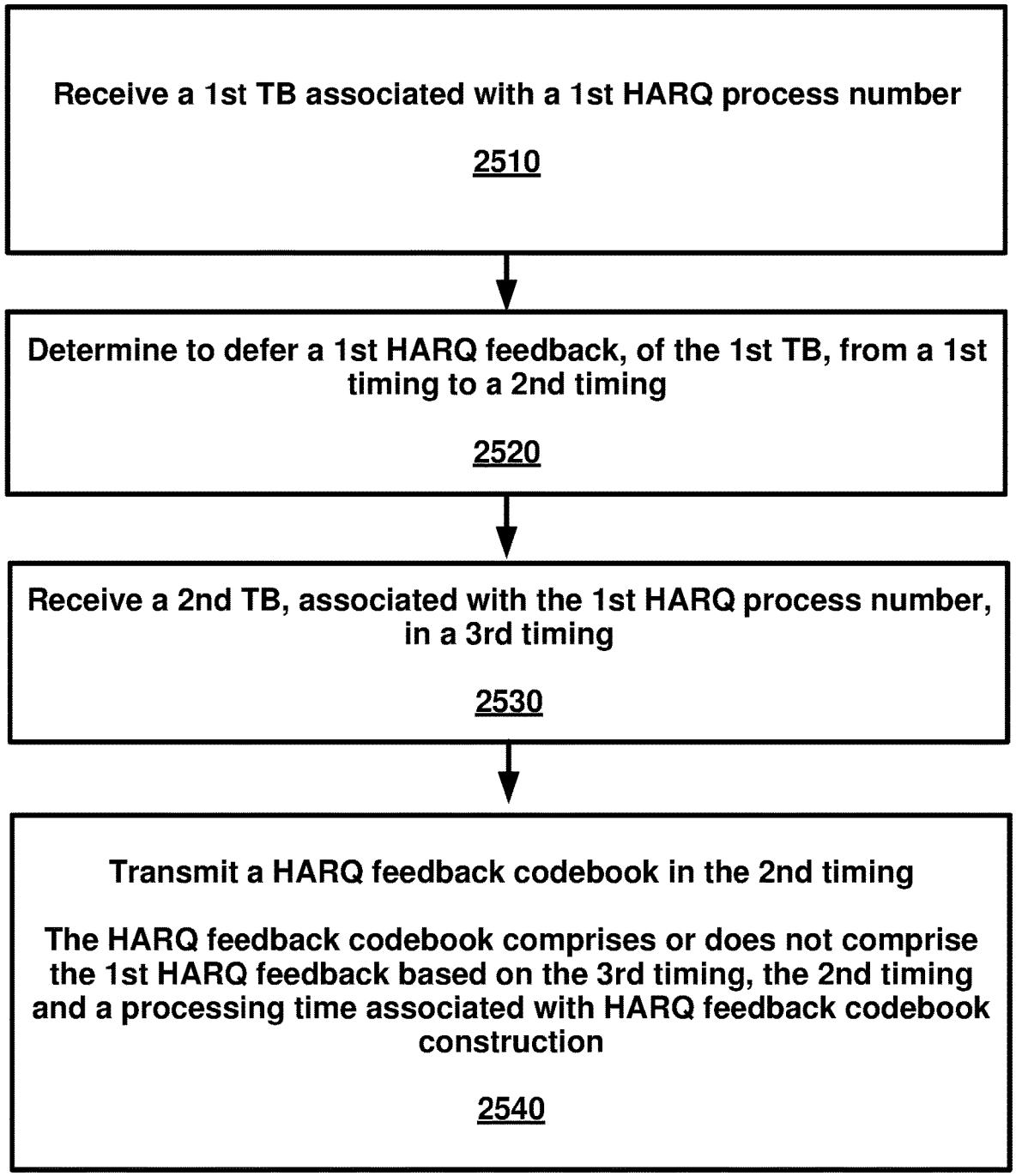
FIG. 25 shows an example flow diagram in accordance with several of various embodiments of the present disclosure.

FIG. 25 shows an example flow diagram in accordance with several of various embodiments of the present disclosure. At 2510, a wireless device may receive a first transport block associated with a first hybrid automatic repeat request (HARQ) process number. At 2520, the wireless device may determine to defer a first HARQ feedback, of the first transport block, from a first timing to a second timing. At 2530, the wireless device may receive a second transport block, associated with the first HARQ process number, in a third timing. At 2540, the wireless device may transmit a HARQ feedback codebook in the second timing. The HARQ feedback codebook may comprise or may not comprise the first HARQ feedback based on the third timing, the second timing and a processing time associated with HARQ feedback codebook construction.

In example embodiment, the determining at 2520, to defer may be based on the first timing overlapping with a symbol that: is a downlink symbol based on a semi-static configuration; or is associated with a synchronization signal block; or belongs to a control resource set (CORESET) associated with a common search space that is used in receiving system information.

In an example embodiment, receiving the first transport block, at 2510, and/or receiving the second transport block, at 2530, may be based on a downlink control information (DCI). In an example embodiment, the DCI may be a semi-persistent scheduling (SPS) activation DCI. The first transport block, received at 2510, or the second transport block, received at 2530, may be associated with a SPS configuration. In an example embodiment, the wireless device may receive configuration parameters of the SPS configuration.

In an example embodiment, the second timing, determined at 2520, may be an earliest timing, after the first timing, not overlapping with a symbol that: is a downlink symbol based on a semi-static configuration; or is associated with a synchronization signal block; or belongs to a control resource set (CORESET) associated with a common search space that is used in receiving system information.

In an example embodiment, receiving the first transport block may be based on a downlink control information (DCI). The first timing may be based on a value of a field of the DCI. In an example embodiment, the first timing may be based on a third timing of receiving the first transport block.

In an example embodiment, the HARQ feedback codebook may comprise the first HARQ feedback based on a difference between the third timing and the second timing being smaller than the processing time.

In an example embodiment, the HARQ feedback codebook may not comprise the first HARQ feedback based on a difference between the third timing and the second timing being larger than the processing time.

Figure 26:
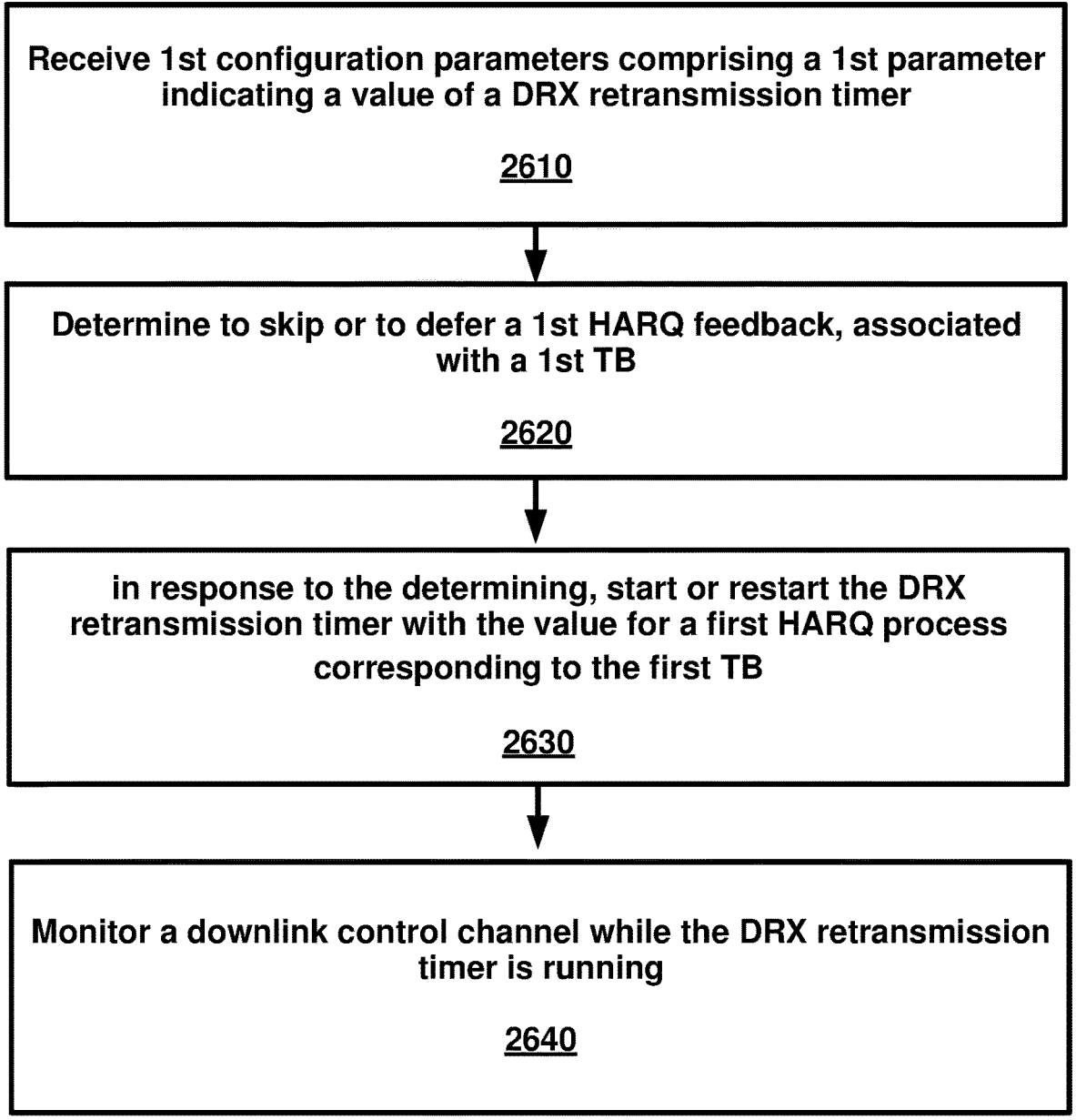
FIG. 26 shows an example flow diagram in accordance with several of various embodiments of the present disclosure.

FIG. 26 shows an example flow diagram in accordance with several of various embodiments of the present disclosure. At 2610, a wireless device may receive first configuration parameters comprising a first parameter indicating a value of a discontinuous reception (DRX) retransmission timer. At 2620, the wireless device may determine to skip or to defer a first HARQ feedback, associated with a first transport block. At 2630, in response to the determining, the wireless device may start or may restart the DRX retransmission timer with the value for a first HARQ process corresponding to the first transport block. At 2640, the wireless device may monitor a downlink control channel while the DRX retransmission timer is running.

In an example embodiment, the determining to defer, at 2620, may be from a first timing to a second timing. In an example embodiment, the determining to defer, at 2620, may be based on the first timing overlapping with a symbol that: is a downlink symbol based on a semi-static configuration; or is associated with a synchronization signal block; or belongs to a control resource set (CORESET) associated with a common search space that is used in receiving system information.

Various exemplary embodiments of the disclosed technology are presented as example implementations and/or practices of the disclosed technology. The exemplary embodiments disclosed herein are not intended to limit the scope. Persons of ordinary skill in the art will appreciate that various changes can be made to the disclosed embodiments without departure from the scope. After studying the exemplary embodiments of the disclosed technology, alternative aspects, features and/or embodiments will become apparent to one of ordinary skill in the art. Without departing from the scope, various elements or features from the exemplary embodiments may be combined to create additional embodiments. The exemplary embodiments are described with reference to the drawings. The figures and the flowcharts that demonstrate the benefits and/or functions of various aspects of the disclosed technology are presented for illustration purposes only. The disclosed technology can be flexibly configured and/or reconfigured such that one or more elements of the disclosed embodiments may be employed in alternative ways. For example, an element may be optionally used in some embodiments or the order of actions listed in a flowchart may be changed without departure from the scope.

An example embodiment of the disclosed technology may be configured to be performed when deemed necessary, for example, based on one or more conditions in a wireless device, a base station, a radio and/or core network configuration, a combination thereof and/or alike. For example, an example embodiment may be performed when the one or more conditions are met. Example one or more conditions may be one or more configurations of the wireless device and/or base station, traffic load and/or type, service type, battery power, a combination of thereof and/or alike. In some scenarios and based on the one or more conditions, one or more features of an example embodiment may be implemented selectively.

In this disclosure, the articles "a" and "an" used before a group of one or more words are to be understood as "at least one" or "one or more" of what the group of the one or more words indicate. The use of the term "may" before a phrase is to be understood as indicating that the phrase is an example of one of a plurality of useful alternatives that may be employed in an embodiment in this disclosure.

In this disclosure, an element may be described using the terms "comprises", "includes" or "consists of" in combination with a list of one or more components. Using the terms "comprises" or "includes" indicates that the one or more components are not an exhaustive list for the description of the element and do not exclude components other than the one or more components. Using the term "consists of" indicates that the one or more components is a complete list for description of the element. In this disclosure, the term "based on" is intended to mean "based at least in part on". The term "based on" is not intended to mean "based only on". In this disclosure, the term "and/or" used in a list of elements indicates any possible combination of the listed elements. For example, "X, Y, and/or Z" indicates X; Y; Z; X and Y; X and Z; Y and Z; or X, Y, and Z.

Some elements in this disclosure may be described by using the term "may" in combination with a plurality of features. For brevity and ease of description, this disclosure may not include all possible permutations of the plurality of features. By using the term "may" in combination with the plurality of features, it is to be understood that all permutations of the plurality of features are being disclosed. For example, by using the term "may" for description of an element with four possible features, the element is being described for all fifteen permutations of the four possible features. The fifteen permutations include one permutation with all four possible features, four permutations with any three features of the four possible features, six permutations with any two features of the four possible features and four permutations with any one feature of the four possible features.

Although mathematically a set may be an empty set, the term set used in this disclosure is a nonempty set. Set B is a subset of set A if every element of set B is in set A. Although mathematically a set has an empty subset, a subset of a set is to be interpreted as a non-empty subset in this disclosure. For example, for set A={subcarrier1, subcarrier2}, the subsets are {subcarrier1}, {subcarrier2} and {subcarrier1, subcarrier2}.

In this disclosure, the phrase "based on" may be used equally with "based at least on" and what follows "based on" or "based at least on" indicates an example of one of plurality of useful alternatives that may be used in an embodiment in this disclosure. The phrase "in response to" may be used equally with "in response at least to" and what follows "in response to" or "in response at least to" indicates an example of one of plurality of useful alternatives that may be used in an embodiment in this disclosure. The phrase "depending on" may be used equally with "depending at least on" and what follows "depending on" or "depending at least on" indicates an example of one of plurality of useful alternatives that may be used in an embodiment in this disclosure. The phrases "employing" and "using" and "employing at least" and "using at least" may be used equally in this in this disclosure and what follows "employing" or "using" or "employing at least" or "using at least" indicates an example of one of plurality of useful alternatives that may be used in an embodiment in this disclosure.

The example embodiments disclosed in this disclosure may be implemented using a modular architecture comprising a plurality of modules. A module may be defined in terms of one or more functions and may be connected to one or more other elements and/or modules. A module may be implemented in hardware, software, firmware, one or more biological elements (e.g., an organic computing device and/or a neurocomputer) and/or a combination thereof and/or alike. Example implementations of a module may be as software code configured to be executed by hardware and/or a modeling and simulation program that may be coupled with hardware. In an example, a module may be implemented using general-purpose or special-purpose processors, digital signal processors (DSPs), microprocessors, microcontrollers, application-specific integrated circuits (ASICs), programmable logic devices (PLDs) and/or alike. The hardware may be programmed using machine language, assembly language, high-level language (e.g., Python, FORTRAN, C, C++ or the like) and/or alike. In an example, the function of a module may be achieved by using a combination of the mentioned implementation methods.

What is claimed is:

1. A method comprising:
   receiving, by a wireless device, a first transport block (TB) associated with a first hybrid automatic repeat request (HARQ) process number;
   determining to defer a first HARQ feedback, associated with the first TB, from a first timing to a second timing;
   receiving, in a third timing, a second TB associated with the first HARQ process number; and
   transmitting the first HARQ feedback in the second timing or dropping the first HARQ feedback based on the second timing and the third timing.

2. The method of claim 1, wherein the determining to defer the first HARQ feedback is based on the first timing overlapping with a symbol that:
   is a downlink symbol based on a semi-static configuration; or
   is associated with a synchronization signal block; or
   belongs to a control resource set (CORESET) associated with a common search space that is used in receiving system information.

3. The method of claim 1, wherein at least one of the first TB and the second TB is associated with a semi-persistent scheduling (SPS) configuration.

4. The method of claim 3, further comprising receiving configuration parameters of the SPS configuration.

5. The method of claim 1, wherein the second timing is an earliest timing, after the first timing, not overlapping with a symbol that:
   is a downlink symbol based on a semi-static configuration; or
   is associated with a synchronization signal block; or
   belongs to a control resource set (CORESET) associated with a common search space that is used in receiving system information.

6. The method of claim 1, wherein the first timing is based on a value of a field of a downlink control information (DCI).

7. The method of claim 1, wherein the transmitting the first HARQ feedback in the second timing or the dropping the first HARQ feedback is based on the second timing and the third timing in response to the first HARQ feedback being a deferred HARQ feedback.

8. The method of claim 1, wherein the transmitting the first HARQ feedback in the second timing or the dropping the first HARQ feedback is based on a time difference between the second timing and the third timing.

9. The method of claim 1, wherein the third timing is prior to the second timing.

10. The method of claim 1, wherein the transmitting the first HARQ feedback in the second timing or the dropping the first HARQ feedback is based on a processing time.

11. A wireless device comprising:
    one or more processors; and
    memory storing instructions that, when executed by the one or more processors, cause the wireless device to:
    receive a first transport block (TB) associated with a first hybrid automatic repeat request (HARQ) process number;
    determine to defer a first HARQ feedback, associated with the first TB, from a first timing to a second timing;
    receive, in a third timing, a second TB associated with the first HARQ process number; and
    transmit the first HARQ feedback in the second timing or drop the first HARQ feedback based on the second timing and the third timing.

12. The wireless device of claim 11, wherein determining to defer the first HARQ feedback is based on the first timing overlapping with a symbol that:
    is a downlink symbol based on a semi-static configuration; or
    is associated with a synchronization signal block; or
    belongs to a control resource set (CORESET) associated with a common search space that is used in receiving system information.

13. The wireless device of claim 11, wherein at least one of the first TB and the second TB is associated with a semi-persistent scheduling (SPS) configuration.

14. The wireless device of claim 13, wherein the instructions, when executed by the one or more processors, further cause the wireless device to receive configuration parameters of the SPS configuration.

15. The wireless device of claim 11, wherein the second timing is an earliest timing, after the first timing, not overlapping with a symbol that:
    is a downlink symbol based on a semi-static configuration; or
    is associated with a synchronization signal block; or
    belongs to a control resource set (CORESET) associated with a common search space that is used in receiving system information.

16. The wireless device of claim 11, wherein the first timing is based on a value of a field of a downlink control information (DCI).

17. The wireless device of claim 11, wherein transmitting the first HARQ feedback in the second timing or dropping the first HARQ feedback is based on the second timing and the third timing in response to the first HARQ feedback being a deferred HARQ feedback.

18. The wireless device of claim 11, wherein transmitting the first HARQ feedback in the second timing or dropping the first HARQ feedback is based on a time difference between the second timing and the third timing.

19. The wireless device of claim 11, wherein the third timing is prior to the second timing.

20. The wireless device of claim 11, wherein transmitting the first HARQ feedback in the second timing or dropping the first HARQ feedback is based on a processing time.

* * * * *